US011702858B2

(12) United States Patent
Ward

(10) Patent No.: US 11,702,858 B2
(45) Date of Patent: Jul. 18, 2023

(54) INFLATABLE ENTERTAINMENT STRUCTURES

(71) Applicant: Mega Entertainment, Inc., Chino Hills, CA (US)

(72) Inventor: Timothy Ward, Chino Hills, CA (US)

(73) Assignee: Mega Entertainment, Inc., Chino Hills, CA (US)

( * ) Notice: Subject to any disclaimer, the term of this patent is extended or adjusted under 35 U.S.C. 154(b) by 0 days.

(21) Appl. No.: 17/098,063

(22) Filed: Nov. 13, 2020

(65) Prior Publication Data

US 2021/0148135 A1     May 20, 2021

Related U.S. Application Data

(60) Provisional application No. 62/983,896, filed on Mar. 2, 2020, provisional application No. 62/936,156, filed on Nov. 15, 2019.

(51) Int. Cl.
    *E04H 15/20*        (2006.01)
    *G06T 19/00*        (2011.01)
    *G02B 27/01*        (2006.01)

(52) U.S. Cl.
    CPC ......... *E04H 15/20* (2013.01); *G02B 27/0172* (2013.01); *G06T 19/006* (2013.01); *E04H 2015/202* (2013.01)

(58) Field of Classification Search
    CPC .................. E04H 15/20; E04H 2015/202
    See application file for complete search history.

(56) References Cited

U.S. PATENT DOCUMENTS

| | | | | |
|---|---|---|---|---|
| 2,754,836 | A | * | 7/1956 | Darby ............... E04H 15/20 52/2.21 |
| 3,231,644 | A | * | 1/1966 | Chang ............. E04G 21/0472 52/80.1 |
| 3,393,479 | A | * | 7/1968 | Slotnick ............ E04H 15/20 52/2.21 |
| 3,548,904 | A | * | 12/1970 | Mackell ............ E04H 15/20 52/2.21 |
| 6,011,504 | A | * | 1/2000 | Tan ................. H05K 9/0001 174/379 |
| 6,929,016 | B2 | * | 8/2005 | Lee .................. E04H 15/20 135/126 |

(Continued)

FOREIGN PATENT DOCUMENTS

| | | | |
|---|---|---|---|
| CN | 106919252 A | * 7/2017 | |
| DE | 102019003469 A1 | * 11/2020 | ........ A44B 19/26 |

(Continued)

*Primary Examiner* — Babajide A Demuren
(74) *Attorney, Agent, or Firm* — Knobbe Martens Olson & Bear LLP

(57) ABSTRACT

An inflatable structure includes a plurality of inflatable walls arranged to form a room having an interior and one or more lockable compartments integrated into the plurality of inflatable walls. The lockable compartments can include a non-inflated recess formed within an inflatable wall and at least one flap configured to close an opening of the recess of the first lockable compartment. The inflatable structure can be themed, e.g., by installing themed skins on interior surfaces of the room to provide a user experience. The inflatable structure may also include integrated virtual reality components, including a virtual reality headset supported by the structure.

12 Claims, 57 Drawing Sheets

(56) References Cited

U.S. PATENT DOCUMENTS

| | | | | |
|---|---|---|---|---|
| 8,001,985 B1* | 8/2011 | Conner | ............... | E04H 15/56 |
| | | | | 135/96 |
| 10,301,834 B2* | 5/2019 | Wibben | ............. | E04D 13/0335 |
| 2003/0003840 A1* | 1/2003 | Hsu | ..................... | A63B 5/11 |
| | | | | 446/221 |
| 2004/0154616 A1* | 8/2004 | Parker Risley | ...... | A61G 10/026 |
| | | | | 128/202.12 |
| 2009/0149111 A1* | 6/2009 | Scherba | ................. | A63G 9/00 |
| | | | | 446/478 |
| 2012/0291362 A1* | 11/2012 | Milo | ..................... | E04H 15/20 |
| | | | | 52/2.21 |
| 2015/0017897 A1* | 1/2015 | Wiliams | ................. | B05B 16/80 |
| | | | | 454/51 |
| 2015/0042822 A1* | 2/2015 | Le | ..................... | G03B 15/07 |
| | | | | 348/370 |
| 2015/0101258 A1* | 4/2015 | Milo | ..................... | E04H 15/20 |
| | | | | 52/2.18 |
| 2016/0243421 A1* | 8/2016 | Scherba | ............. | A63B 69/004 |
| 2017/0156961 A1* | 6/2017 | Patel | ..................... | E04H 1/1205 |
| 2019/0044549 A1* | 2/2019 | Pillai | ..................... | H04W 4/70 |

FOREIGN PATENT DOCUMENTS

| | | | | | |
|---|---|---|---|---|---|
| EP | 2792817 A2 | * | 10/2014 | ............. | E04B 1/165 |
| FR | 1372039 A | * | 9/1964 | | |

* cited by examiner

INFLATABLE ENTERTAINMENT STRUCTURES

INCORPORATION BY REFERENCE TO ANY PRIORITY APPLICATIONS

This application claims priority to U.S. Provisional Application No. 62/936,156, filed Nov. 15, 2019, and U.S. Provisional Application No. 62/983,896, filed Mar. 2, 2020, each of which are incorporated herein by reference. Any and all applications for which a foreign or domestic priority claim is identified in the Application Data Sheet as filed with the present application are hereby incorporated by reference under 37 CFR 1.57.

BACKGROUND

Field

This application generally relates to inflatable entertainment structures. More particularly, this application relates to inflatable structure with integrated, lockable compartments and/or air supported virtual reality headsets.

Description of Related Art

Various types of recreational play structures are available to entertain children and adults. Inflatable playhouses or inflatable bounce houses, for example, have become very popular in recent years. For many of these inflatable structures, the primary means for providing entertainment is for children and adults to either bounce in or on air inflated structure.

SUMMARY

Inflatable structures are described herein that include integrated, lockable compartments. An inflatable structure can include a plurality of inflatable walls arranged to form a room having an interior and one or more lockable compartments integrated into the plurality of inflatable walls. The lockable compartments can include a non-inflated recess formed within a thickness of the first inflatable wall and at least one flap configured to close an opening of the recess of the first lockable compartment. The at least one flap is configured to secured in a closed position with a lock. The inflatable structure can be themed, e.g., by installing themed skins on interior surfaces of the room to provide a user experience. The theme can provide clues which, when solved, allow users to pen the locked compartments. The locked compartments can provide additional clues. The inflatable structure may be an escape room, wherein users solve clues and unlock the integrated compartments to escape.

Additionally, inflatable structures or pods are described herein that are configured to provide a theater in which to play a virtual reality (VR) game. The inflatable structure can be integrated with the VR components (such as the headset, controller, computer or console, as well as other supporting components such as wiring) so that the inflatable structure can be portable and/or easy to set up and take down. The headset can be supported by the inflatable structure. For example, wiring can extend from the ceiling of the structure to the headset allowing the user to play VR games without becoming entangled in the headset. The inflatable structure can also include additional components such as speakers, displays, timers, and/or cooling units to further facilitate the experience. In some embodiments, the inflatable structure can also include pop-out seating elements or walls. The pop-out seating elements or walls can be integrated into the structure such that they can easily be set up or hidden away as desired.

In some embodiments, the inflatable structure described herein can include integrated, lockable compartments and also be configured with provide a theater in which to play a virtual reality (VR) game. The inflatable structure can be integrated with the VR components. That is, the features described herein can all be integrated into a single inflatable in some embodiments.

The inflatable structures described herein, as well as related devices, systems, and methods, have innovative aspects, no single one of which is indispensable or solely responsible for their desirable attributes. This summary addresses only certain features or aspects of the inflatable structures described in this application and should not be construed as limiting.

BRIEF DESCRIPTION OF THE DRAWINGS

The above-mentioned aspects, as well as other features, aspects, and advantages of the inflatable structures disclosed herein will now be described in connection with various embodiments and with reference to the accompanying drawings. The illustrated embodiments are merely examples and are not intended to be limiting. Like reference numbers and designations in the various drawings indicate like elements.

As shown in FIGS. 28-31 the roof section includes the central vault in the illustrated embodiment.

FIG. 39A also illustrates that the inflatable structure can include an air supported virtual reality headset.

DETAILED DESCRIPTION

Figure 1:
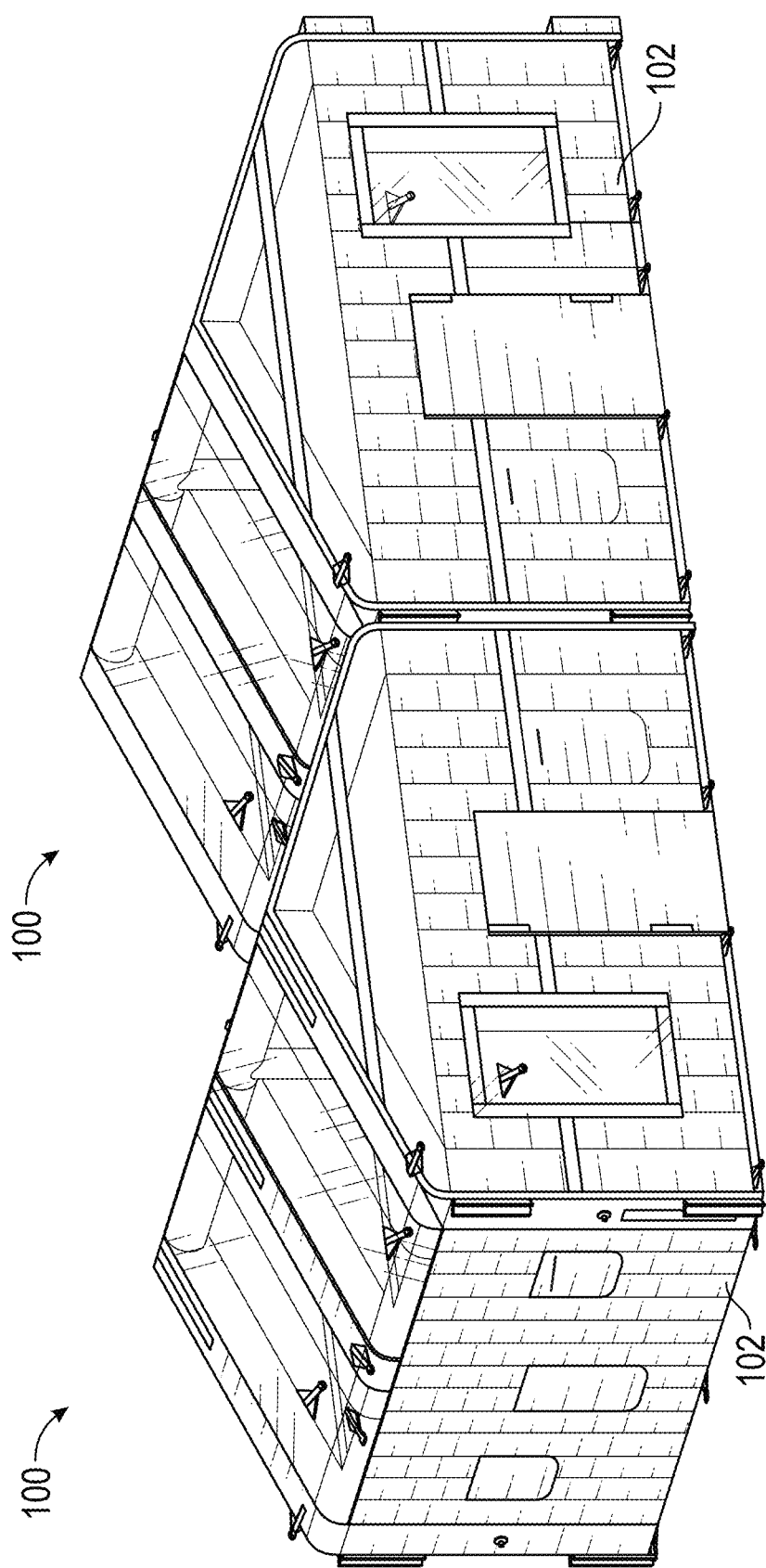
FIGS. 1 and 2 are top and bottom perspective views an embodiment of an inflatable structure that includes integrated lockable compartments.
Figure 2:
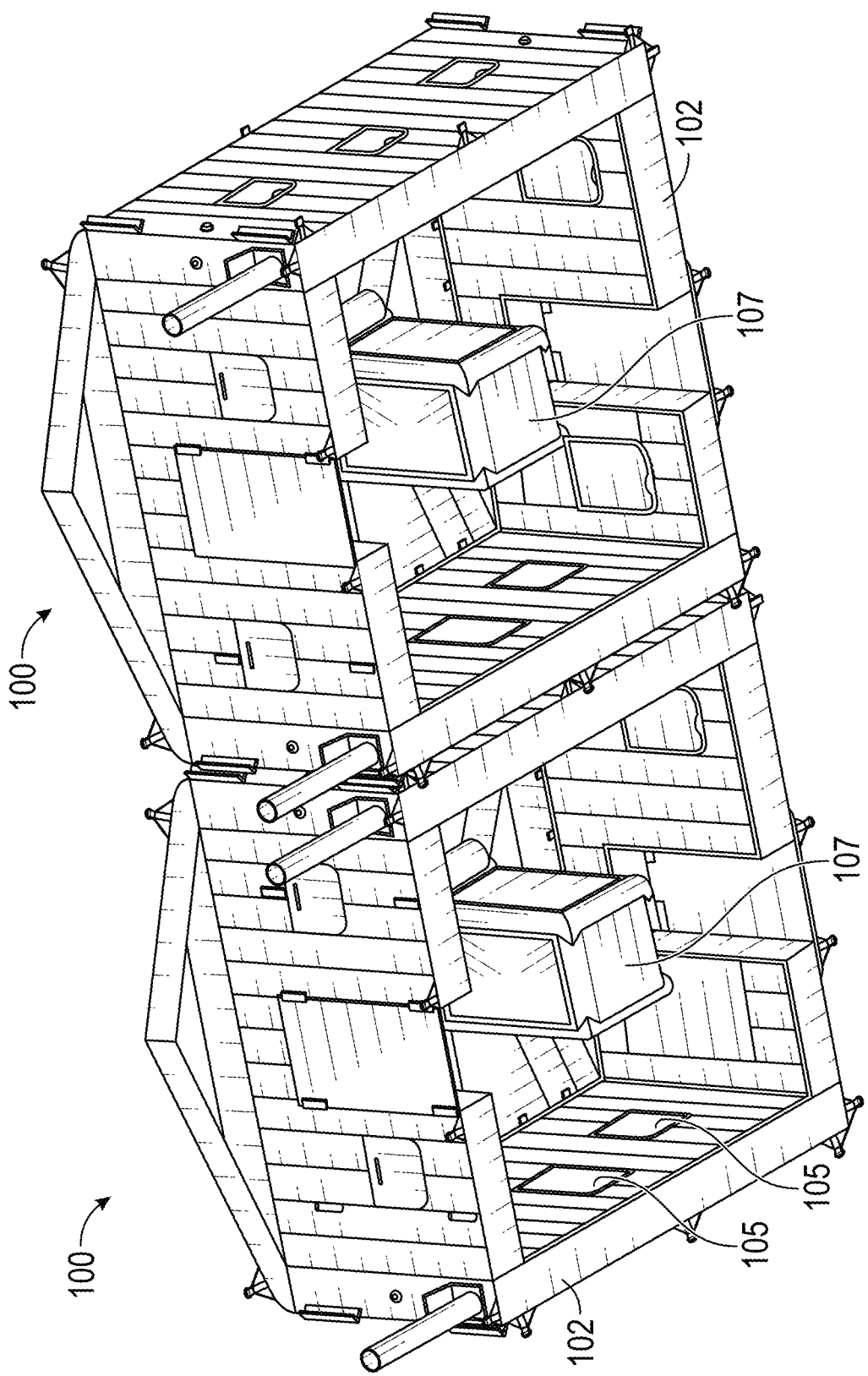
Figure 3:
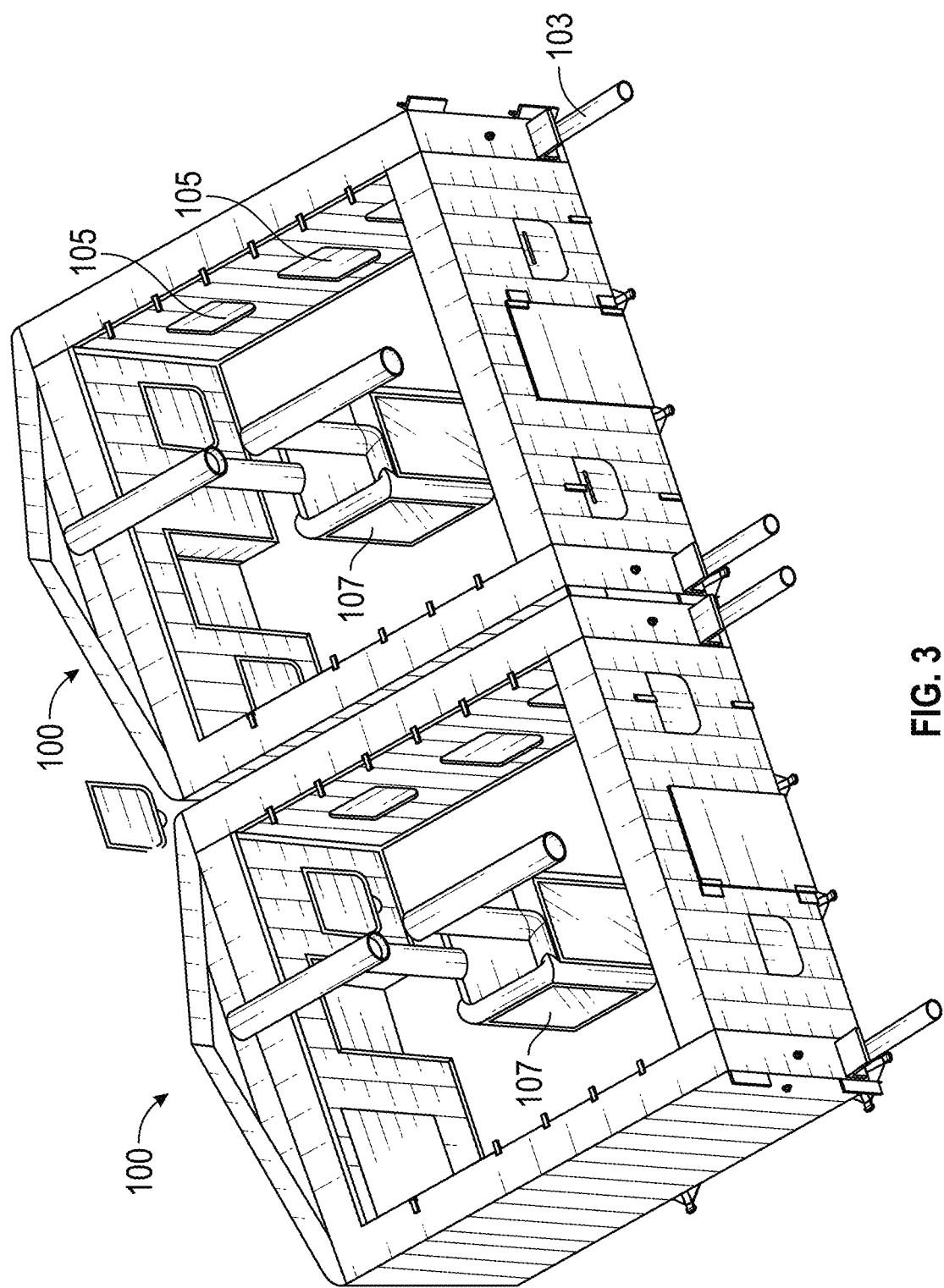
FIG. 3 is a top perspective view of the inflatable structure of FIG. 1 with a portion of the roof removed to illustrate a central vault thereof.

FIGS. 1 and 2 are top and bottom perspective views an embodiment of an inflatable structure 100 that includes integrated lockable compartments 105 (lockable compartments are shown, for example, in FIGS. 2-6). In FIGS. 1-3, two inflatable structures 100 are shown side by side. This arrangement is not necessary and a single inflatable structure 100 can be provide. As will be described more fully below, the inflatable structure 100 with the lockable compartments 105 can be configured as an escape room, wherein users solve puzzles in order to advance through the experience.

Escape rooms are increasingly popular. Generally, however, such room are not portable and require extensive construction and set up. The inflatable structure 100 described herein can be configured as an escape room that is easily portable and can be set up quickly and efficiently.

The lockable compartments 105 can be integrated into the theme of the escape room such that they must be unlocked to gain access to tools or other clues to progress through the experience. In some instances, a group of users must solve all the puzzles to escape the room. In some embodiments, the experience lasts for a duration (e.g., 15 minutes, 30 minutes, 60 minutes, etc.) and the group of users has that amount of time in which to escape. In other embodiments, the users are attempting to solve as many puzzles as possible within the time limit and their score is based on the number of puzzles solved.

Figure 5:
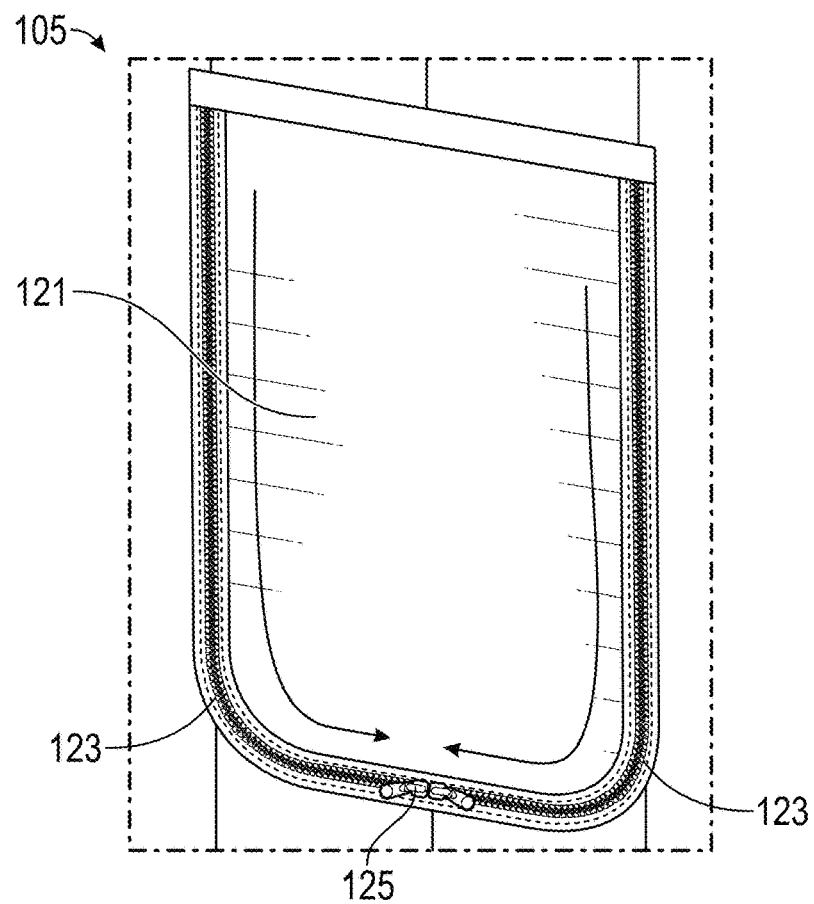
FIGS. 5 and 6 illustrate an embodiment of a lockable compartment that can be integrated within an inflatable wall of the inflatable structure of FIG. 1
Figure 6:
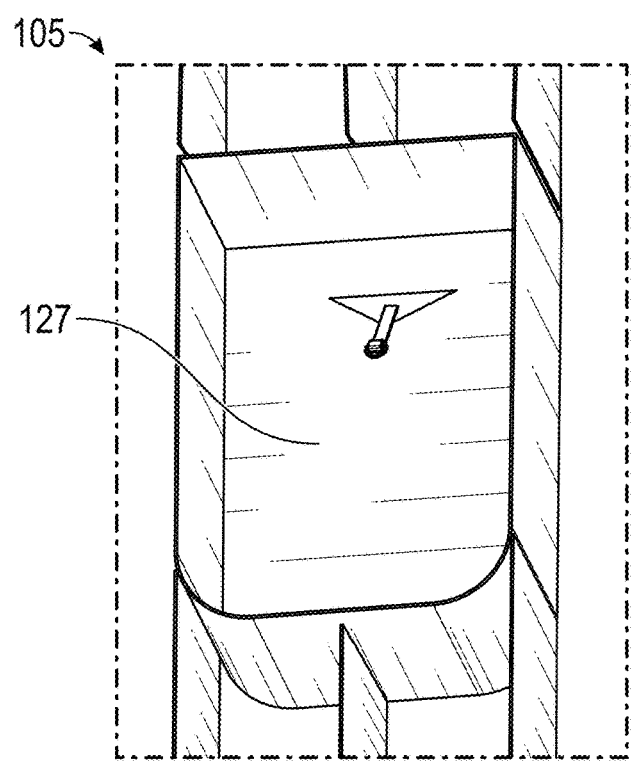

As shown in FIGS. 1 and 2, the inflatable structure 100 comprises a plurality of inflatable walls 102 that are arranged so as to form one or more rooms when inflated. The inflatable structure 100 and inflatable walls 102 can include one or more doors or windows as illustrated, for example. As shown in FIG. 2, the inflatable walls 102 can include lockable compartments 105 formed therein. The lockable compartments 105 can be integrated into a thickness of the inflatable walls. The lockable compartments 105 can comprise non-inflated recesses that are closable and lockable. In some embodiments, the lockable compartments 105 are lockable using one or more mechanical, electrical, or electromechanical locks. An example lockable compartment will is shown in FIGS. 5 and 6, which are described in more detail below. The lockable compartments 105 can be positioned on any of the inflatable walls 102. Each inflatable wall 102 can include one, two, three, four, five or more integrated lockable compartments.

FIG. 3 is a top perspective view of the inflatable structure 100 with a portion of the roof removed to illustrate a central vault 107 thereof. As will be described below, one or more lockable compartments can also be integrated into the central vault 107. The central vault 107 can comprise an inflatable structure that is connected to the remainder of the inflatable structure 100. When inflated, the central vault 107 can be configured to rest on the ground, such that the ground supports the weight of the central vault. In other embodiments, the central vault 107 can be suspended from the roof. The central vault 107 can be themed with the rest of the inflatable structure to provide a themed escape room experience. Although described as a "central" vault, the central vault 107 need not be located directly in the center of the inflatable structure 100. The central vault 107 can be positioned anywhere within an interior of the inflatable structure 100. In some embodiments, the central vault 107 can be omitted or more than one central vault 107 can be included.

Figure 4:
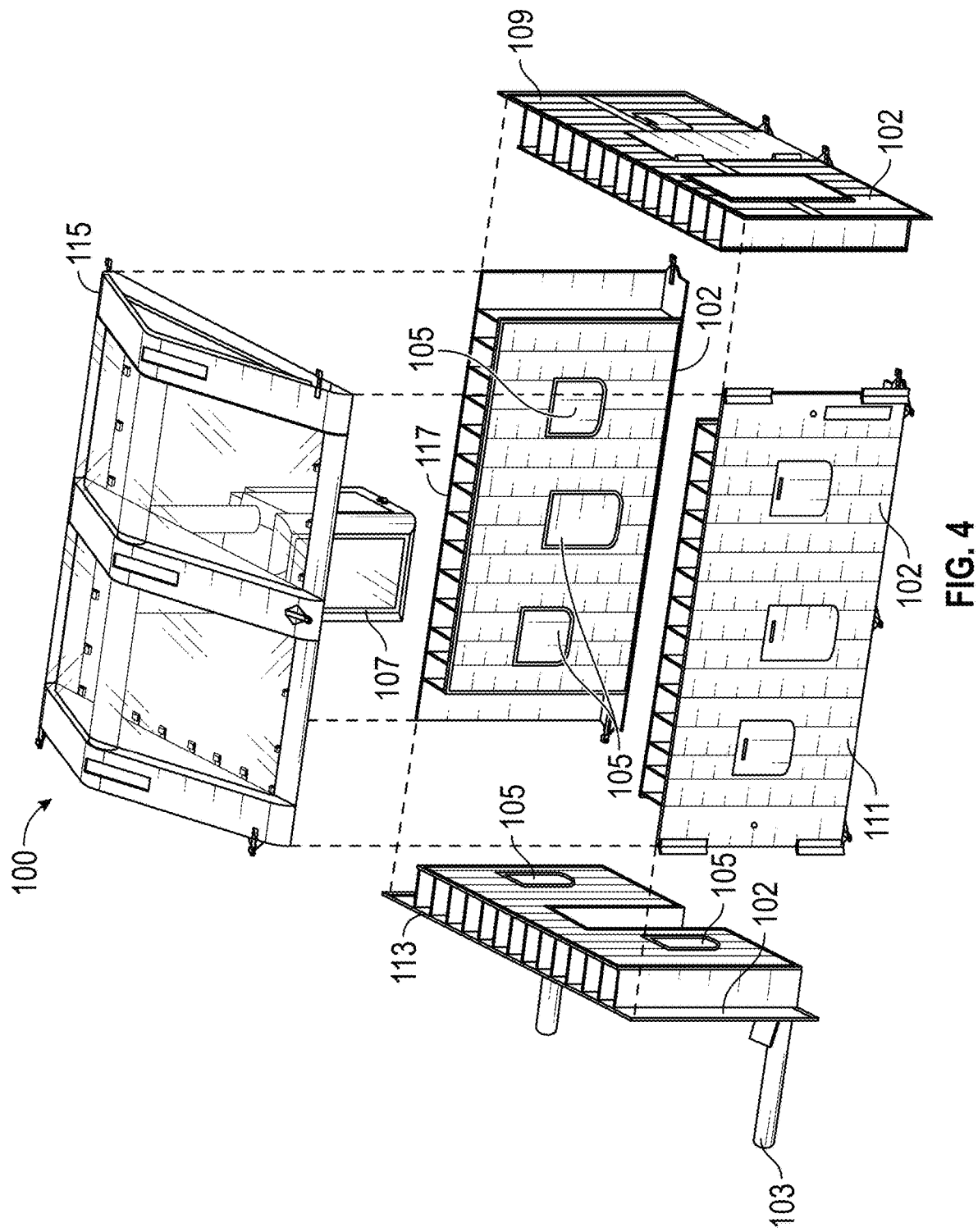
FIG. 4 is an exploded perspective view of the inflatable structure of FIG. 1.

FIG. 4 is an exploded perspective view of the inflatable structure 100. In the illustrated embodiment, the inflatable structure 100 comprises a front section 109, a first side section 111, a back section 113, a roof section 115, and a second side section 117 as illustrated. Each of these sections can be manufactured from a plurality of panels as shown, for example, in FIGS. 10-36 below.

In some embodiments, each section is pneumatically connected such that the entire inflatable structure 100 can be inflated and deflated at once, for example, by connecting an air source to an air inlet 103 of the structure. In an alternative embodiment, each section can be separately inflated and then assembled together to form the inflatable structure 100.

In the illustrated embodiment, the central vault 107 is part of the roof section 115. For example, as shown the central vault 107 is connected to the roof section through one or more inflatable tubes. The inflatable tubes can be configured such that the central vault 107 is positioned on the ground when inflated.

FIGS. 5 and 6 illustrate an embodiment of a lockable compartment 105 that can be integrated within an inflatable wall 102 or the central vault 107 of the inflatable structure 100. As shown in FIG. 5, the lockable compartment 105 may comprise a flap 121 that can be secured in a closed position (as shown in FIG. 5) to lock the lockable compartment 105. In the illustrated embodiment, the flap 121 is attached to the remainder of the inflatable wall with two zippers 123. Other numbers of zippers 123 (e.g., one or more than two) may also be used. Further, other closure mechanisms may also be used. In the illustrated embodiment, the zippers 123 can be opened to allow a user to lift the flap 121 to access the lockable compartment 105.

The zippers 123 can include tabs 125. The tabs 125 can be configured to be secured with a lock. For example, a lock can be inserted through the tabs 125 to prevent a user from opening the zippers 123 and lifting the flap 121. During use, users may solve puzzles and be provided with clues in order to open the lock and access the lockable compartment 105.

FIG. 6 illustrates an embodiment of the internal structure of a lockable compartment 105. As shown, the lockable compartment 105 can include a recess 127 formed in the inflatable wall 102. The recess 127 can be formed in the thickness of the wall. The recess 127 may comprise a non-inflated recess. For example, the recess 127 might not be filled with air as the inflatable wall is inflated. The recess 127 may attached to the back surface of the inflatable wall 102 and/or one or more internal baffles of the inflatable wall 102. In some embodiments, the recess may include one or more attachment mechanism (e.g., the illustrated D-ring) to allow items to be secured within the lockable compartment.

Other structures for the lockable compartments 105 integrated into the inflatable walls 102 and/or central vault 107 are also possible.

Figure 7:
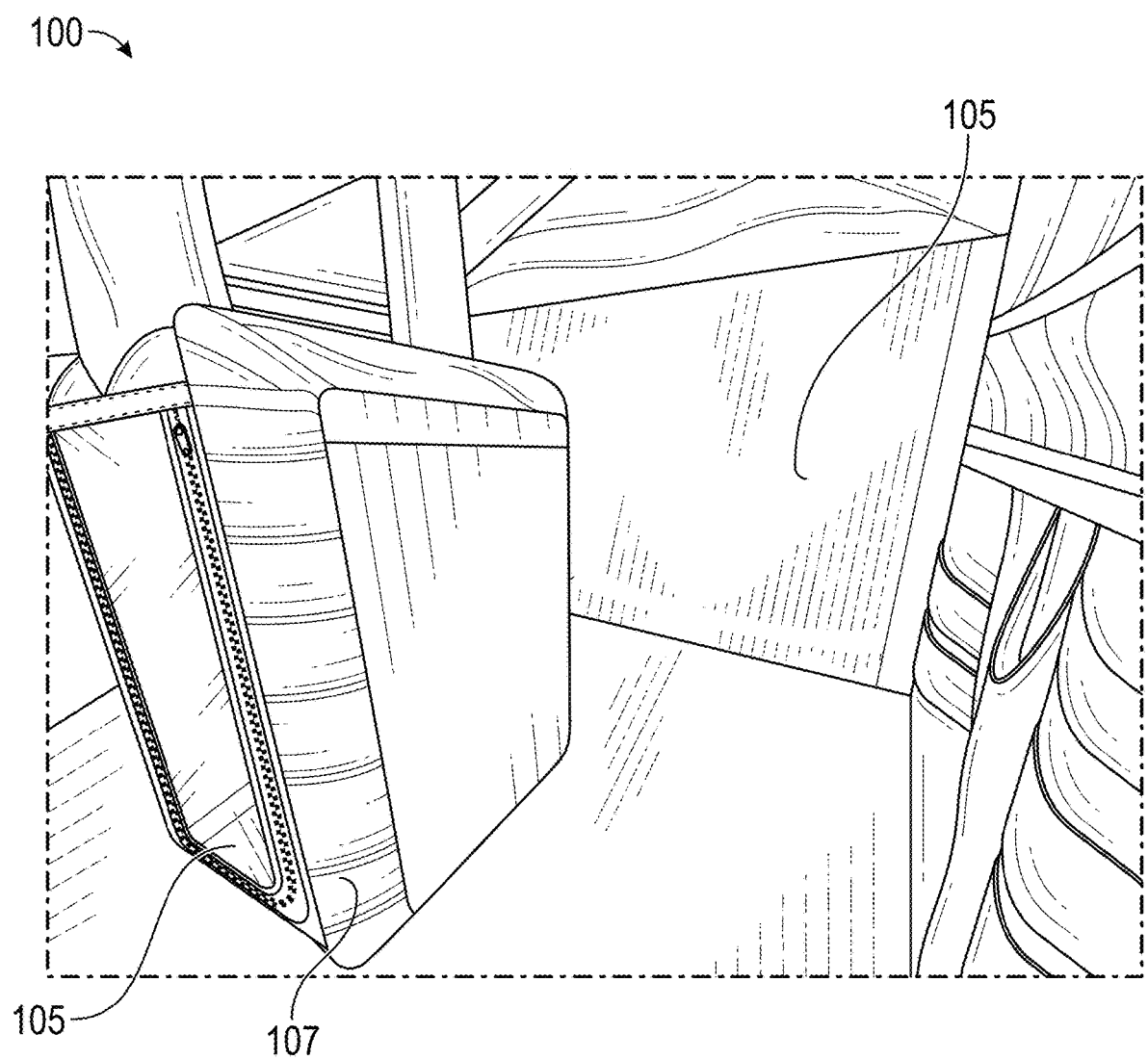
FIGS. 7-9 illustrate an interior of the inflatable structure of FIG. 1 that has been skinned with an example theme.
Figure 8:
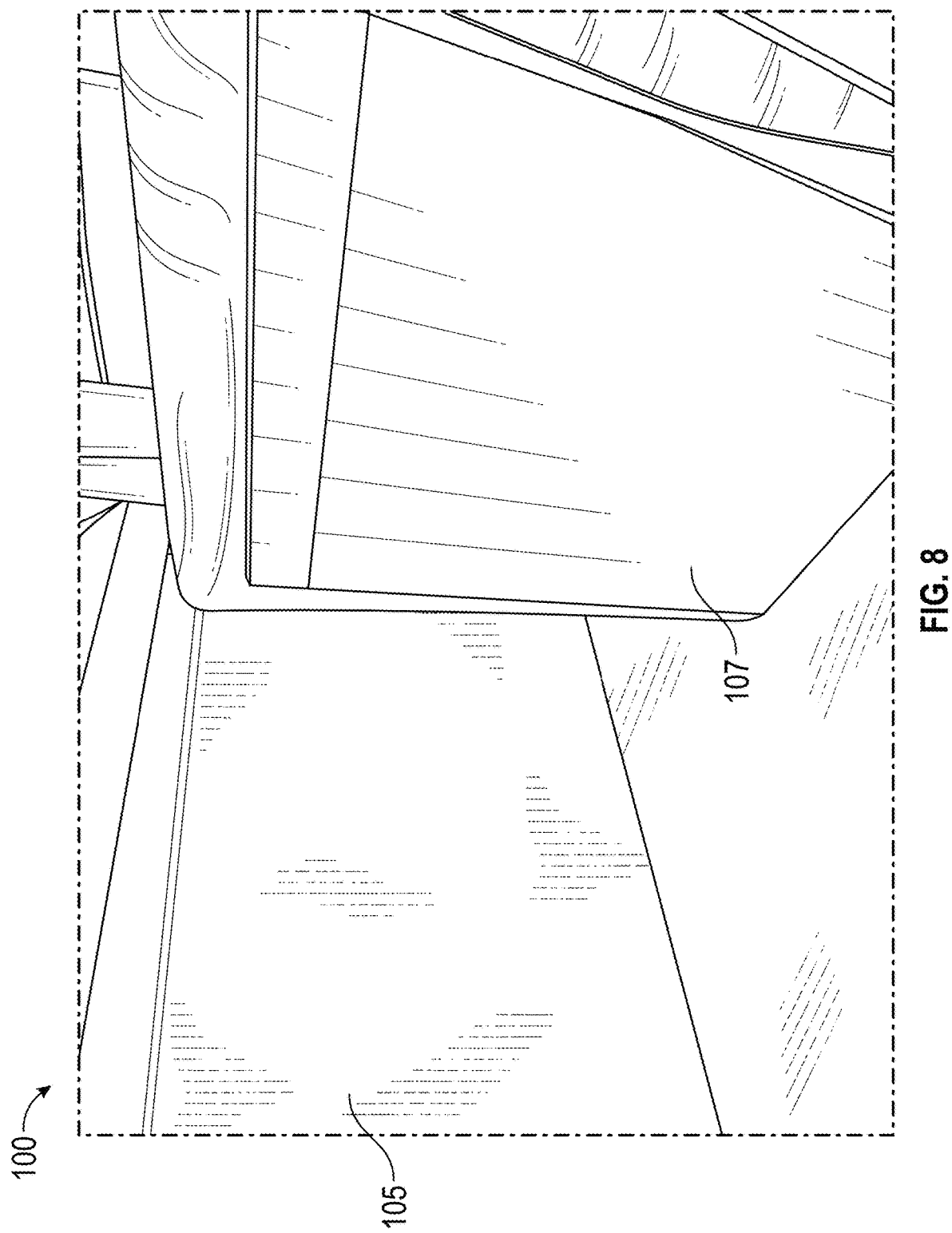
Figure 9:
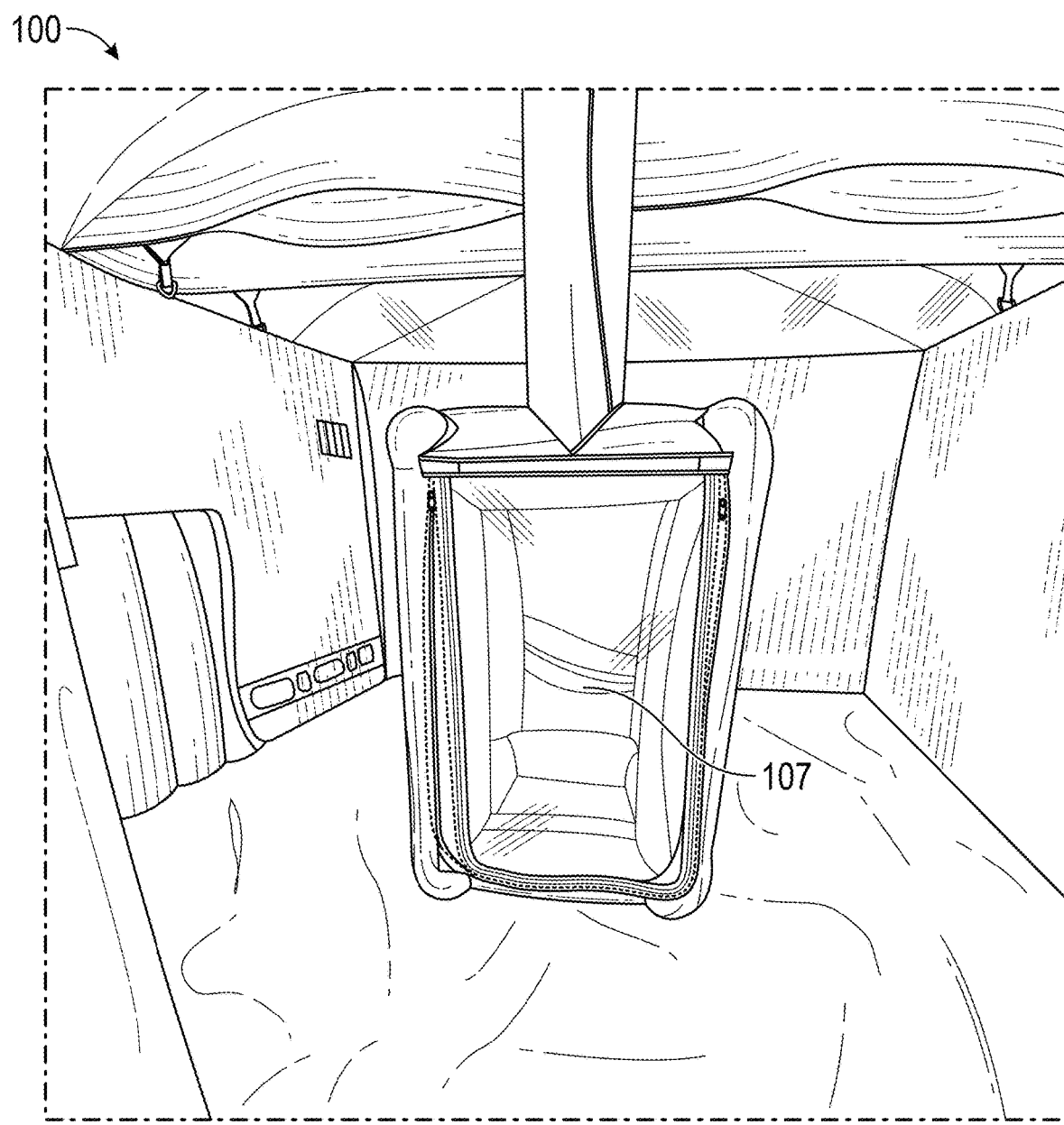
Figure 10:
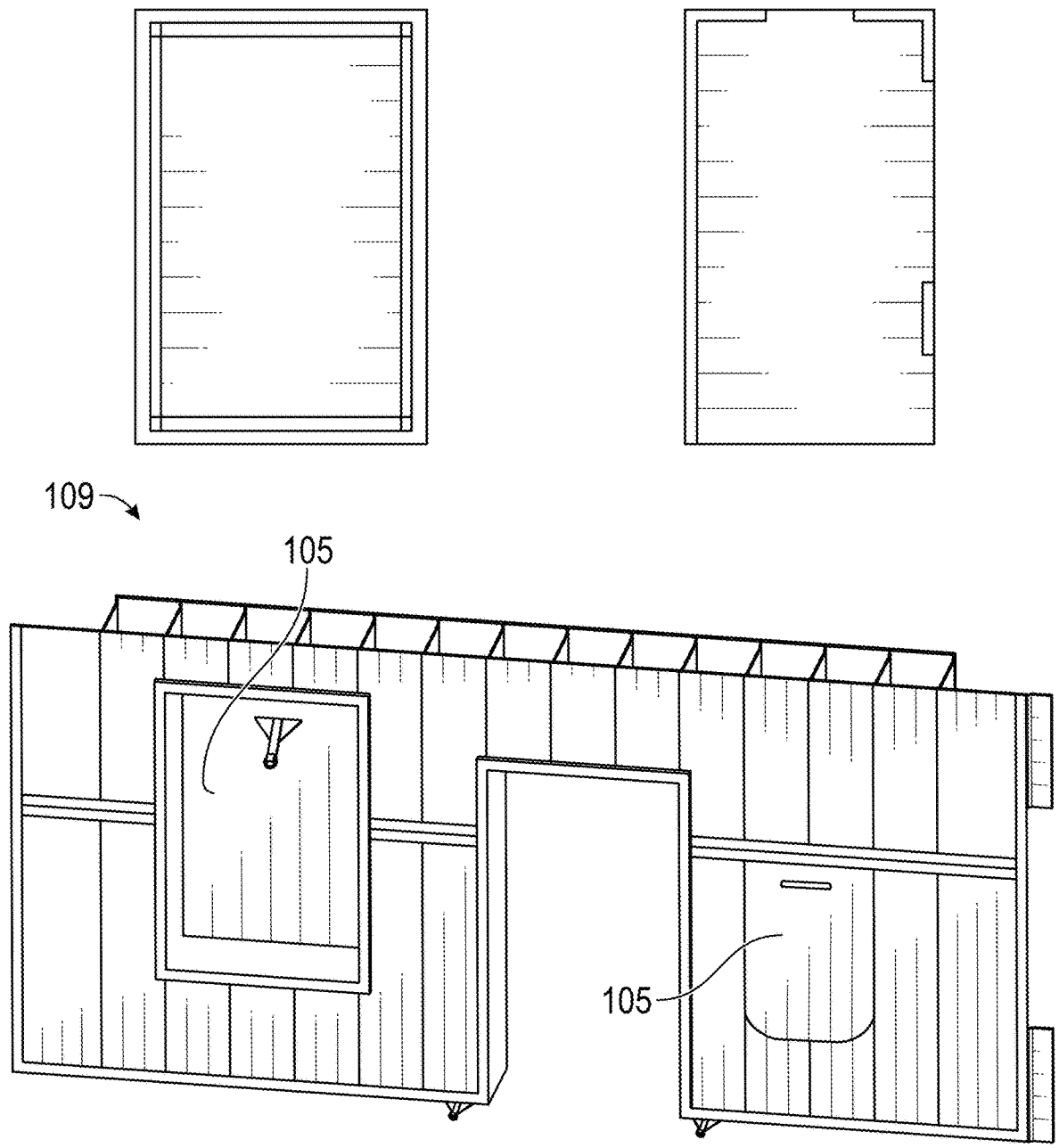
FIGS. 10-14 illustrate various views showing an example arrangement of various panels of a front wall section of the inflatable structure of FIG. 1 according to another embodiment.
Figure 11:
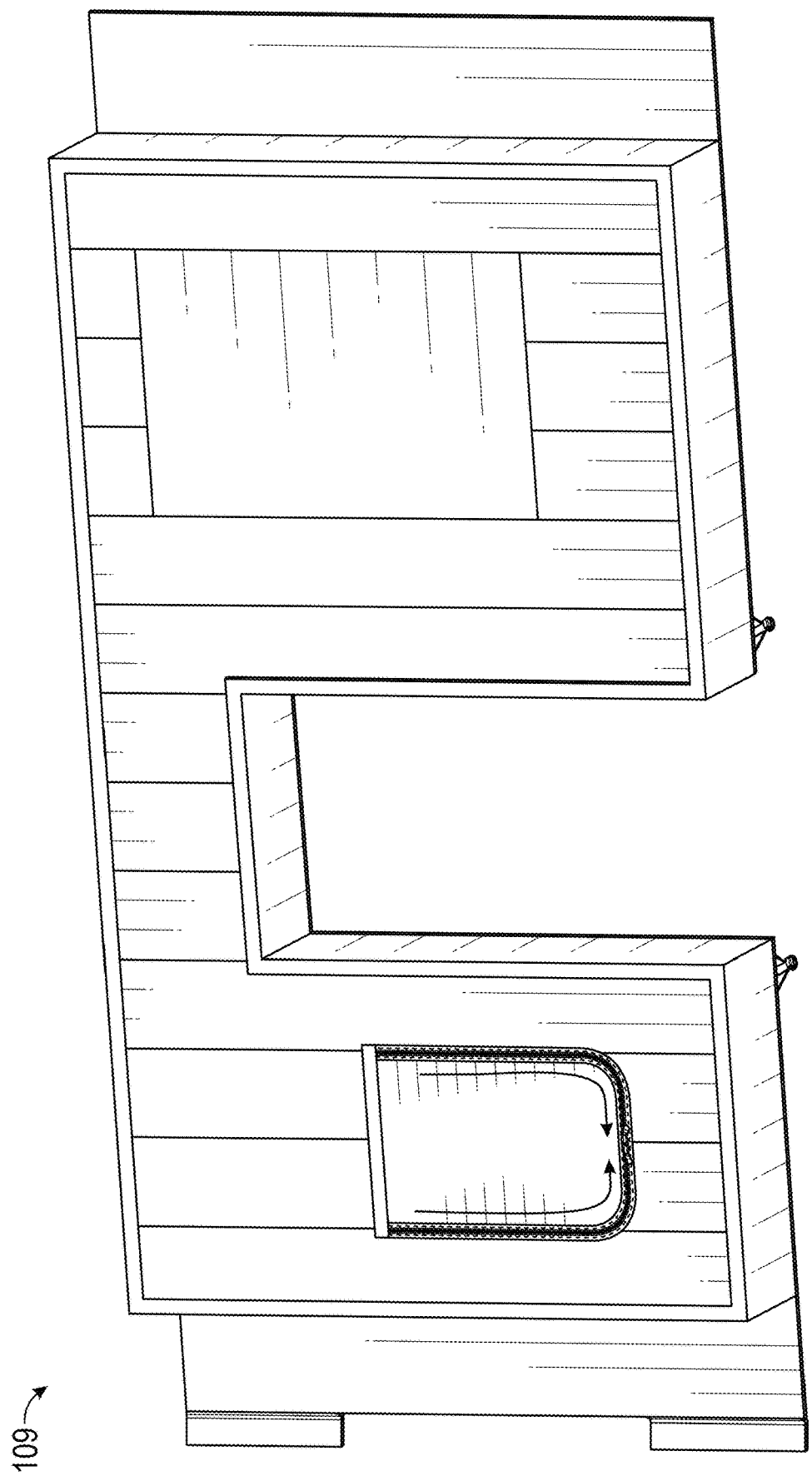
Figure 12:
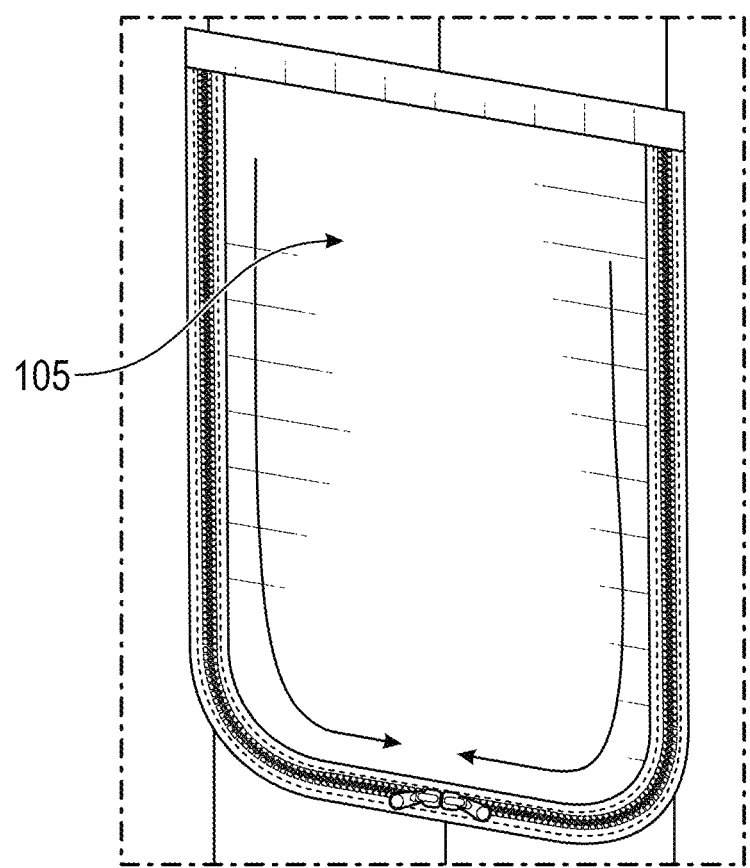
Figure 13:
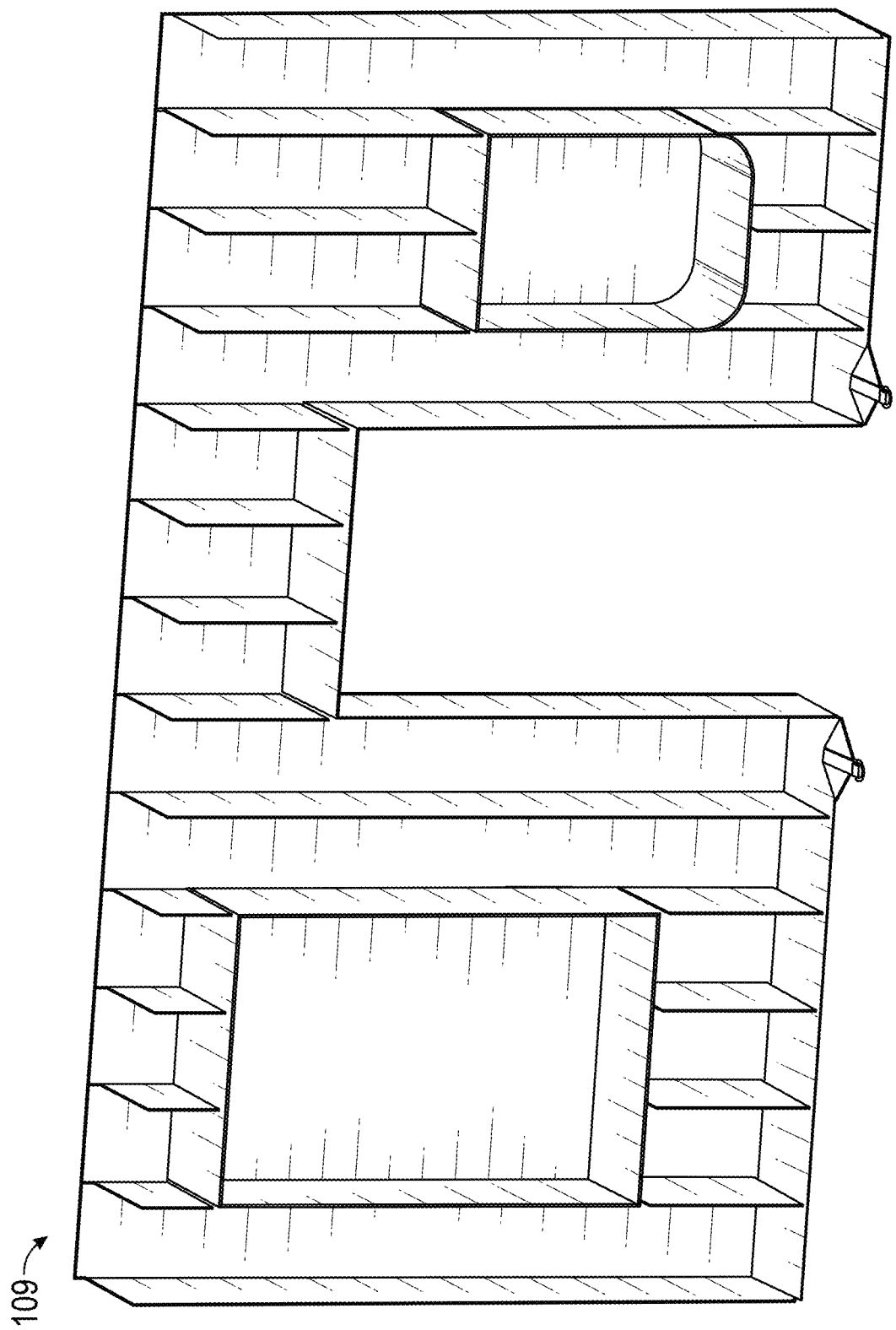
Figure 14:
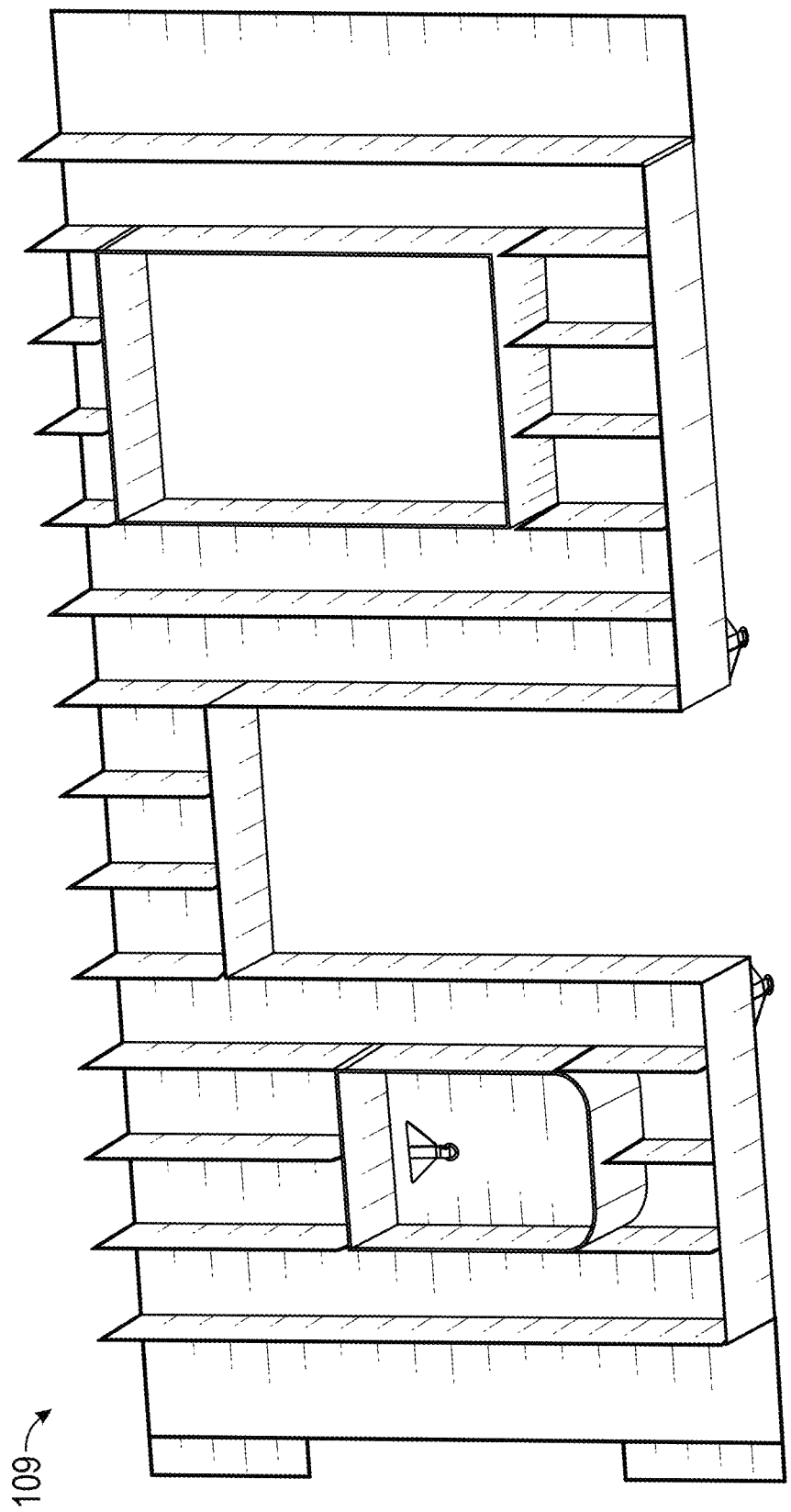
Figure 15:
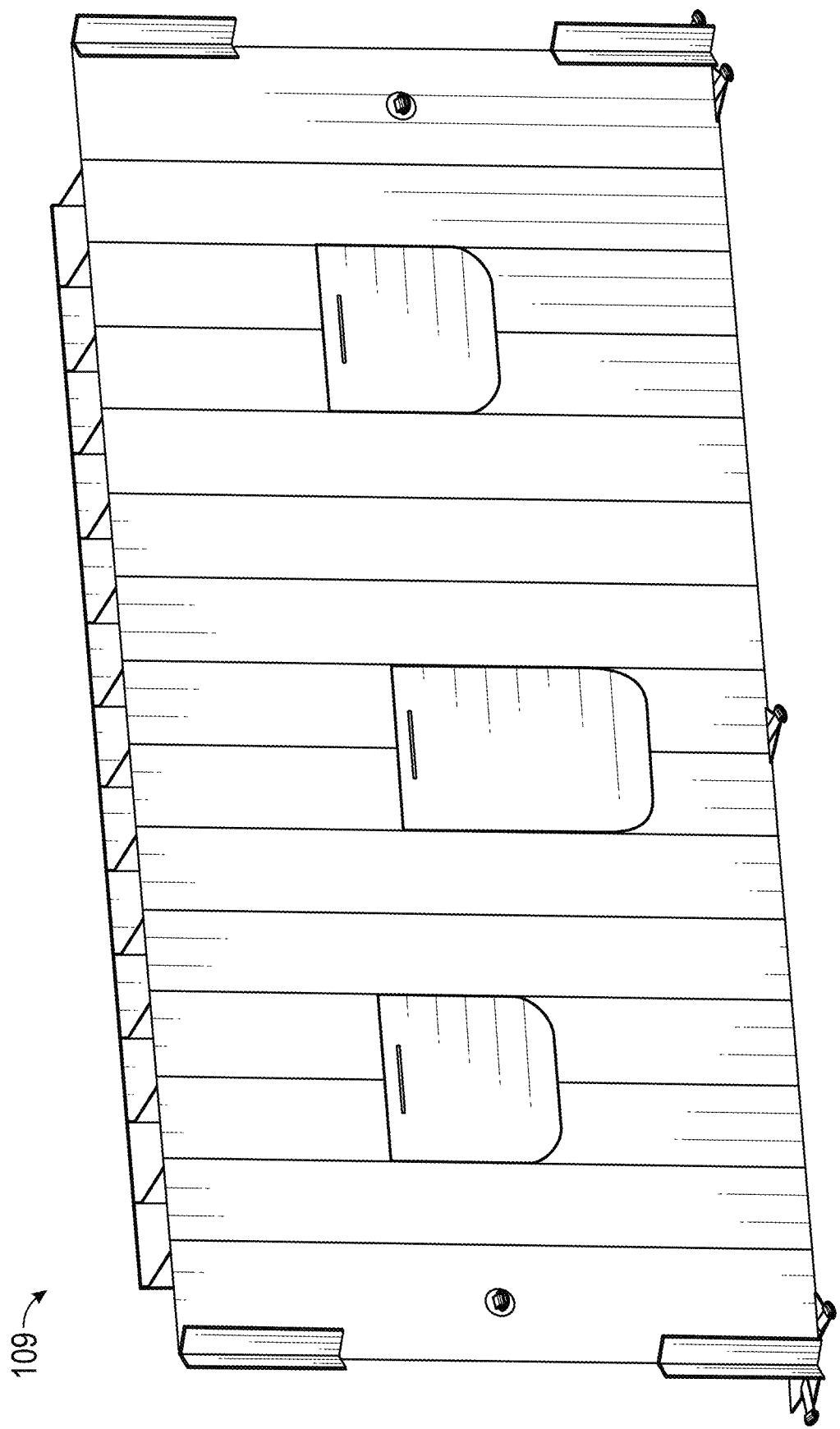
FIGS. 15-19 illustrate various views showing an example arrangement of various panels of an outer wall section of the inflatable structure of FIG. 1 according to another embodiment.
Figure 16:
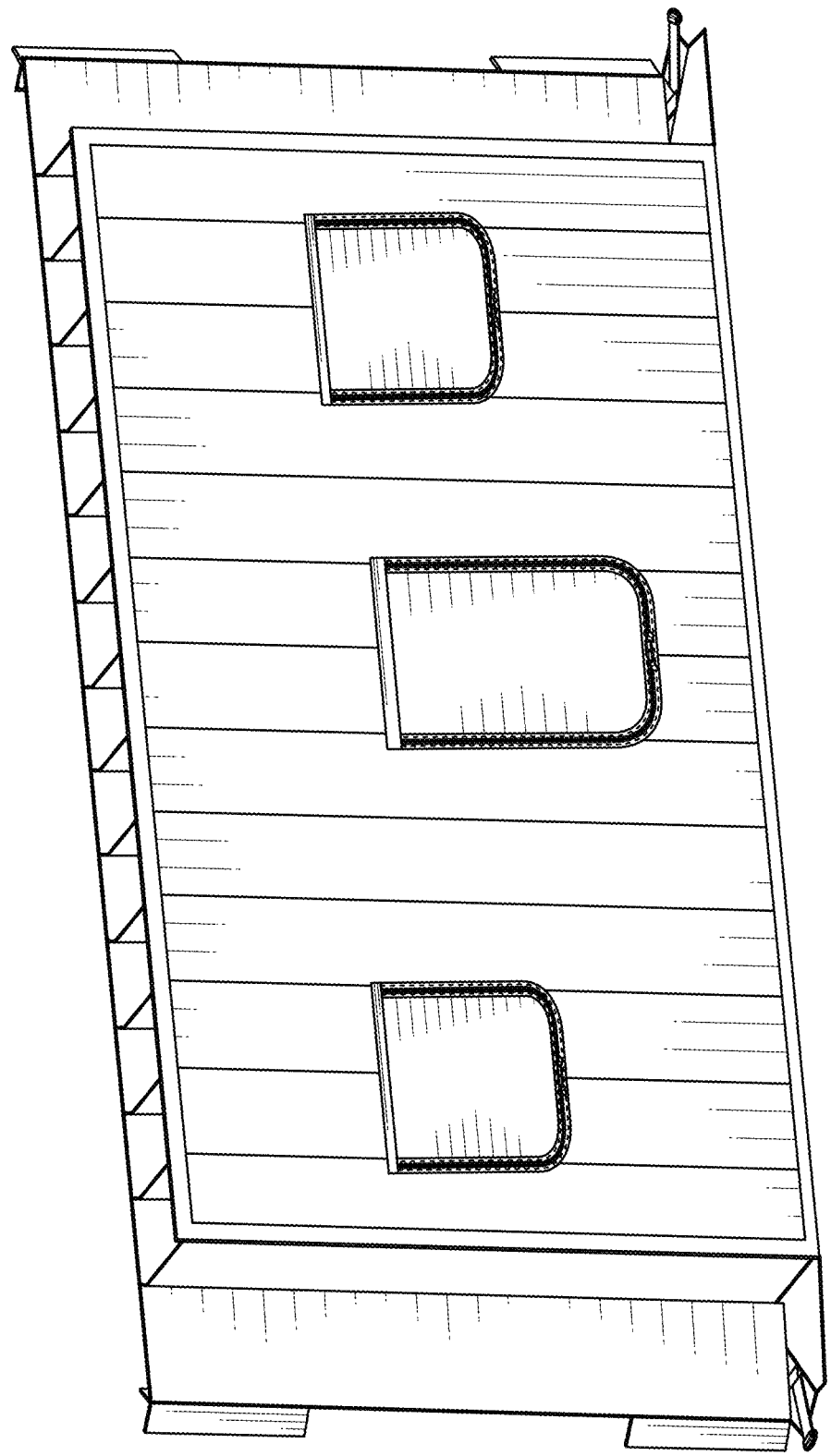
Figure 17:
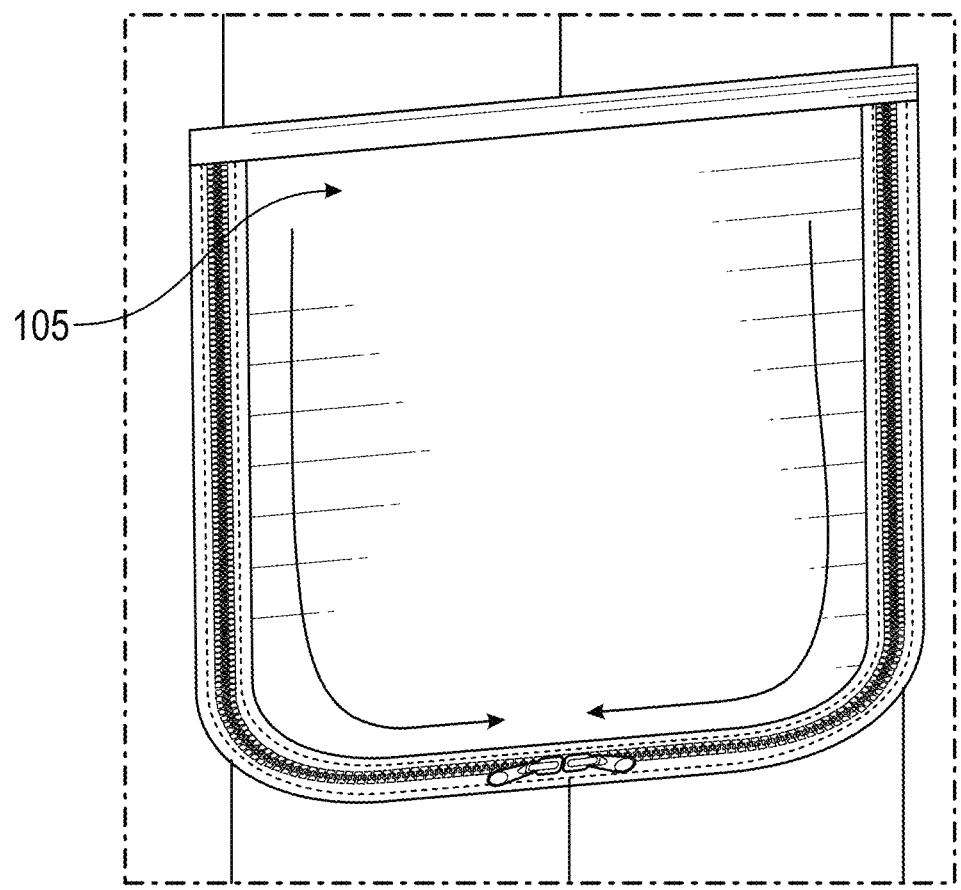
Figure 18:
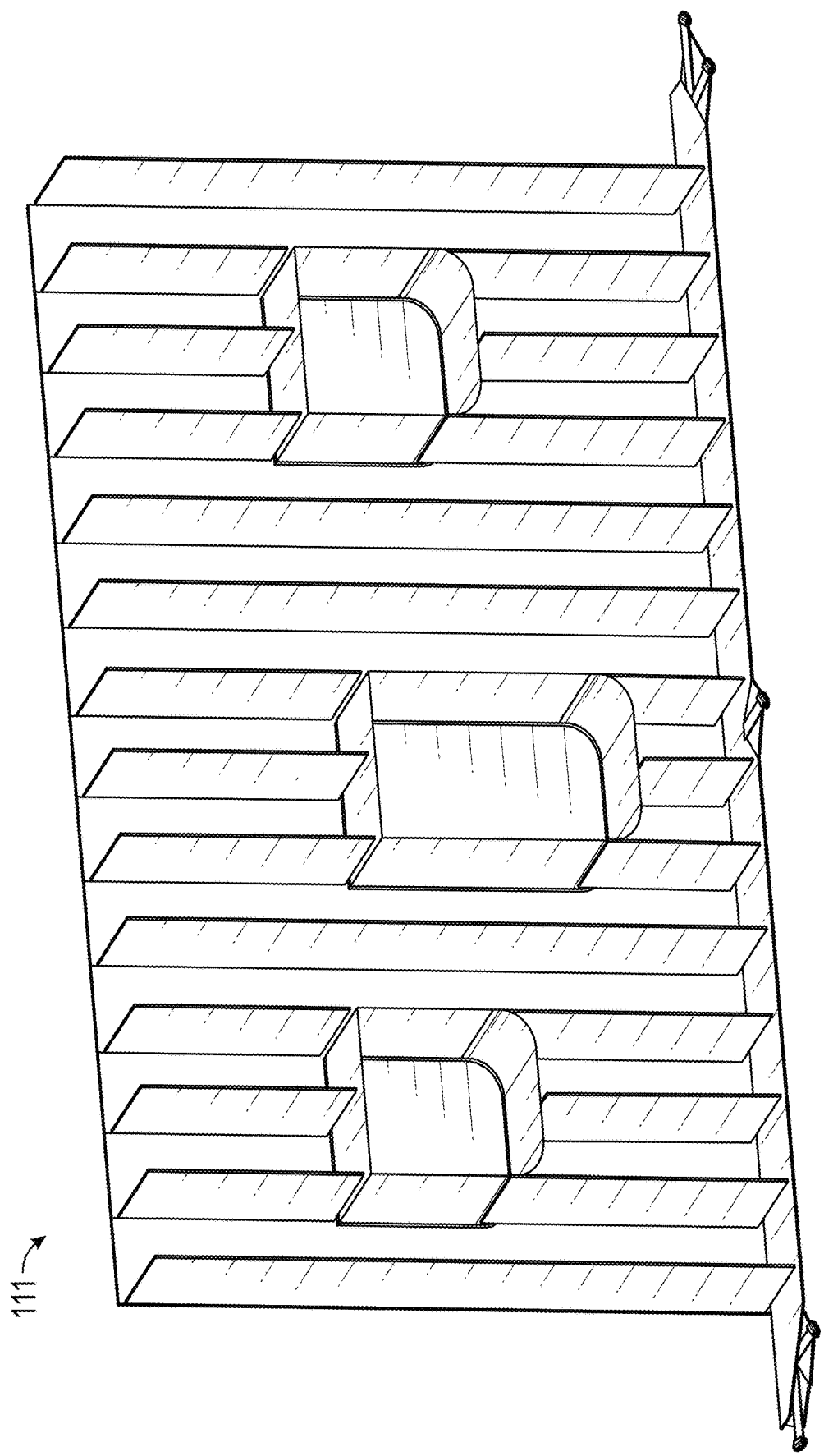
Figure 19:
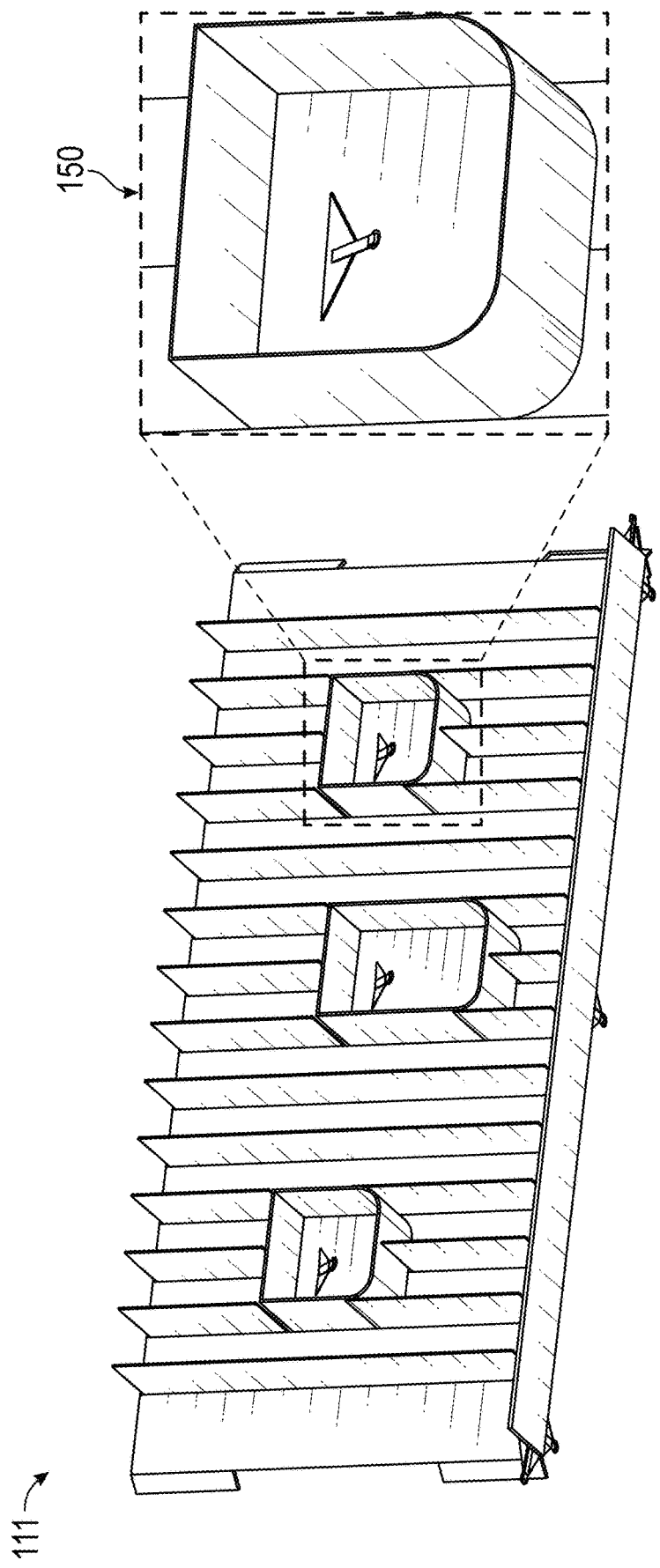
Figure 20:
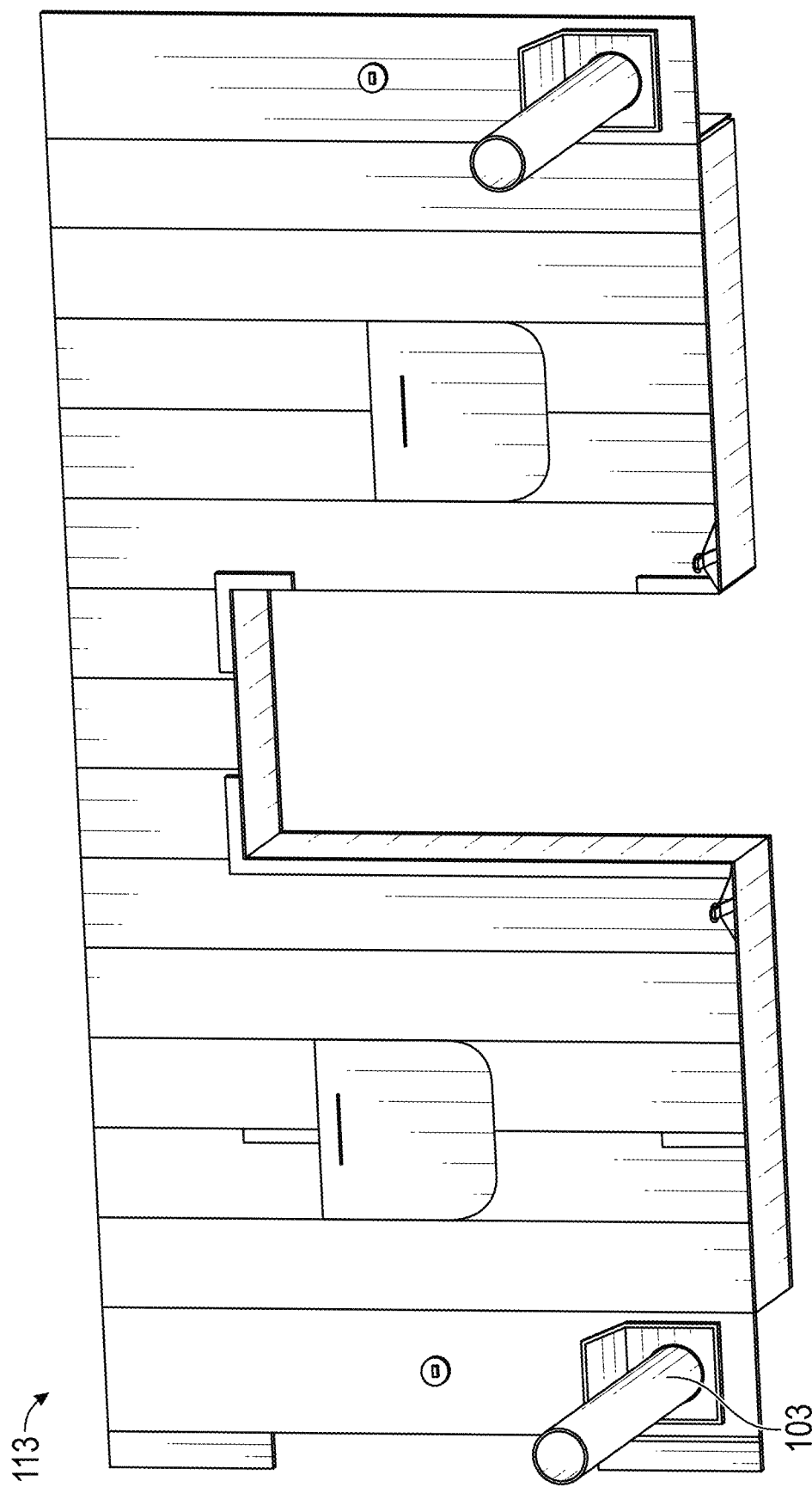
FIGS. 20-25 illustrate various views showing an example arrangement of various panels of a rear wall section of the inflatable structure of FIG. 1 according to another embodiment.
Figure 21:
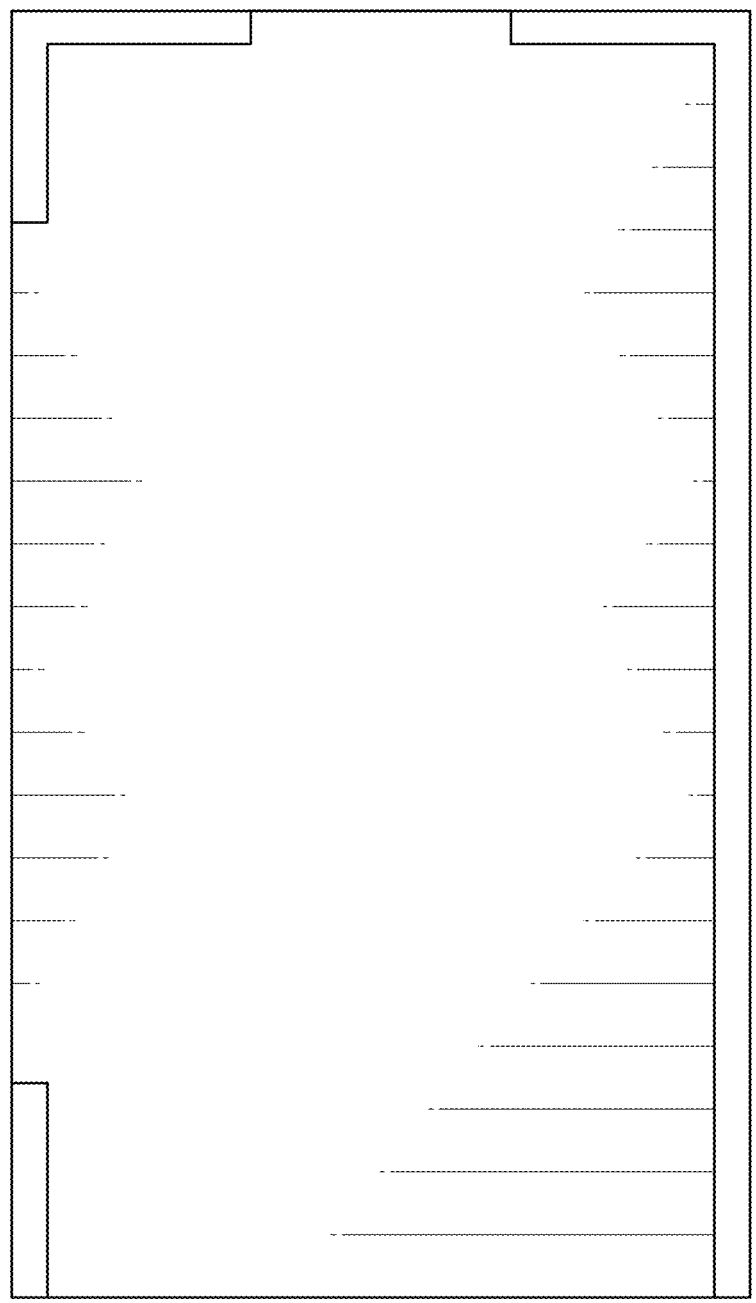
Figure 22:
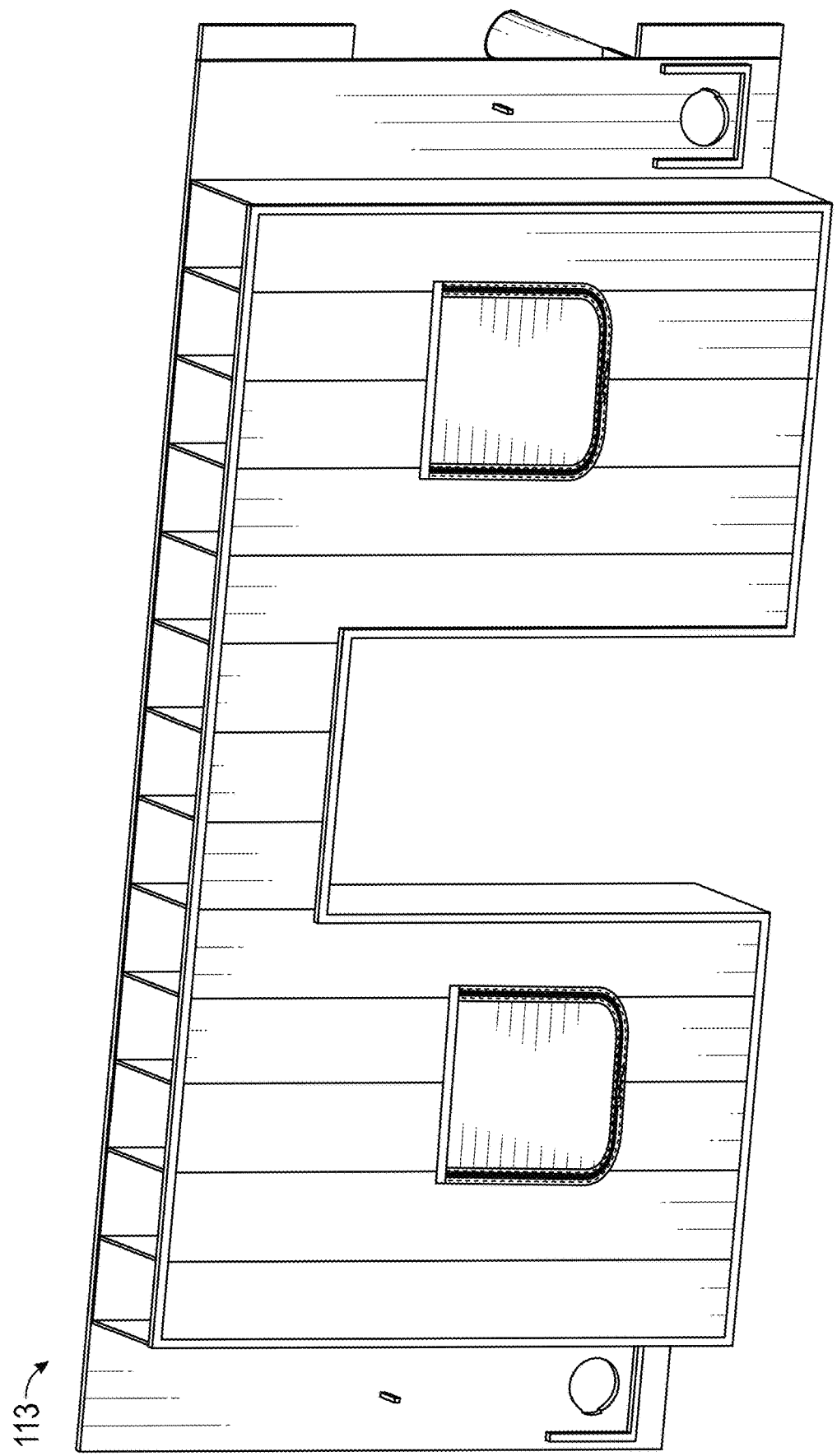
Figure 23:
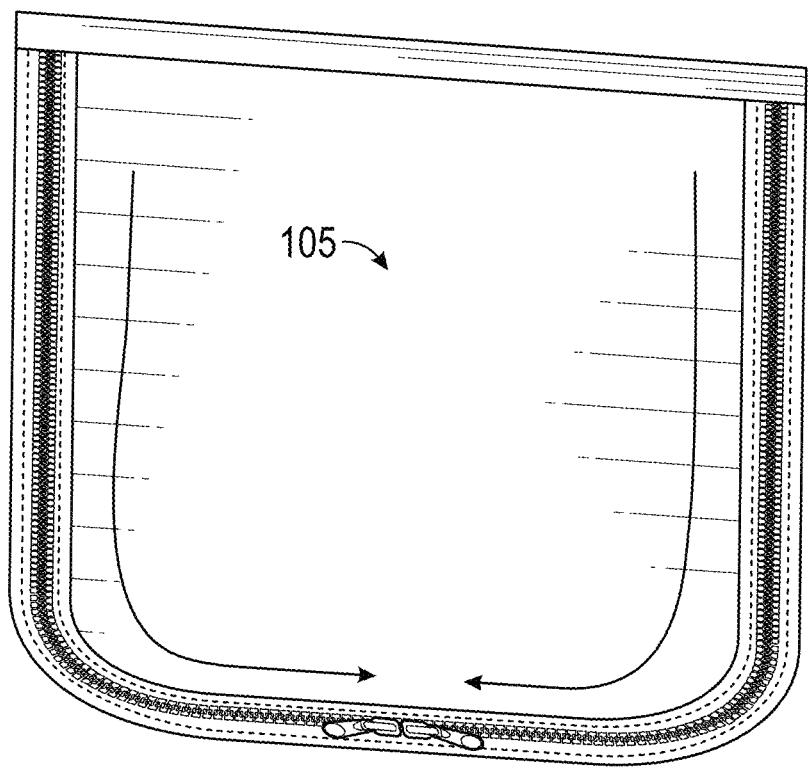
Figure 24:
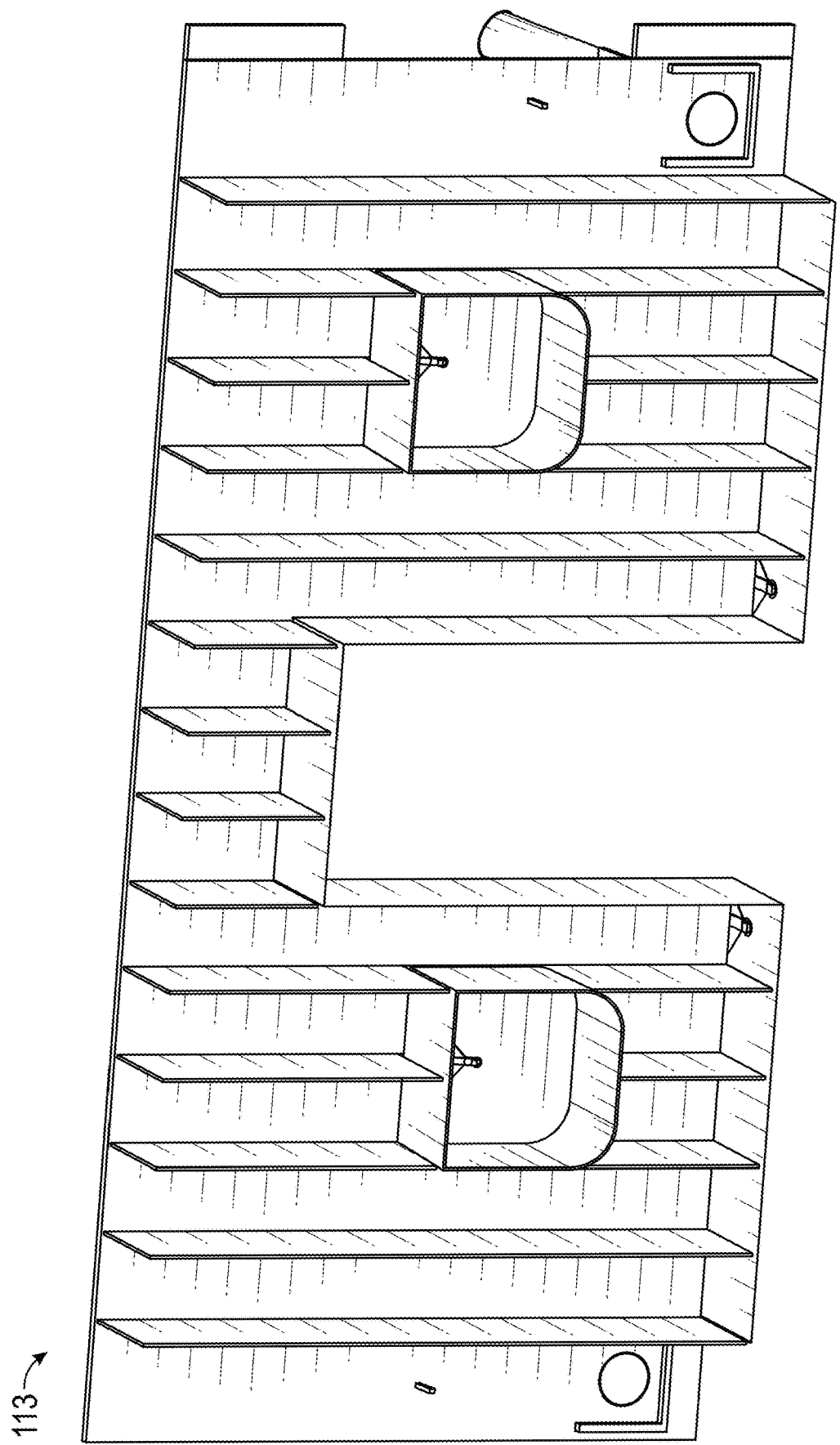
Figure 25:
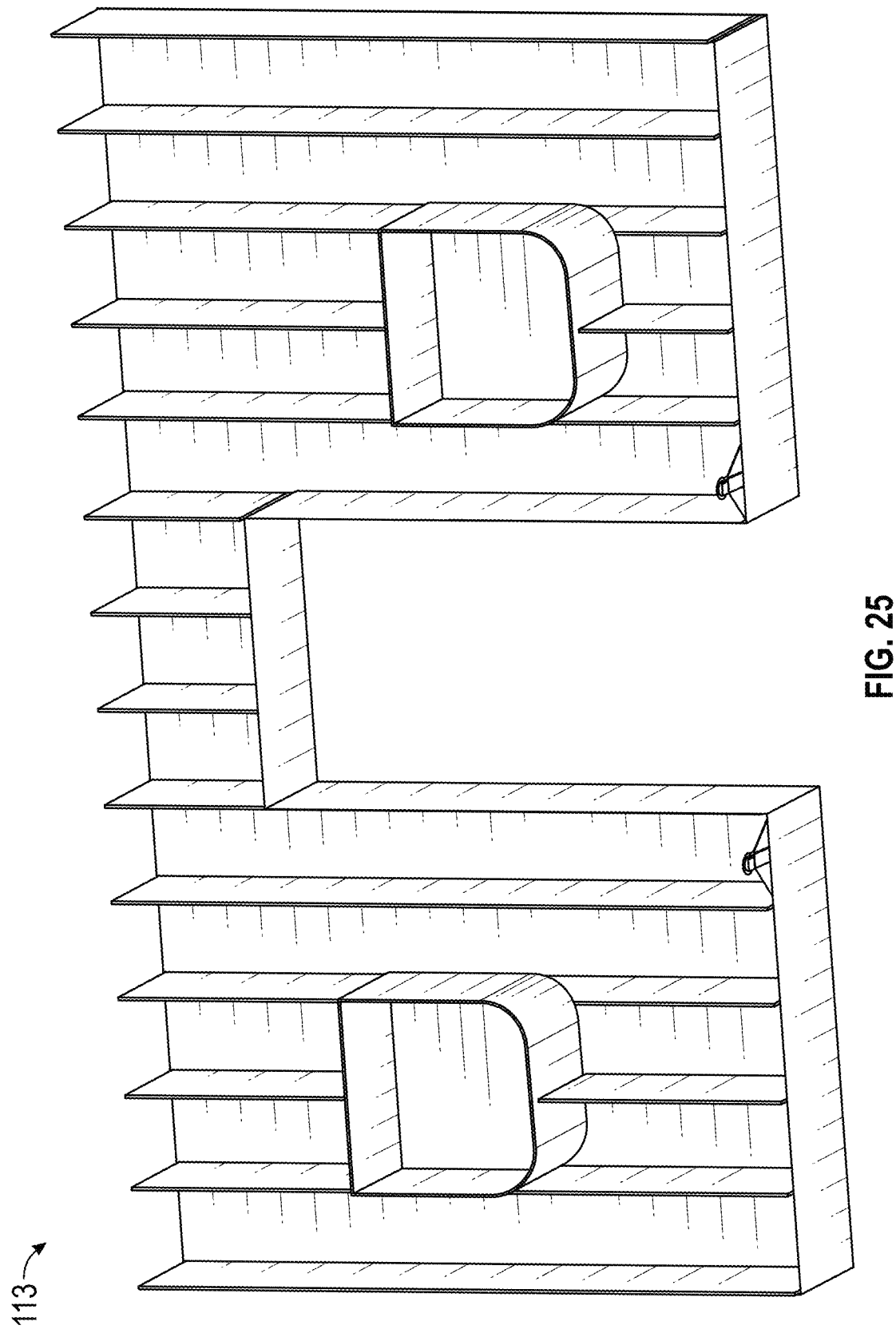
Figure 26:
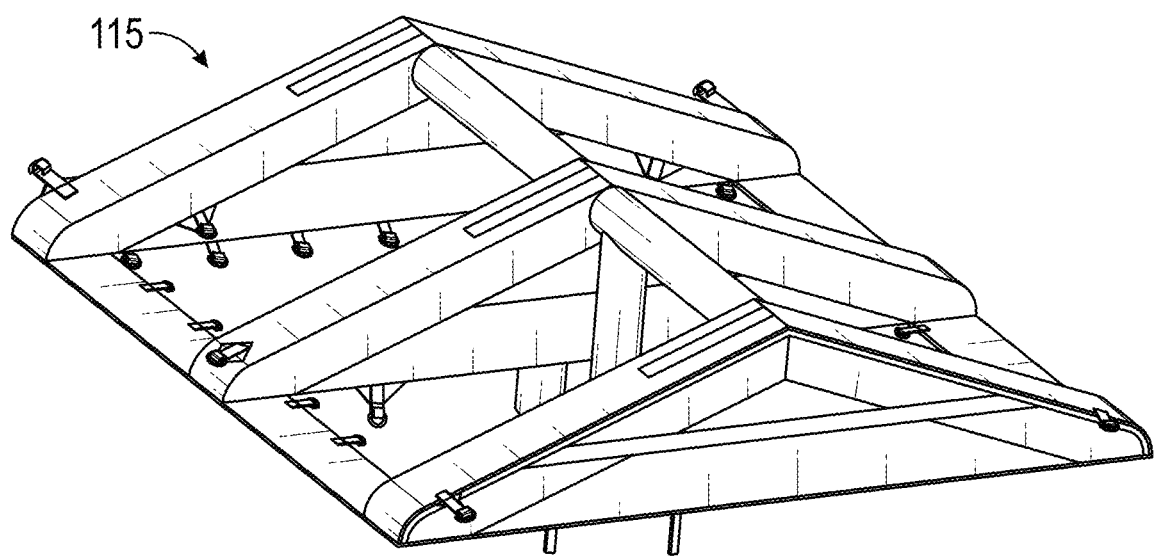
FIGS. 26-31 illustrate various views showing an example arrangement of various panels of a roof section of the inflatable structure of FIG. 1 according to another embodiment.
Figure 27:
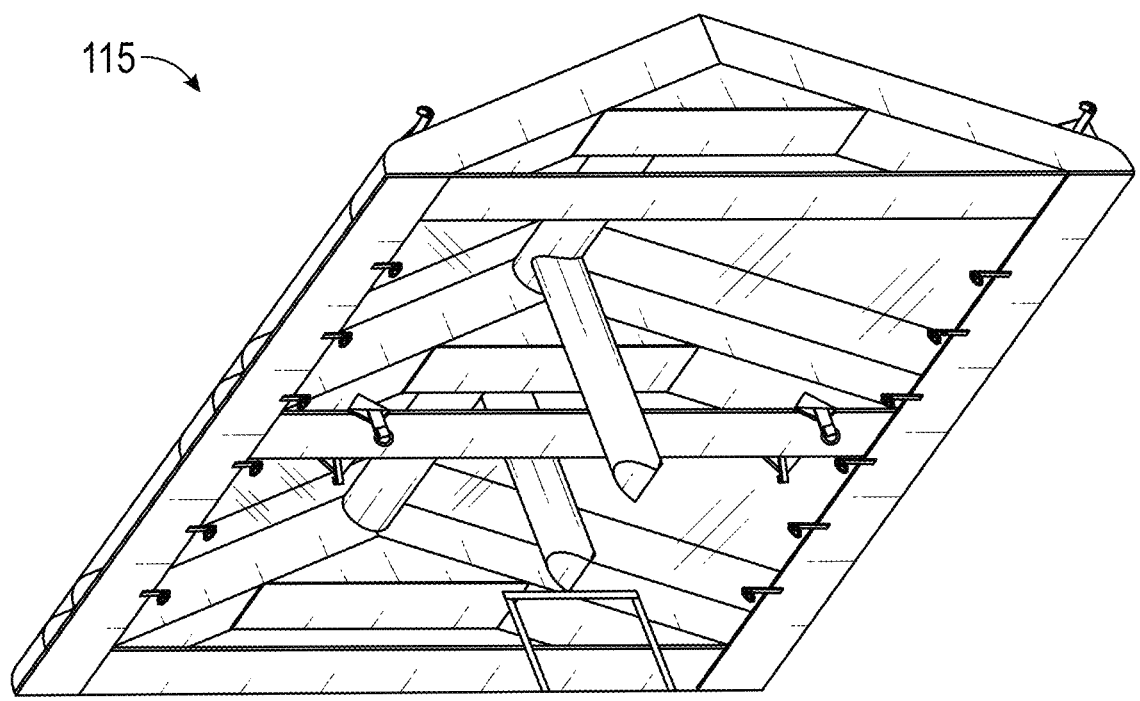
Figure 28:
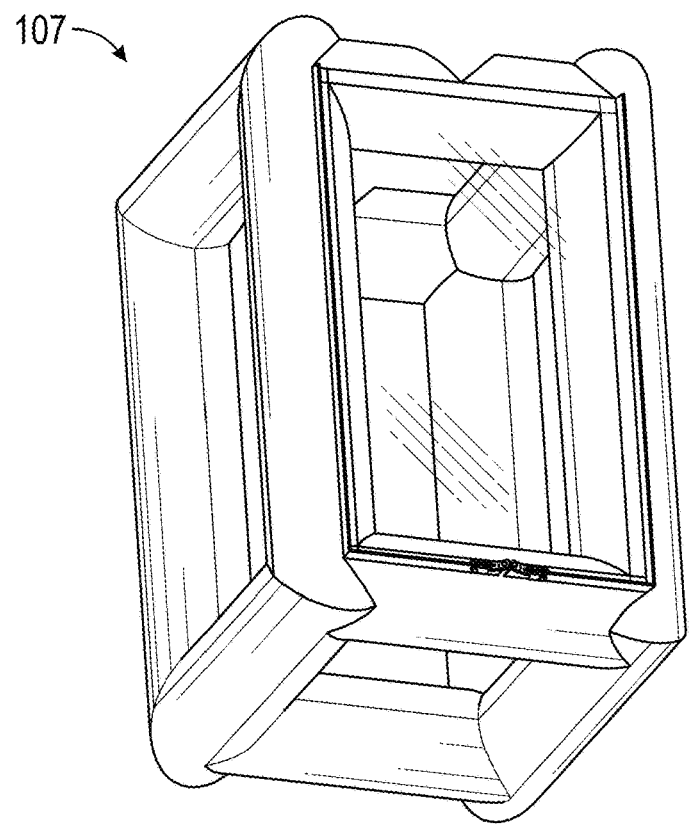
Figure 29:
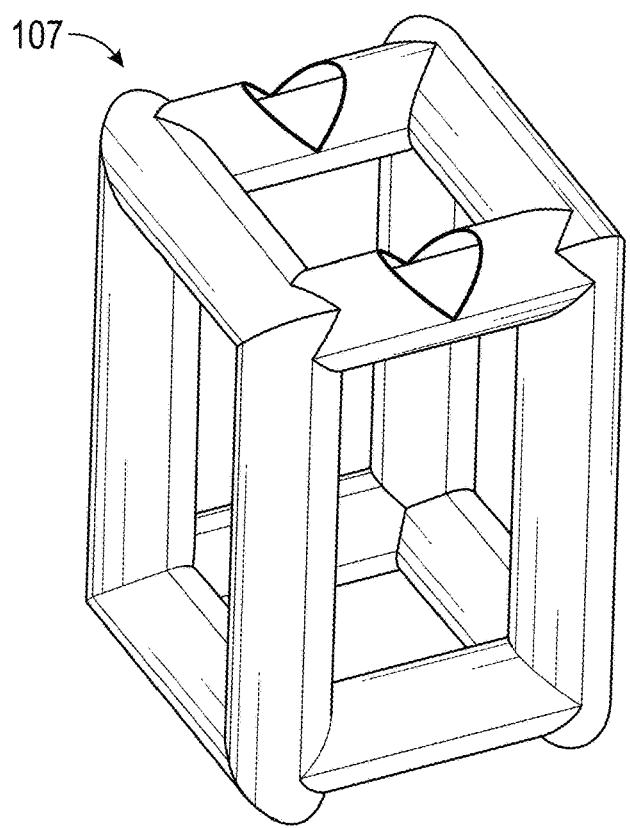
Figure 30:
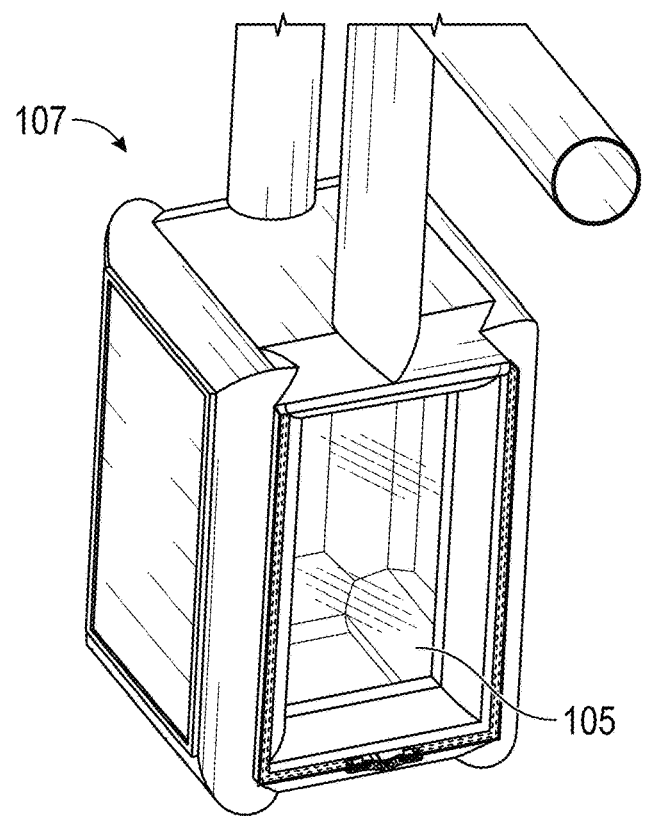
Figure 31:
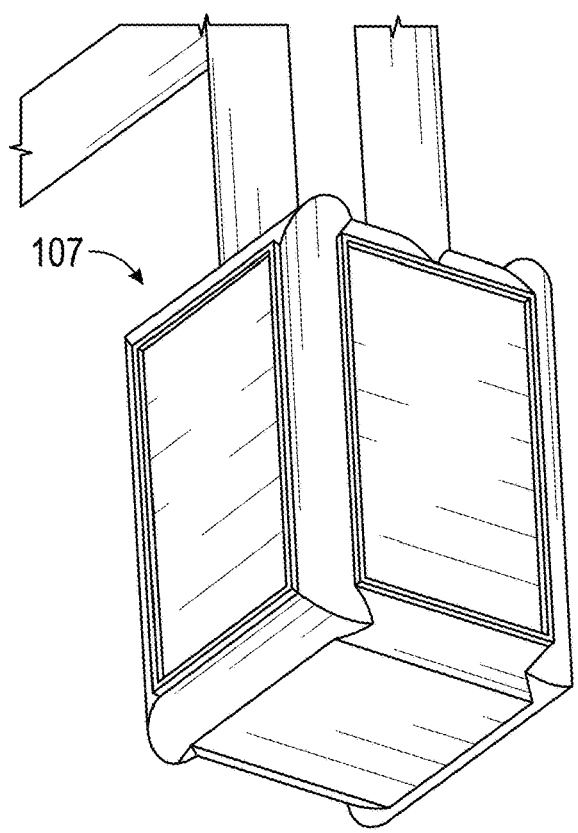
Figure 32:
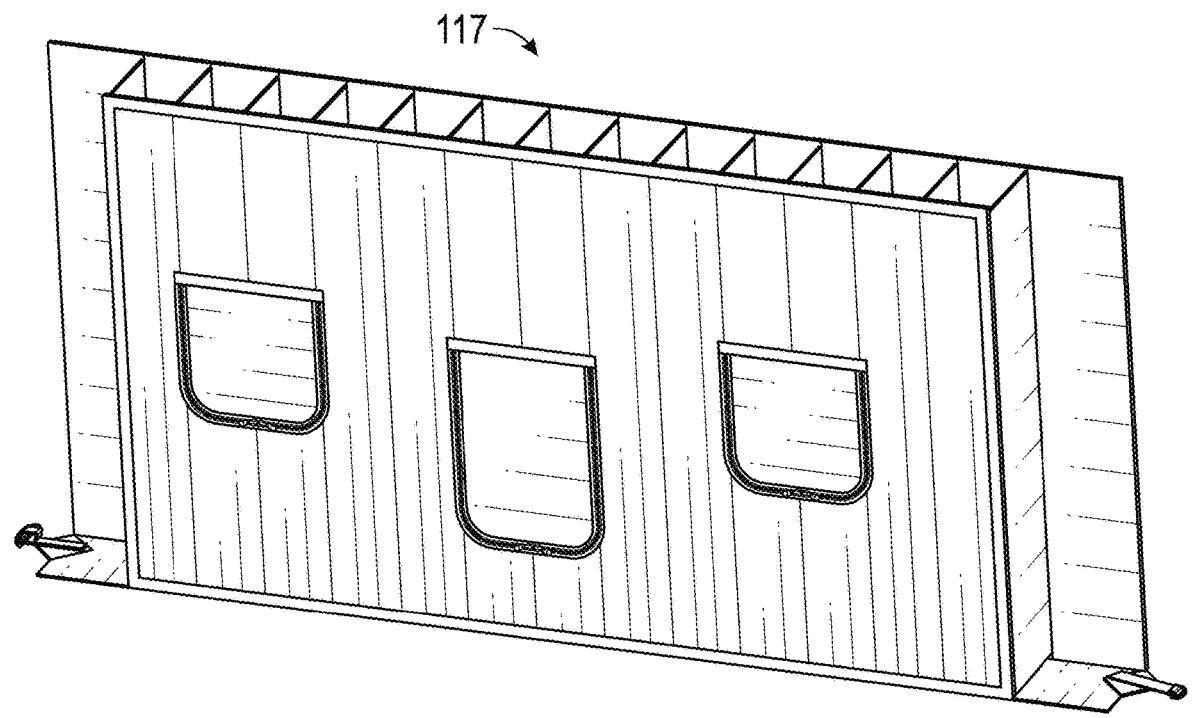
FIGS. 32-36 illustrate various views showing an example arrangement of various panels of an inner wall section of the inflatable structure of FIG. 1 according to another embodiment.
Figure 33:
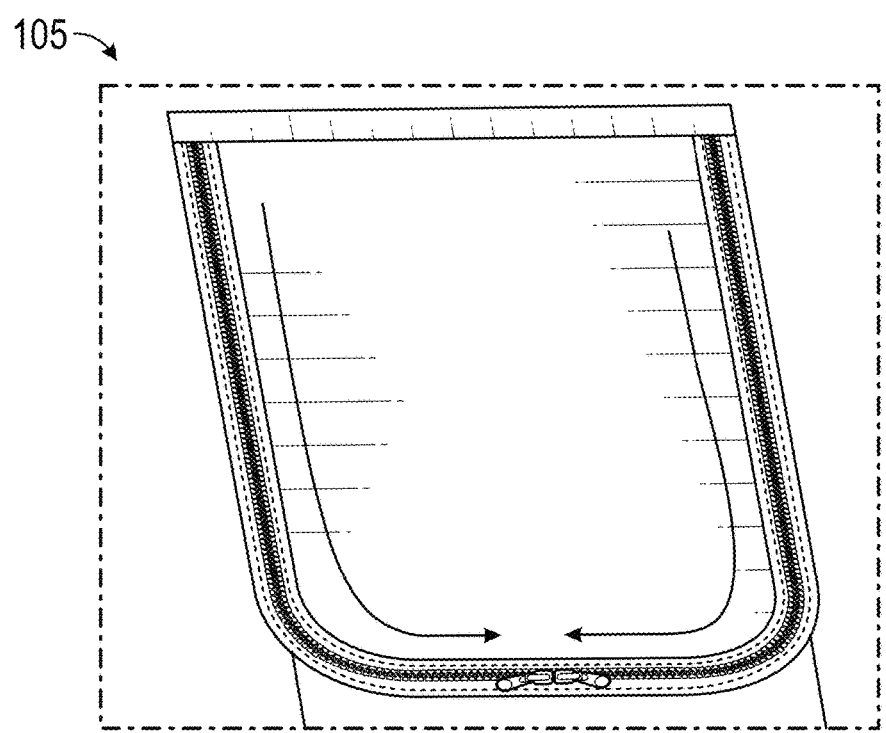
Figure 34:
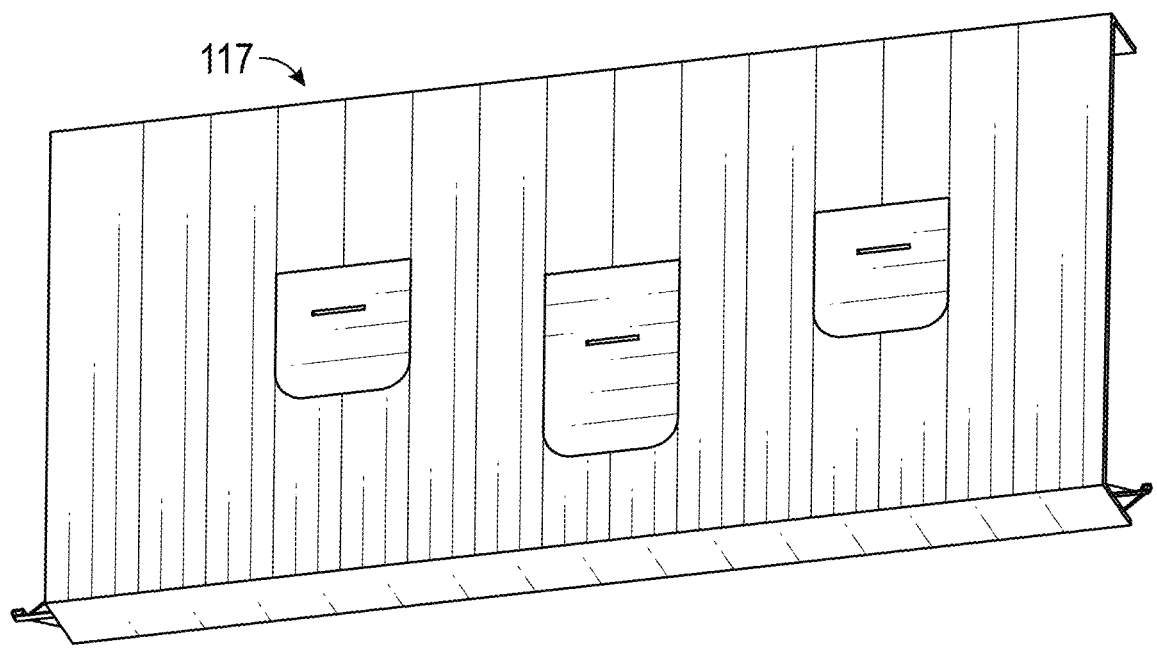
Figure 35:
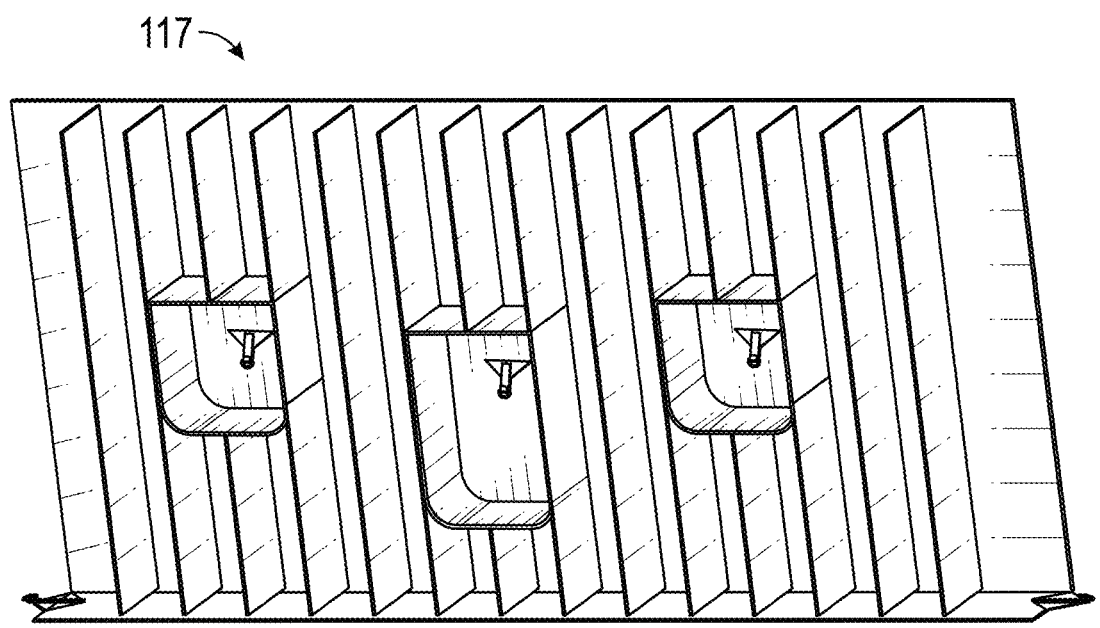
Figure 36:
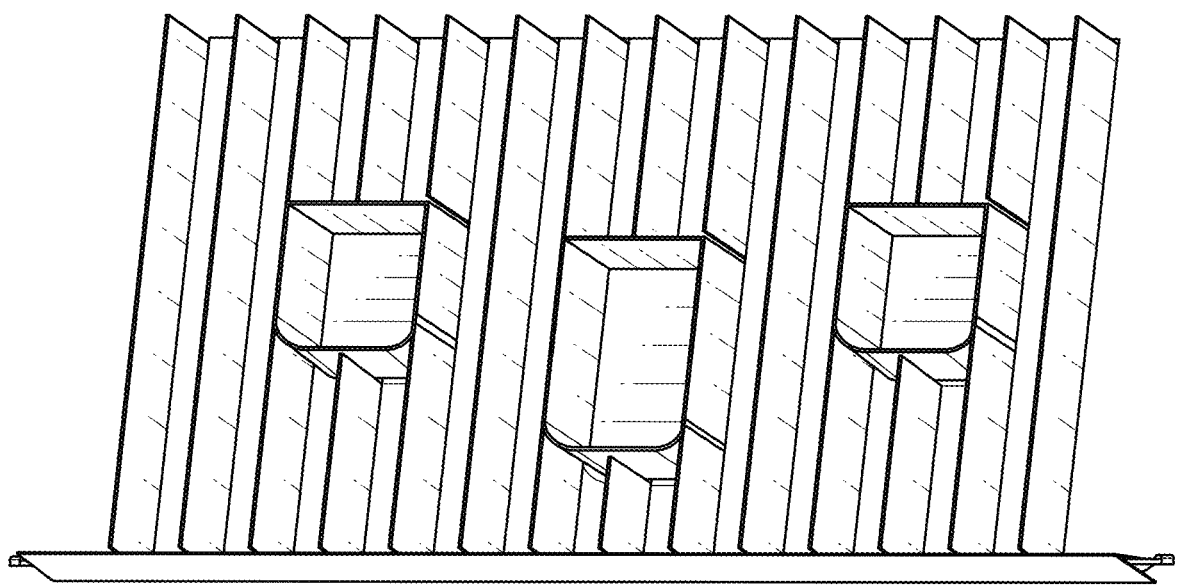

FIGS. 7-9 illustrate an interior of the inflatable structure 100 that has been skinned with an example theme. In the illustrated embodiment, the inflatable structure 100 has been skinned with a library theme. Other themes are also possible. To skin the inflatable structure 100, one or more skinned panels can be installed over the interior surfaces of the inflatable structure 100. The skinned panels can be attached with Velcro, ties, or other methods. The skinned panels can include printed graphics that change the appearance of the inflatable structure. The themed skins can also provide clues that can be used to solve puzzle to open lockable compartments of the escape room.

The inflatable walls 102 can provide the structural support for the inflatable structure 100. For example, in some embodiments, no additional framing is required to support the inflatable structure 100 beyond inflating the inflatable walls 102. The inflatable walls 102 and/or inflatable obstacles 106 can be configured so as to be fillable with a gas, such as air. FIGS. 7A-8P provide examples of how the inflatable walls 102 can be assembled or constructed from a plurality of panels. These examples are provided by way of illustration and are not intended to be limiting. In some embodiments, the panels of the inflatable walls 102 may comprise various materials including rubber, plastic, vinyl, nylon, PVC, etc. Seams of panels may be sewn, glued, or welded together, or otherwise attached. The seams can be substantially air tight. In some embodiments, parts of the inflatable structure 100 may be integrally formed, reducing the need for seams. Additionally, parts of the inflatable structure may comprise metal or plastics, such as any tie downs, connectors, etc.

Portions of the inflatable structure 100 may comprise eyelets, tabs, or tie downs (not shown) that can accept a rope, strap, or other devices that may help by keeping the inflatable structure 100 from moving. One end of a rope may be tied or attached to a tie down, with the other end of the rope being secured to a stable structure. The rope and tie down may prevent or discourage the inflatable structure 100 from moving laterally or vertically, twisting, or otherwise being displaced. The tie downs may help prevent movement of the inflatable structure 100 against the force of wind.

In some embodiments, the inflatable walls 102 are pneumatically connected such that all of the inflatable walls 102 can be inflated at once. This can simplify installation or set up of the inflatable structure. For example, to set up the inflatable structure 100, one may simply connect an air inlet 103 to an air source, such as a pump to inflate the inflatable structure. After inflation, the inflatable structure may be tied down to the ground as noted above.

Users suitable for using the inflatable structure 100 may be children, adults, families, etc. The inflatable structure 100 may be used in a variety of events and contexts. For instance, the inflatable structure 100 may be assembled and utilized at carnivals, fairs, parties, corporate events, amusement parks, etc. Reasons for using the inflatable structure 100 may vary, and may include personal enjoyment, competitions, or some other reason. Compared with other inflatable structures which generally involve a high degree of physical activity during use (e.g., bounce houses), the inflatable structure 100 can provide improved safety as little physical activity is required. This may facilitate use of the inflatable structure 100 and increase the amount of people who can use the inflatable structure 100.

After users have finished using the inflatable structure 100 and the owner or operator wishes to disassemble the inflatable structure 100, the inflatable structure 100 may generally be deflated and. The deflated inflatable structure 100 may then be stored or transported easily.

In some embodiments, a ground layer may cover at least part of the ground or other surrounding area near the inflatable structure 100. The ground layer may be placed on the ground and be disposed between the ground and the inflatable structure 100 or integrally formed with the bottom surfaces of the inflatable structure 100. The ground layer may comprise various materials including rubber, plastic, vinyl, nylon, PVC, etc. Parts of the ground layer may comprise metal or plastics, such as any tie downs or connectors. The ground layer may be configured to serve various functions. In some embodiments, the ground layer may be configured to provide a protective covering over the ground that prevents the ground around the inflatable structure 100 from getting damaged by people walking near the inflatable structure 100. In some embodiments, the ground layer may protect at least part of the inflatable structure 100 from becoming damaged due to objects located on the ground or the ground itself. For instance, the ground may contain sharp objects like glass or nails, or more natural objects like rocks that could cause harm to an inflatable object. A ground layer may help prevent these or other objects from damaging the inflatable segments.

In some embodiments, the inflatable structure 100 contains one or more inflatable segments (e.g., the inflatable walls 102). In some embodiments, each inflatable segment may be inflated separately and then connected or attached to a second inflatable segment or the inflatable segments can be pneumatically connected such that they all inflate and deflate together. This process may be repeated until the desired configuration is achieved. The inflatable segments may comprise a fluid containing portion, a protective cover, and/or sealable inlets and/or outlets. In some instances, portions of an inflatable segment may be used as both an inlet and an outlet. The inflatable segments may comprise an exhaust flap (not shown) that may be configured to allow the segments to be deflated more efficiently. The fluid containing portions may be generally fluid impermeable and may substantially retain fluid added to the inflatable segment. In some instances, the fluid used is atmospheric air or compressed air. Other gaseous fluids may also be suitable. Different portions of the inflatable segments may also be suitable to accept liquid fluids.

In order to inflate the inflatable segments, an air source may be connected to an inlet 103 in the inflatable segment. In some embodiments, the inlet 103 comprises a conduit that connects the air source to the interior of the inflatable segment. The air source may comprise a fan, a compressed air source, or any other suitable air source that can adequately supply the interior of the inflatable segment with air. Air may be added to the inflatable segment until it is sufficiently full. A method to inflate an inflatable segment may include the following steps: place one or more inflatable segments on the ground, a ground layer, or other suitable structure; connect an air source to an inlet 103 of the inflatable segment; inflate the inflatable segment to the desired fullness; disconnect the air source from the inflatable segment; close the air inlet 103 of the inflatable segment. These steps may be performed in this order or in a different order.

An inflatable structure 100 as described herein may have advantages over conventional inflatable structures, which may make the inflatable structure 100 more desirable for use. The characteristics described need not be present in all embodiments in order for an inflatable structure 100 to have advantages.

In some embodiments an inflatable structure 100 may be highly portable and provide simple setup and take down. For instance, after the inflatable structure 100 is finished being used, the user may simply deflate the inflatable structure 100 and prepare it for transportation. The overall size of the inflatable structure 100 may be smaller than when it is inflated. The size of an inflatable structure 100 may be greatly reduced by its ability to expend trapped air, which does not need to be transported. Only the physical parts of the inflatable structure 100 may be transported, which does not include the air.

Additionally, some parts of the inflatable structure 100 derive at least part of their vertical and lateral stability from being inflated. Since the inflatable segments are configured in specific shapes, once they are filled with air, they may exhibit structural properties that allow them to remain upright. In some embodiments, some inflatable segments require few or no additional supports. In contrast to the inflatable structure 100, other structures often require substantial vertical supports. Instead of trapped air for vertical support, traditional structures often use heavy metal scaffolding or heavy wooden structures. By using trapped air to vertically support parts of the inflatable structure 100, the inflatable structure 100 may be lighter overall given the decrease in the amount of vertical support needed.

Not all parts of the inflatable structure 100 need to be inflatable in order to derive benefit from the inflatable portions. Other advantages of the inflatable structure 100 comprising some inflatable portions may exist. Additional features of the inflatable structure 100, which may be present in some embodiments, are shown and described with reference to the remaining figures.

FIGS. 10-14 illustrate various views showing an example arrangement of various panels of a front wall section 109 of the inflatable structure of FIG. 1 according to an embodiment. FIGS. 15-19 illustrate various views showing an example arrangement of various panels of an first side wall section 111 of the inflatable structure of FIG. 1 according to an embodiment. FIGS. 20-25 illustrate various views showing an example arrangement of various panels of a rear wall section 113 of the inflatable structure of FIG. 1 according to an embodiment. FIGS. 26-31 illustrate various views showing an example arrangement of various panels of a roof section 115 of the inflatable structure of FIG. 1 according to an embodiment. As shown in FIGS. 28-31 the roof section includes the central vault 107 in the illustrated embodiment. FIGS. 32-36 illustrate various views showing an example arrangement of various panels of a second side wall section 117 of the inflatable structure of FIG. 1 according to an embodiment. These arrangements of the panels are provided by way of example and are not intended to be limiting. Other arrangements are possible.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Figure 37A:
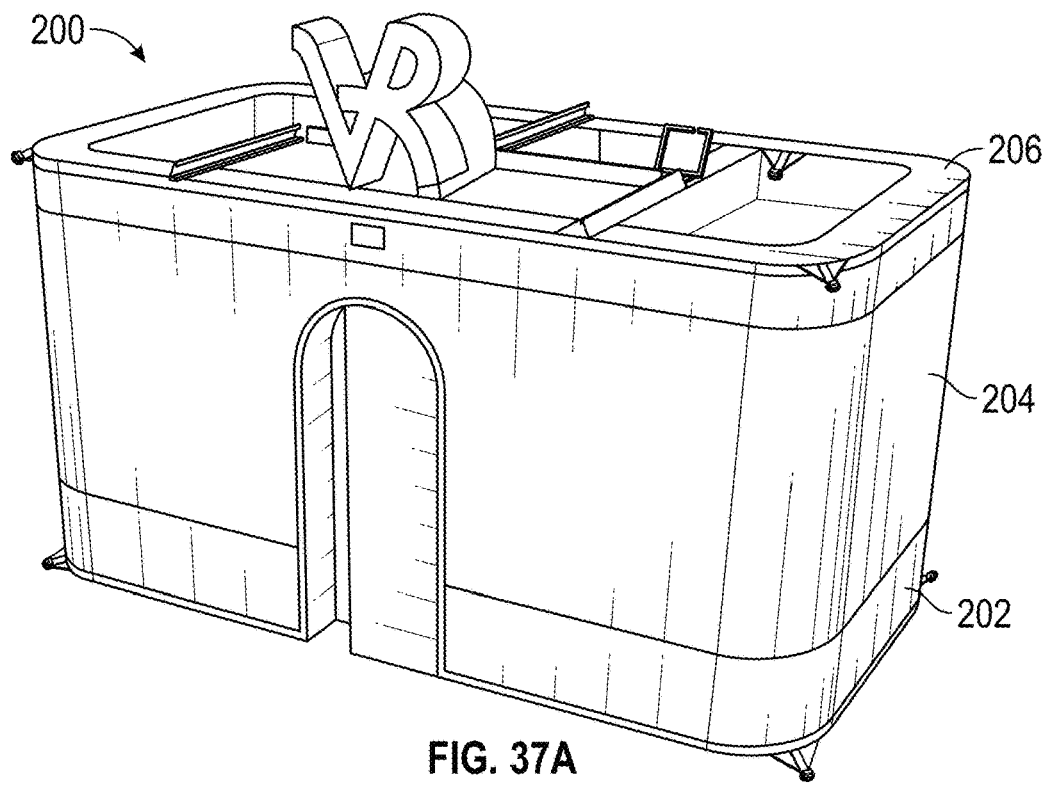
FIG. 37A is a front perspective view of one embodiment of an inflatable structure configured as a portable virtual reality theater.
Figure 37B:
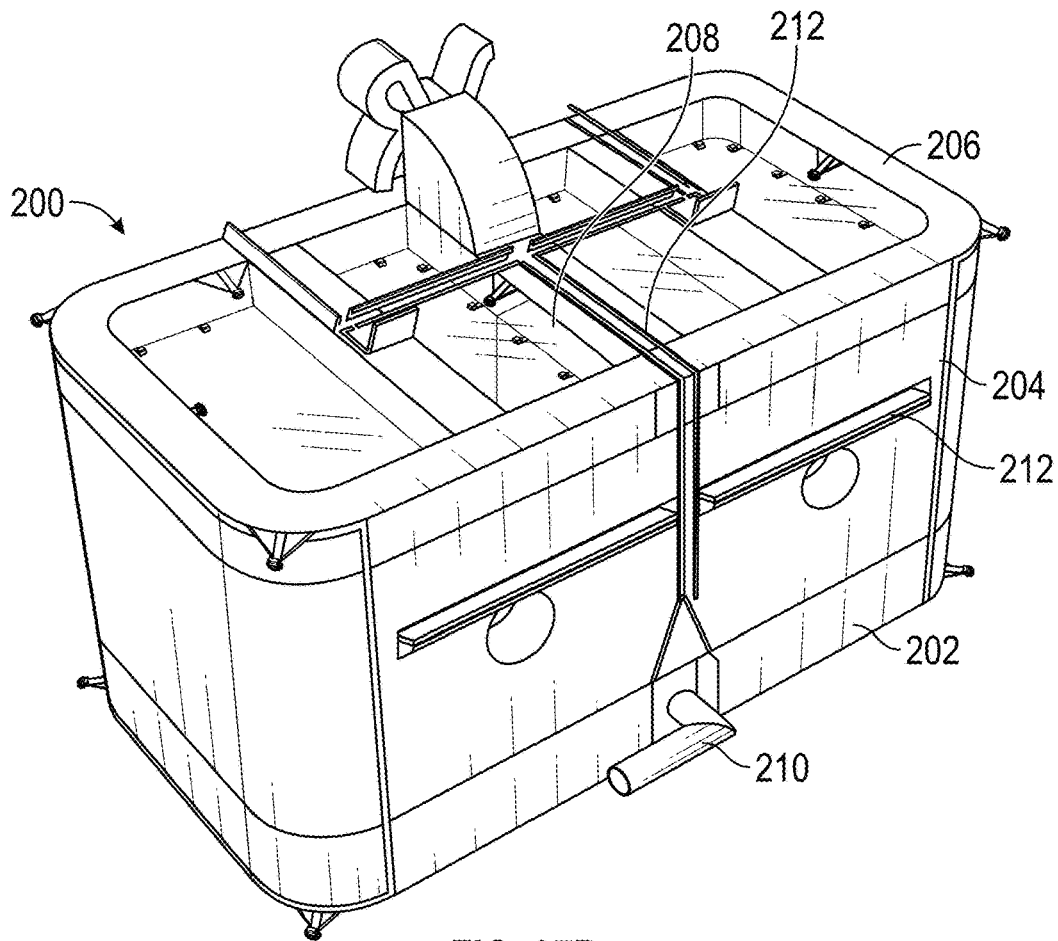
FIG. 37B is a back perspective view of the inflatable structure of FIG. 37A.

FIG. 37A is a front perspective view of one embodiment of an inflatable structure 200 configured as a portable virtual reality theater. FIG. 37B is a back perspective view of the inflatable structure 200. As will be described in more detail below, the inflatable structure 200 can be configured to provide a space in which one or more users may play virtual reality games. The inflatable structure 200 can beneficially be portable and easy to set up such that it can easily be moved and installed at different locations. The inflatable structure 200 can further include the virtual reality gaming components (such as virtual reality headsets, controllers, gaming systems, or computers) integrated therein. As shown in FIGS. 39A-40B, the inflatable structure 200 can include air supported virtual reality headsets that facilitate use of the system.

Additionally, because the inflatable structure 200 is inflatable (i.e., including inflatable walls), the inflatable structure 200 can provide a safe theater or environment in which to play virtual reality games. While playing a virtual reality game, a user generally wears a virtual reality headset that blocks their view of the world around them. Surrounding a user by inflatable walls or baffles can provide a safe space in which to play the game, and, if the user bumps into the walls, they are less likely to hurt themselves due the generally soft or cushioned nature of inflatable walls.

In the embodiment illustrated in FIGS. 37A and 37B, the inflatable structure 200 comprises a base section 202, an outer wall section 204, a roof section 206, and an inner wall section 208. These various sections will be described in more detail below. As generally shown in FIGS. 37A and 37B, these sections can configure the inflatable structure 200 as an inflatable room or enclosure in which to play virtual reality games. In the illustrated embodiment, the inflatable structure 200 includes two rooms separated by the inner wall section 208. This arrangement can allow two users to play simultaneously within the inflatable structure 200. In some embodiments, the two users can be in competition with each other. Other arrangements are possible, such as configurations for single players or for more than two players.

The inflatable structure 200 may comprise inflatable walls that can provide the structural support for the inflatable structure 200. For example, in some embodiments, no additional framing is required to support the inflatable structure 200 beyond inflating the inflatable walls. The inflatable walls can be configured so as to be fillable with a gas, such as air. The remaining figures, described below, provide examples of how the inflatable walls can be assembled or constructed from a plurality of panels (see, for example, FIGS. 41A-41F, 43A-44B, 45A-45D, and 46A-47). These examples are provided by way of illustration and are not intended to be limiting. In some embodiments, the panels of the inflatable walls may comprise various materials including rubber, plastic, vinyl, nylon, PVC, etc. Seams of panels may be sewn, glued, or welded together, or otherwise attached. The seams can be substantially air tight. In some embodiments, parts of the inflatable structure 200 may be integrally formed, reducing the need for seams. Additionally, parts of the inflatable structure may comprise metal or plastics, such as any tie downs, connectors, etc.

Portions of the inflatable structure 200 may comprise eyelets, tabs, or tie downs (not shown) that can accept a rope, strap, or other devices that may help by keeping the inflatable structure 200 from moving. One end of a rope may be tied or attached to a tie down, with the other end of the rope being secured to a stable structure. The rope and tie down may prevent or discourage the inflatable structure 200 from moving laterally or vertically, twisting, or otherwise being displaced. The tie downs may help prevent movement of the inflatable structure 200 against the force of wind.

The inflatable walls may also be configured with hook and loop fasteners or other connection mechanisms that allow the walls to be covered with themed elements. This can allow for attachment of themed panels that match the virtual reality games played therein. This also allows the inflatable structure 200 to be quickly and easily re-themed if desired. The themed elements can be positioned on the interior and/or exterior of the inflatable structure 200. In some embodiments, the interior of the inflatable structure 200 can be configured as a green-screen such that a video of a user playing the game can be superimposed on the virtual reality world for display. This can allow spectators to view the user in the virtual reality world.

In some embodiments, the inflatable walls are pneumatically connected such that all of the inflatable walls can be inflated at once. This can simplify installation or set up of the inflatable structure. For example, to set up the inflatable structure 200, one may simply connect an air inlet 210 to an air source, such as a pump to inflate the inflatable structure. After inflation, the inflatable structure may be tied down to the ground as noted above.

Users suitable for using the inflatable structure 200 may be children, adults, families, etc. The inflatable structure 200 may be used in a variety of events and contexts. For instance, the inflatable structure 200 may be assembled and utilized at carnivals, fairs, parties, corporate events, amusement parks, etc. Reasons for using the inflatable structure 200 may vary, and may include personal enjoyment, competitions, or some other reason.

After users have finished using the inflatable structure 200 and the owner or operator wishes to disassemble the inflatable structure 200, the inflatable structure 200 may generally be deflated. The deflated inflatable structure 200 may then be stored or transported easily.

In some embodiments, a ground layer may cover at least part of the ground or other surrounding area near the inflatable structure 200. The ground layer may be placed on the ground and be disposed between the ground and the inflatable structure 200 or integrally formed with the bottom surfaces of the inflatable structure 200. The ground layer may comprise various materials including rubber, plastic, vinyl, nylon, PVC, etc. Parts of the ground layer may comprise metal or plastics, such as any tie downs or connectors. The ground layer may be configured to serve various functions. In some embodiments, the ground layer may be configured to provide a protective covering over the ground that prevents the ground around the inflatable structure 200 from getting damaged by people walking near the inflatable structure 200. In some embodiments, the ground layer may protect at least part of the inflatable structure 200 from becoming damaged due to objects located on the ground or the ground itself. For instance, the ground may contain sharp objects like glass or nails, or more natural objects like rocks that could cause harm to an inflatable object. A ground layer may help prevent these or other objects from damaging the inflatable segments.

Additionally, some parts of the inflatable structure 200 derive at least part of their vertical and lateral stability from being inflated. Since the inflatable segments are configured in specific shapes, once they are filled with air, they may exhibit structural properties that allow them to remain upright. In some embodiments, some inflatable segments require few or no additional supports. In contrast to the inflatable structure 200, other structures often require substantial vertical supports. Instead of trapped air for vertical support, traditional structures often use heavy metal scaffolding or heavy wooden structures. By using trapped air to vertically support parts of the inflatable structure 200, the inflatable structure 200 may be lighter overall given the decrease in the amount of vertical support needed.

Not all parts of the inflatable structure 200 need to be inflatable in order to derive benefit from the inflatable portions. Other advantages of the inflatable structure 200 comprising some inflatable portions may exist. Additional features of the inflatable structure 200, which may be present in some embodiments, are shown and described with reference to the remaining figures.

As mentioned above, virtual reality gaming components can be integrated into the inflatable structure 200. To connect the components, wiring may 212 extend over or through various components of the inflatable structure 200 as shown in FIG. 37B and others. In some embodiments, the wiring is integrated into the structure 200 to facilitate set up. For example, the wiring 212 can be integrated into the walls such that, when the structure is inflated, the wiring is correctly positioned. Any additional devices (such as a cooling unit, speakers, displays, timers, etc.) can then quickly and easily be connected to the wiring to complete the set up.

Figure 38:
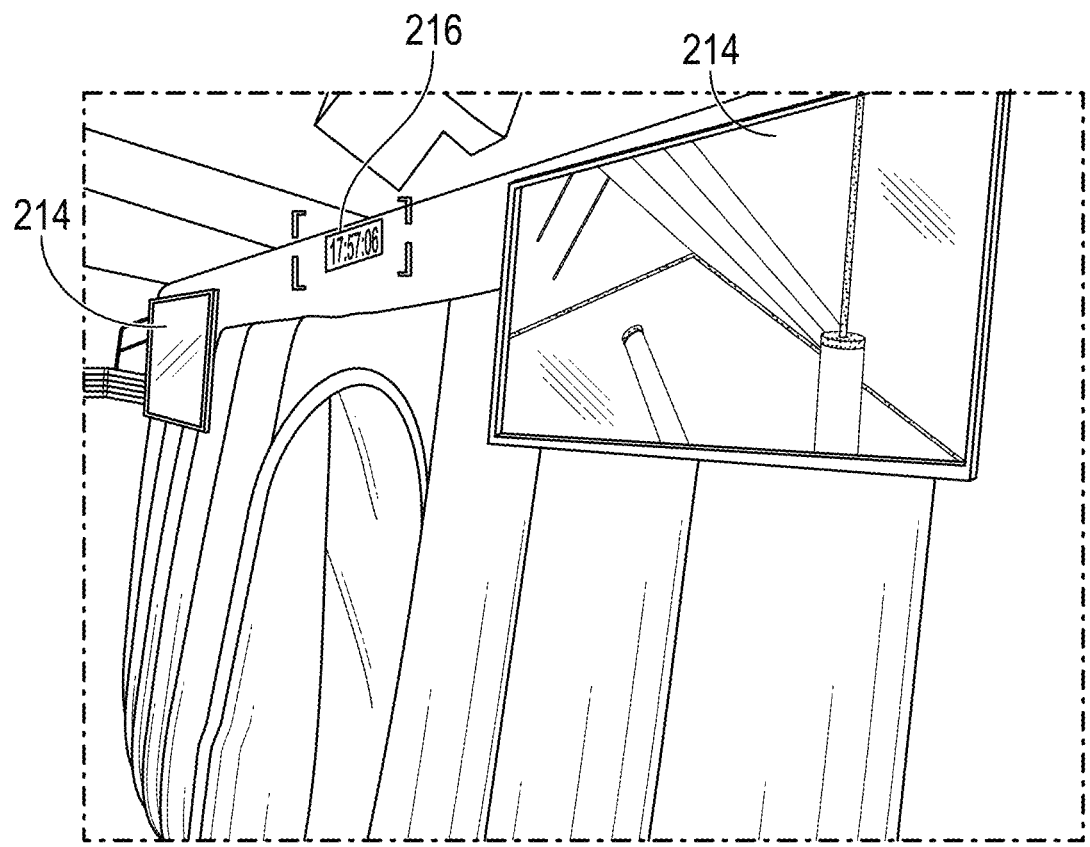
FIG. 38 illustrates a front view of an embodiment of an inflatable structure configured as a portable virtual reality theater that includes displays and a timer.

FIG. 38 illustrates a front view of an embodiment of the inflatable structure 200 configured as a portable virtual reality theater that includes displays 214 and a timer 216. In some embodiments, the displays 214 can be mounted on a front wall of the inflatable structure 200. The inflatable structure 200 can be configured to support the displays 214. The displays 214 can be configured to display the game being played within the structure to people outside the structure. The timer 216 can facilitate a high throughput of play.

Figure 39A:
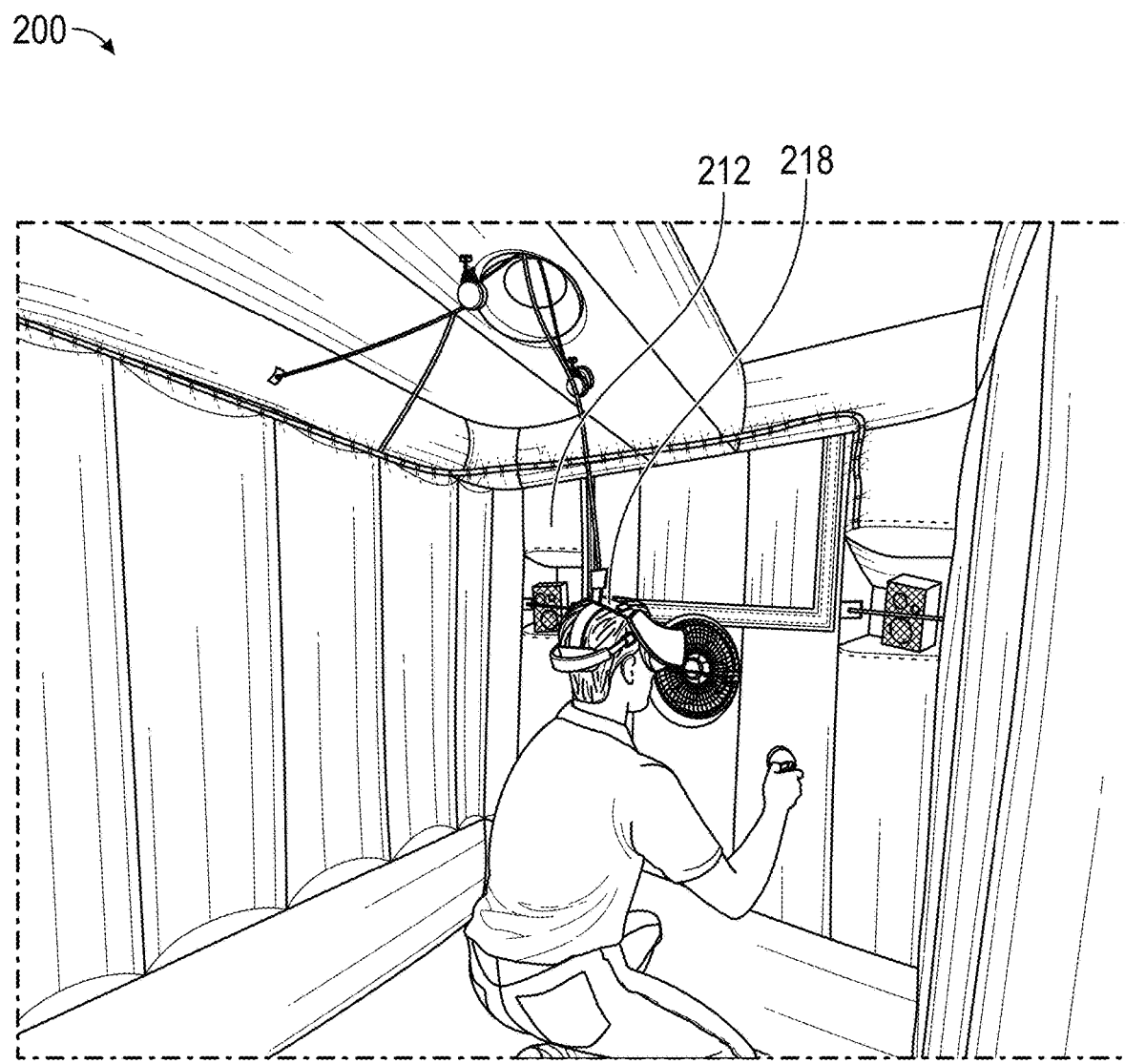
FIG. 39A illustrates an interior view of an inflatable structure configured as a portable virtual reality theater showing the inflatable structure during use.

FIG. 39A illustrates an interior view of an inflatable structure configured as a portable virtual reality theater showing the inflatable structure 200 during use. FIG. 39A also illustrates that the inflatable structure 200 can include an air supported virtual reality headset 218. As shown, wiring 212 extends from the ceiling of the inflatable structure 1010 to the headset 218. This can prevent the user from becoming entangled in the wiring 212 during use. FIG. 39A also shows that lighting elements can be integrated into the structure. In some embodiments, the lighting elements can remain in the structure even when deflated. In other embodiments, the lighting elements can be installed, for example, on hooks, once the structure is inflated. Further, inasmuch as the VR gaming system requires certain lighting or infrared elements, these can also be integrated into the structure.

Figure 39B:
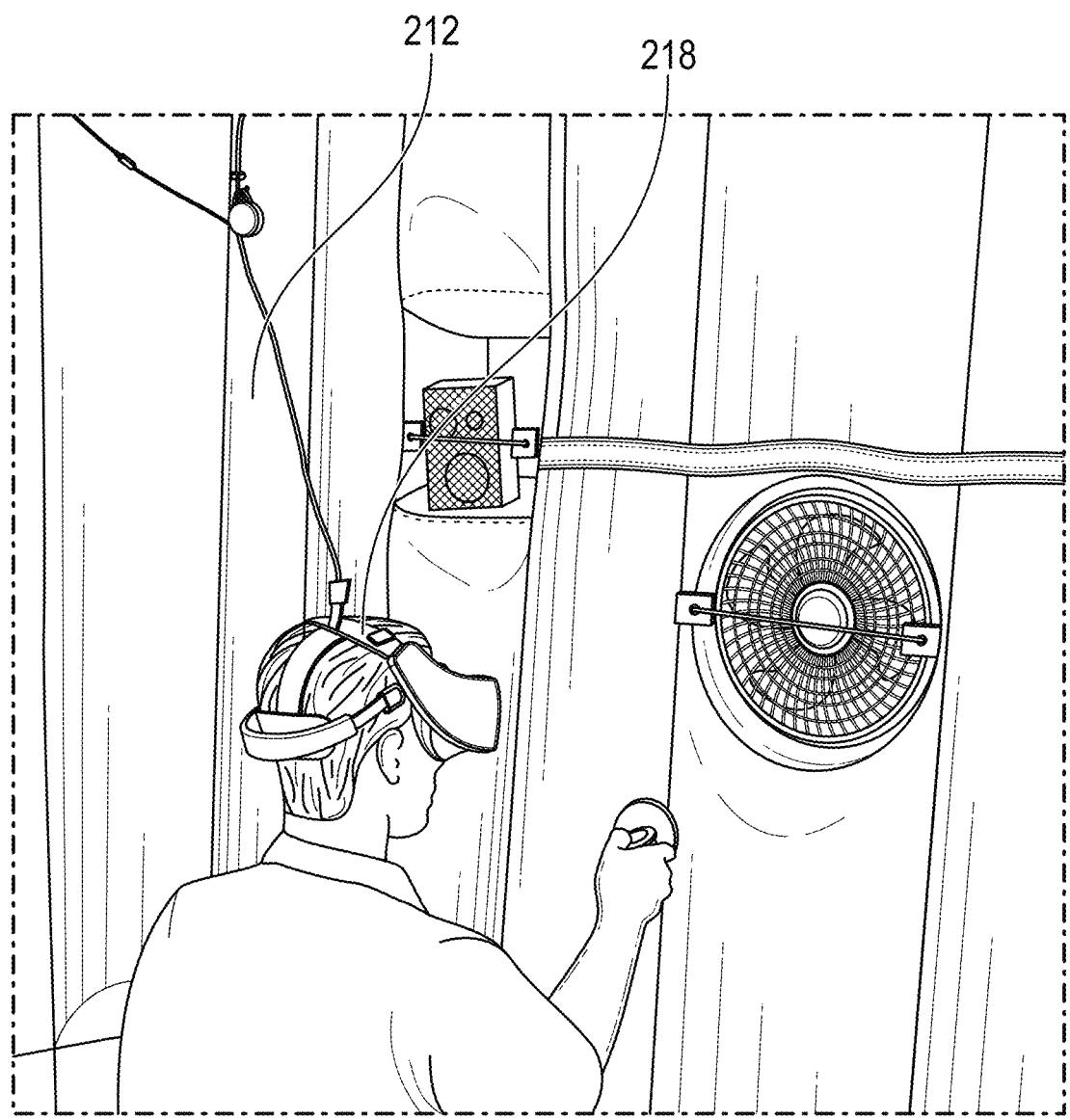
FIG. 39B illustrates another interior view of an inflatable structure configured as a portable virtual reality theater showing the inflatable structure during use.

FIG. 39B illustrates another interior view of an inflatable structure 200 showing the inflatable structure 200 during use. Again, the air supported virtual reality headset 218 and wiring extend from the ceiling.

Figure 40A:
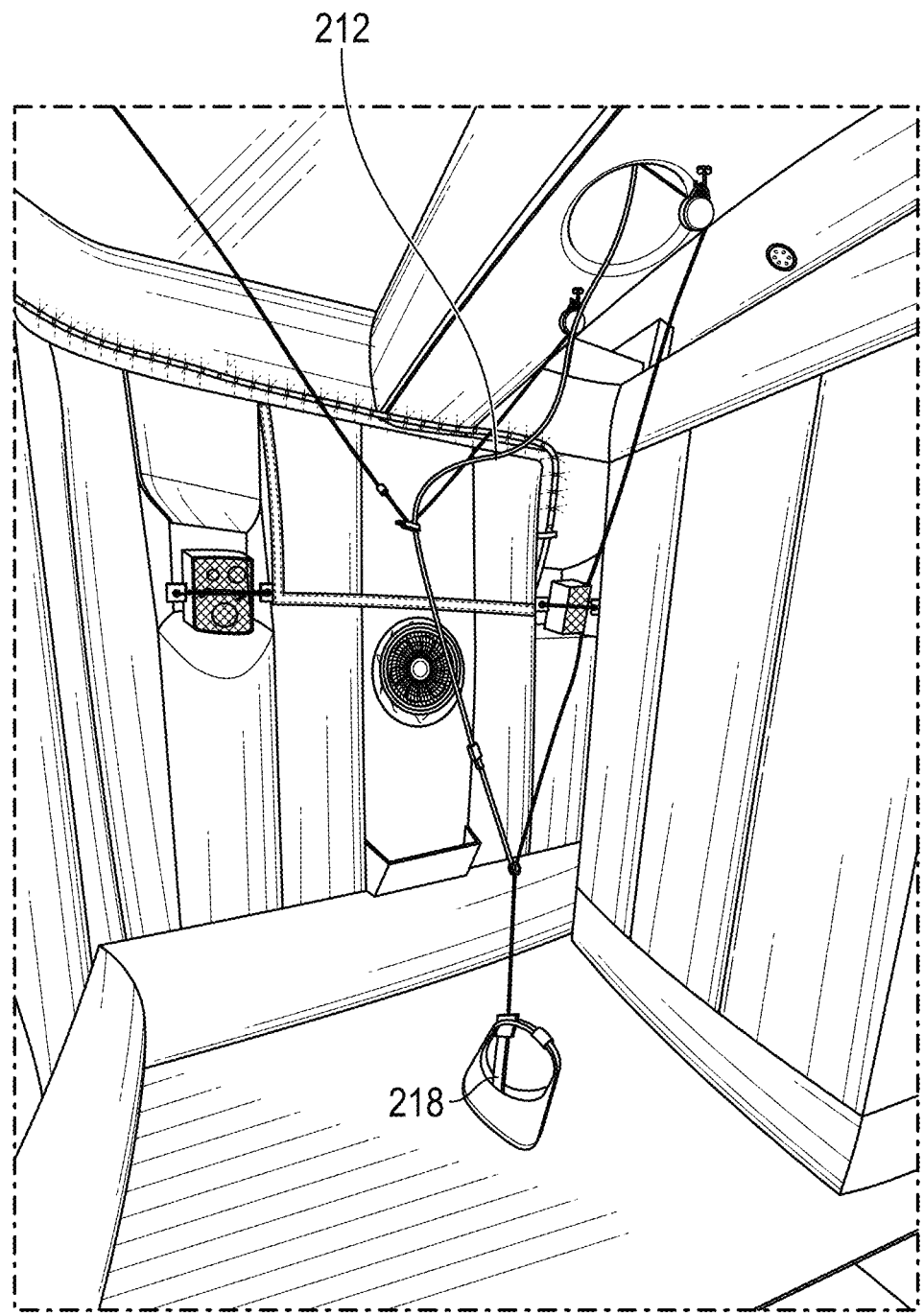
FIG. 40A illustrates an air supported virtual reality headset according to one embodiment.
Figure 40B:
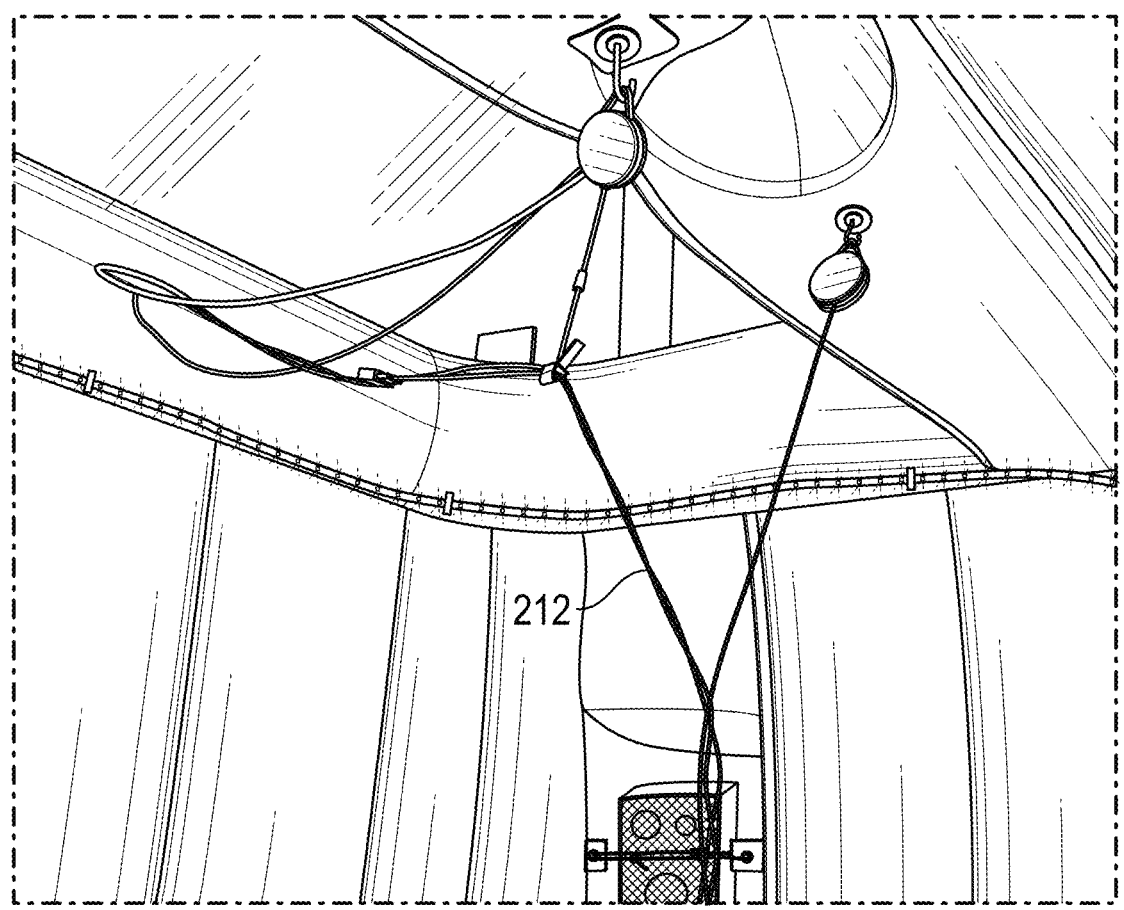
FIG. 40B illustrates another view of the air supported virtual reality headset of FIG. 40A.

FIG. 40A illustrates the air supported virtual reality headset 218 according to one embodiment. The headset 218 is referred to as air supported because it is integrated into the inflatable structure 200 by virtue of the wiring 212. Further, the inflatable structure 200 may include a mechanical structure for retracting and managing excess wiring 212, for example, as shown in FIG. 40B.

Figure 41A:
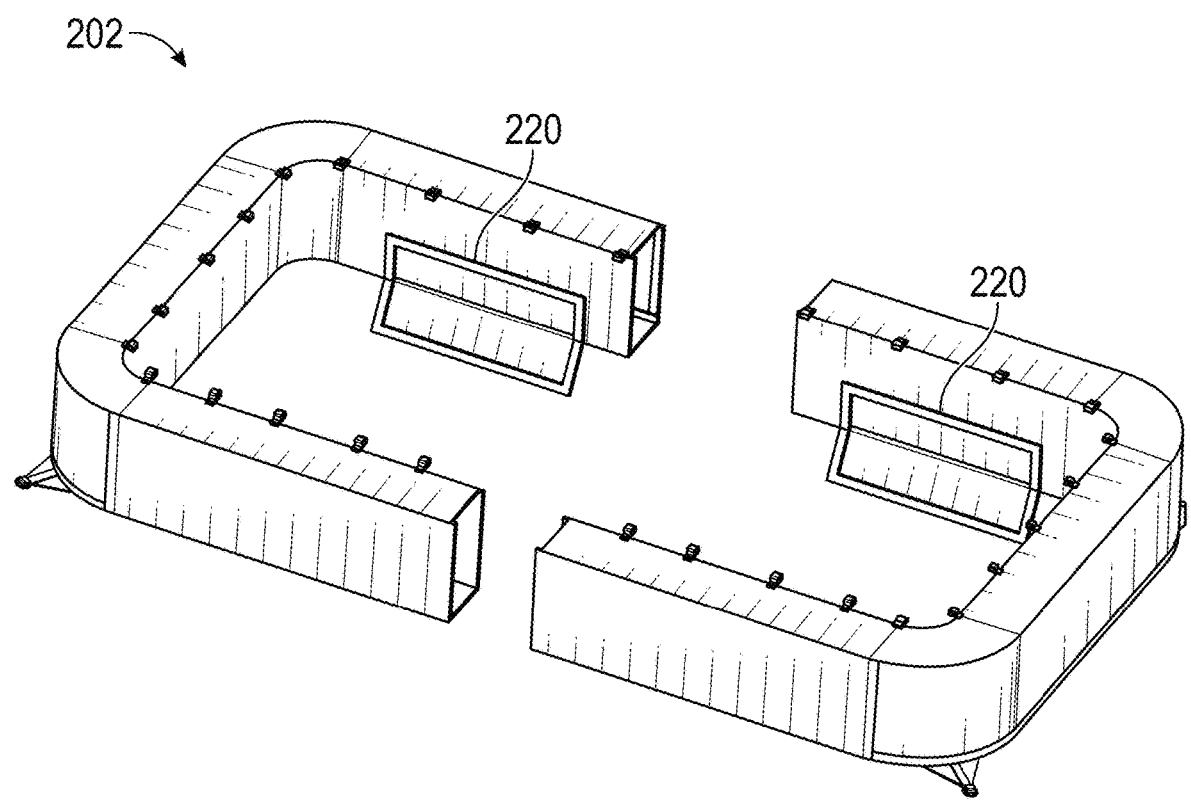
FIG. 41A is a back perspective view of an embodiment of a base portion of the inflatable structure of FIG. 37A.
Figure 41B:
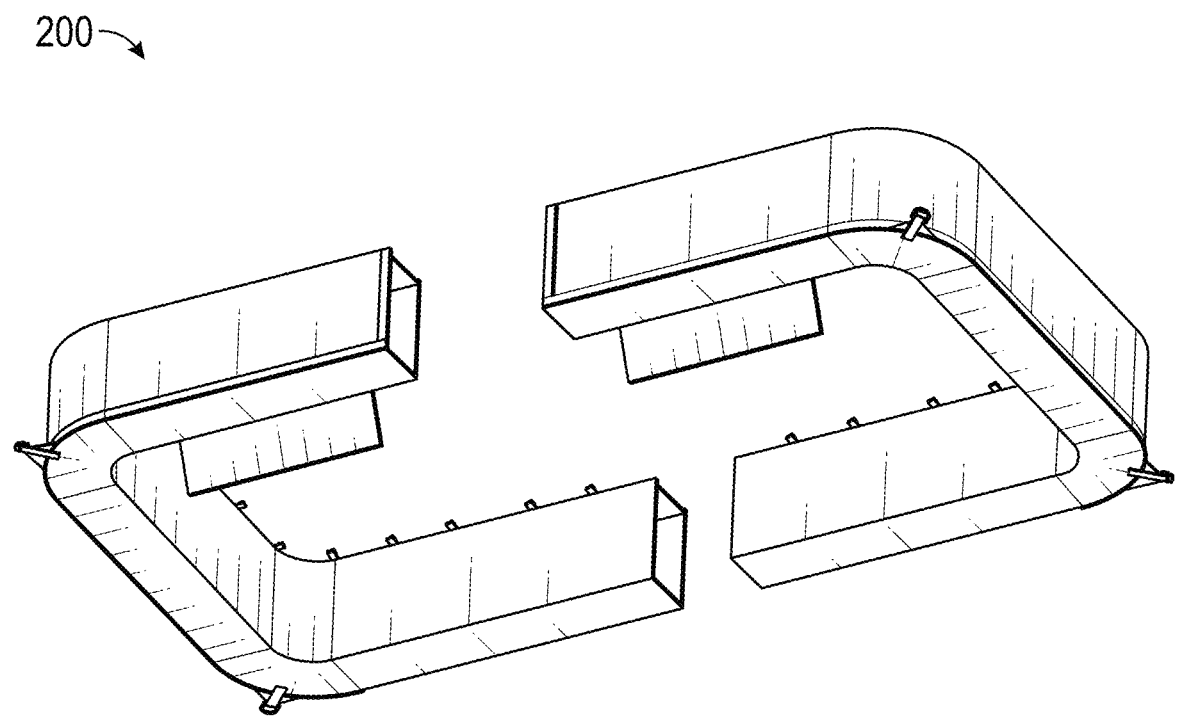
FIG. 41B is a front perspective view of the base portion of FIG. 41A.

FIG. 41A is a back perspective view of an embodiment of the base portion 202 of the inflatable structure 200 of FIG. 37A. FIG. 41B is a front perspective view of the base portion 202 of FIG. 41A. As shown, the base portion 220 can include pockets 220 configured to enclose inflatable seating elements. The inflatable seating elements are shown in more detail in FIGS. 41C-42D.

Figure 41C:
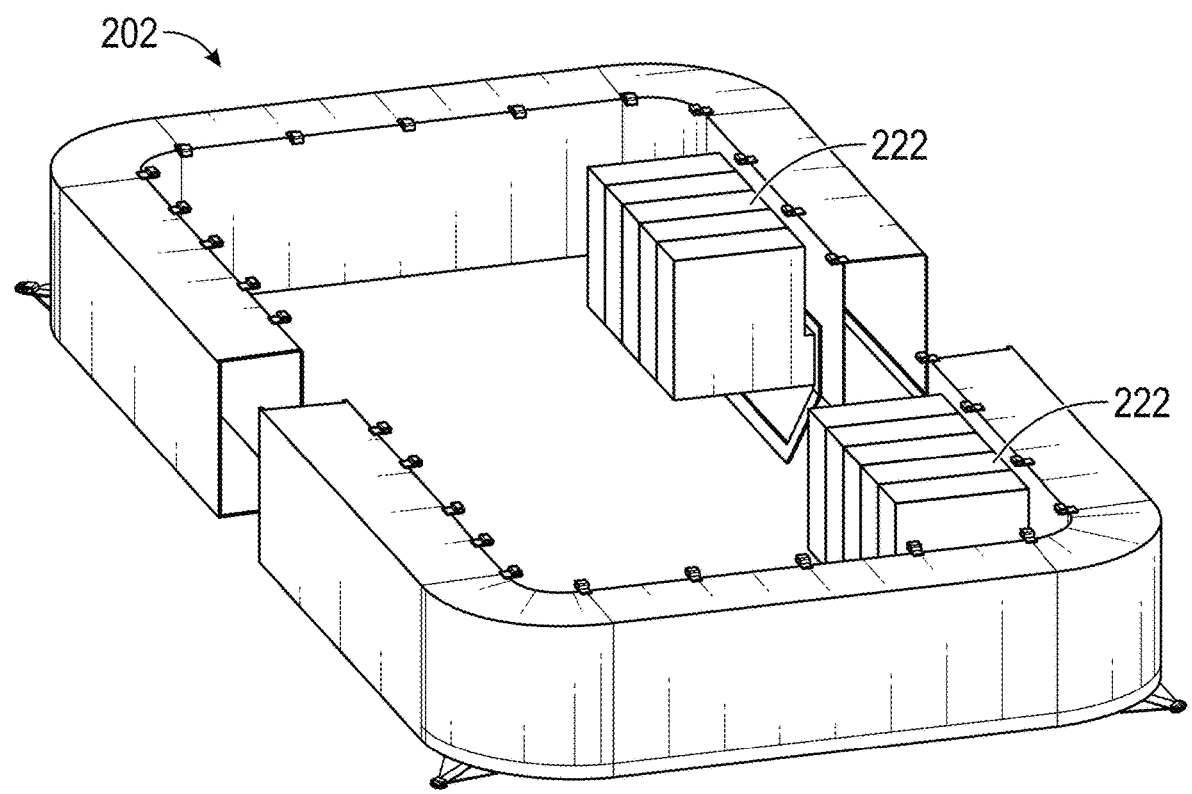
FIG. 41C is a perspective view of the base portion of FIG. 41A illustrating an embodiment of integrated seating elements that can be included therein.
Figure 41D:
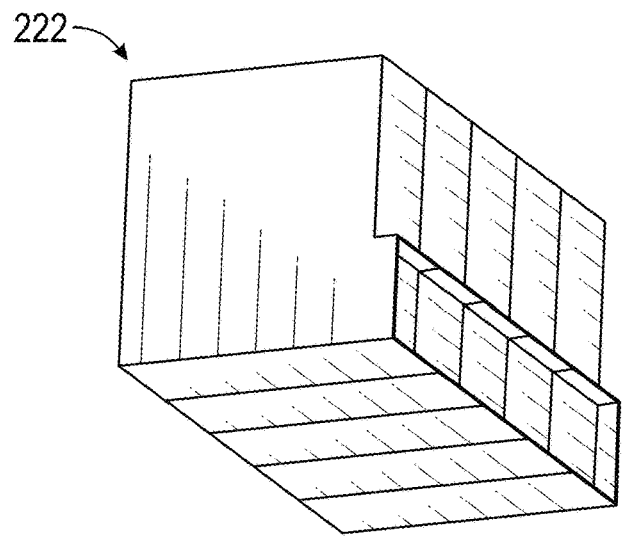
FIGS. 41D-41F illustrate an example construction for the integrated seating elements of FIG. 41C.
Figure 41E:
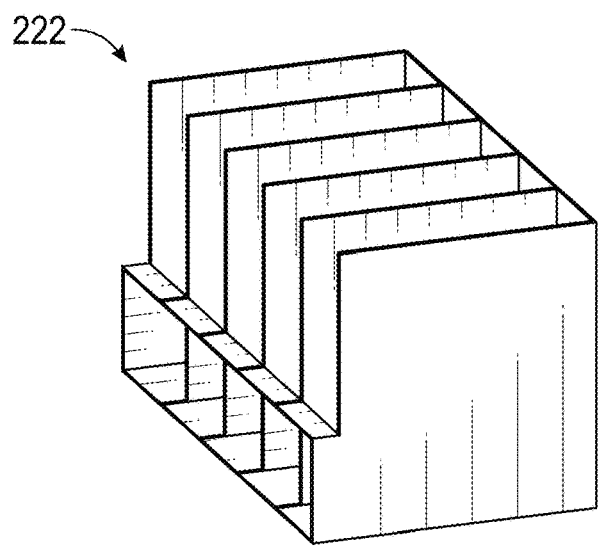
Figure 41F:
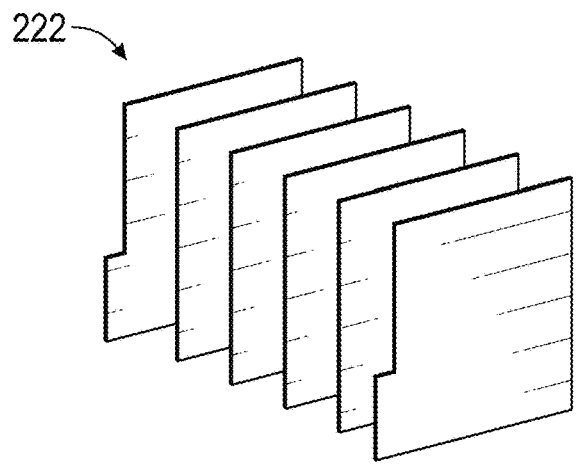

FIG. 41C is a perspective view of the base portion 202 illustrating an embodiment of integrated seating elements 222 that can be included therein. FIGS. 41D-41F illustrate an example construction for the integrated seating elements 222.

Figure 42A:
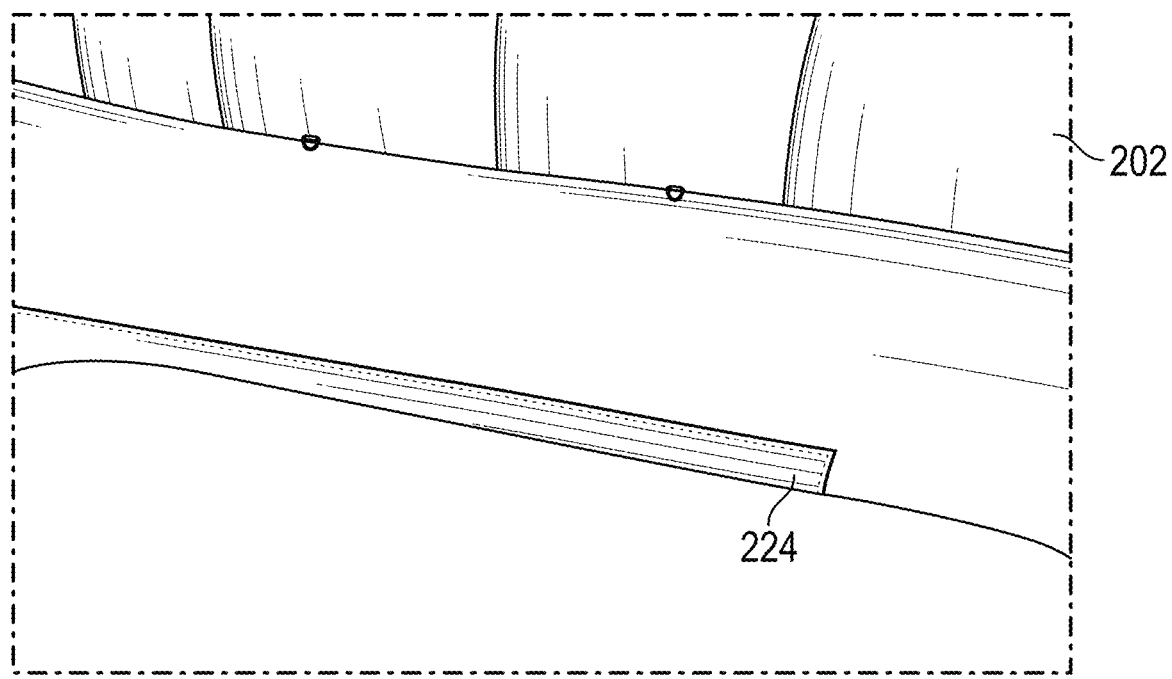
FIGS. 42A-42D illustrate various stages of deploying an integrated seating element according to an embodiment.
Figure 42B:
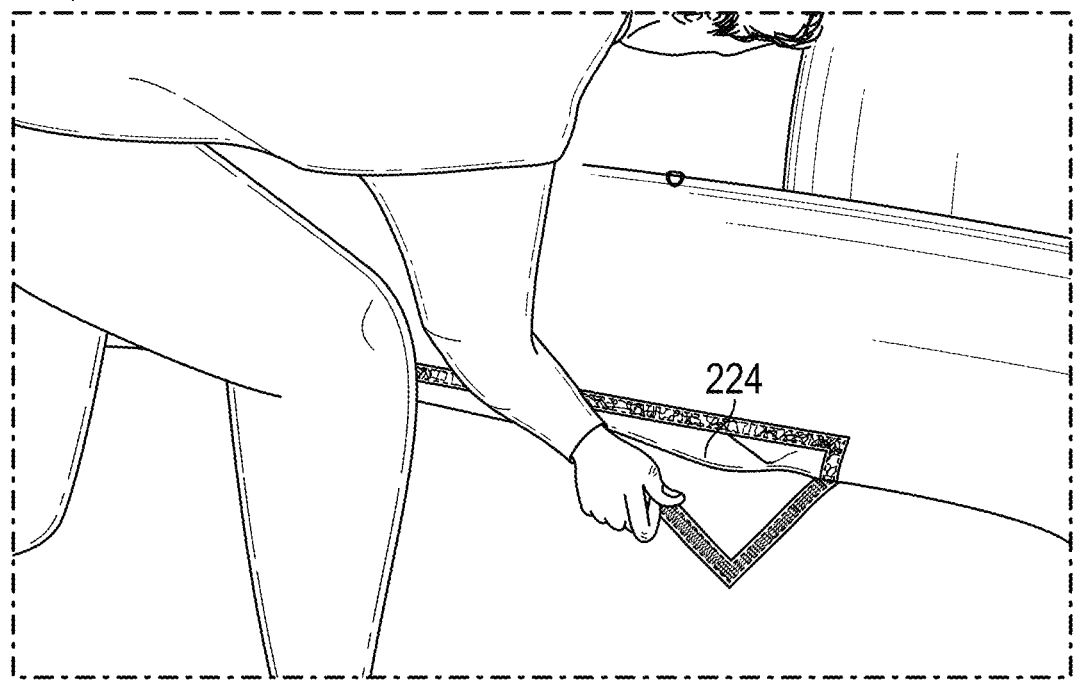
Figure 42C:
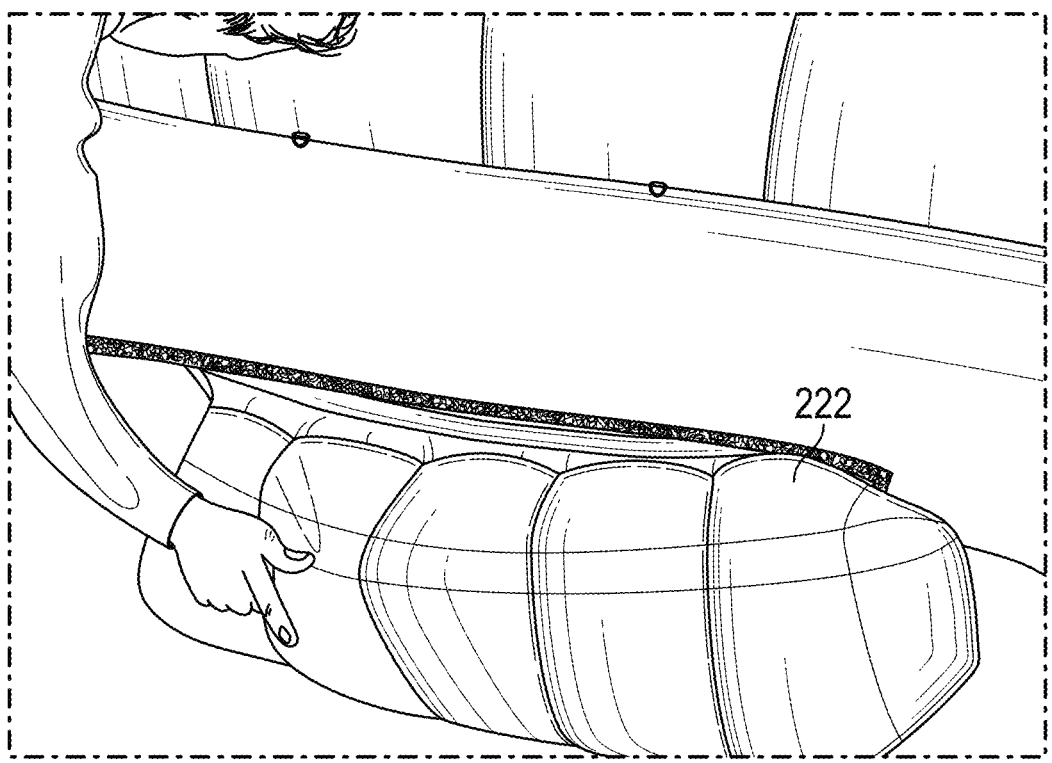
Figure 42D:
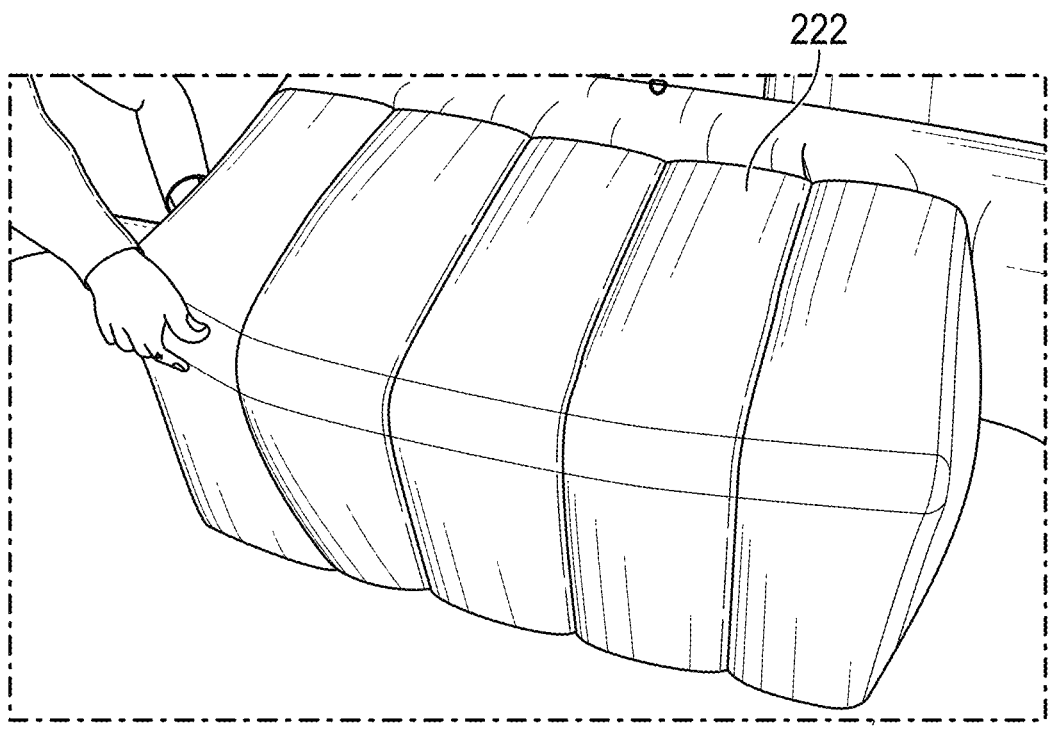
Figure 43A:
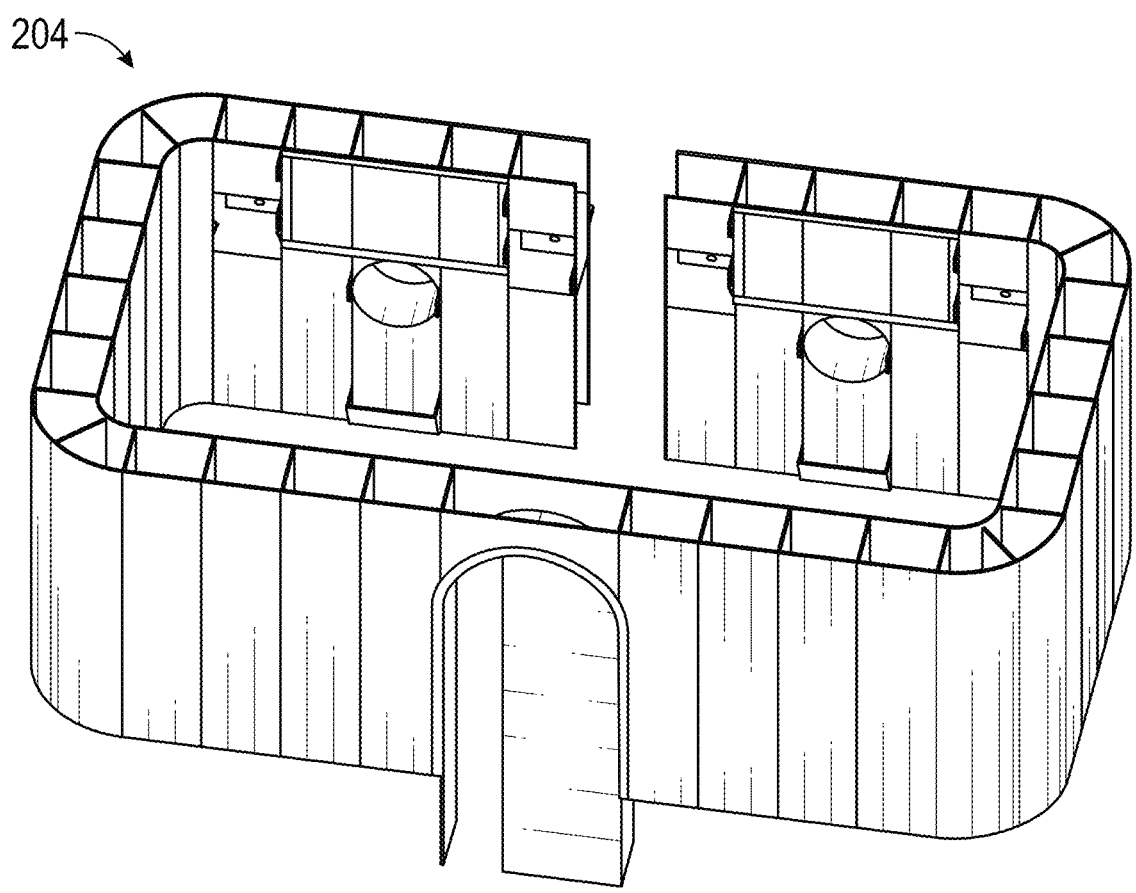
FIG. 43A is a front perspective view of an embodiment of a wall section of the inflatable structure of FIG. 37A.
Figure 43B:
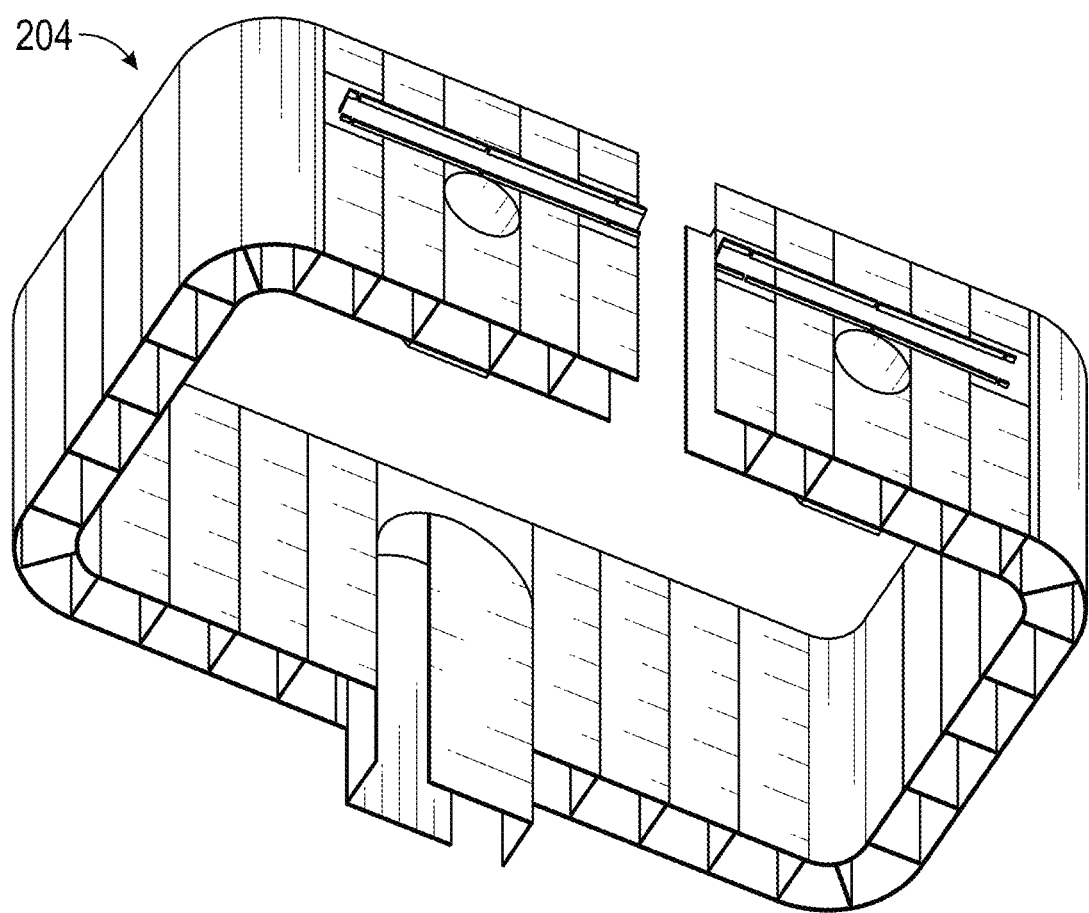
FIG. 43B is a back perspective view of the wall section of FIG. 43A.

FIGS. 42A-42D illustrate various stages of deploying an integrated seating element 222 according to an embodiment. As shown in FIG. 42A, the pocket 220 (into which the seating element 222 can be integrated) can be covered by a flap 224. The flap 224 can be closed by Velcro, zippers, or other mechanisms. FIG. 42B illustrates the flap 224 being opened. FIGS. 42C and 42D illustrate that once the flap 224 is open, air can fill the integrated seating element 222 causing it to inflate outside of the pocket 220. The integrated seating element 222 can be pneumatically connected to the inflatable structure 200 such that it inflates automatically once the flap 224 is opened. Once inflated, a user may sit on the integrated seating element 222 if desired. The integrated seating element 222 can be pushed back into the pocket 220 for storage. Thus, the inflatable seating elements 222 can be referred to as pop out elements. Pop-out walls FIG. 43A is a front perspective view of an embodiment of a wall section 204 of the inflatable structure 200 of FIG. 37A. FIG. 43B is a back perspective view of the wall section 204 of FIG. 43A.

Figure 44A:
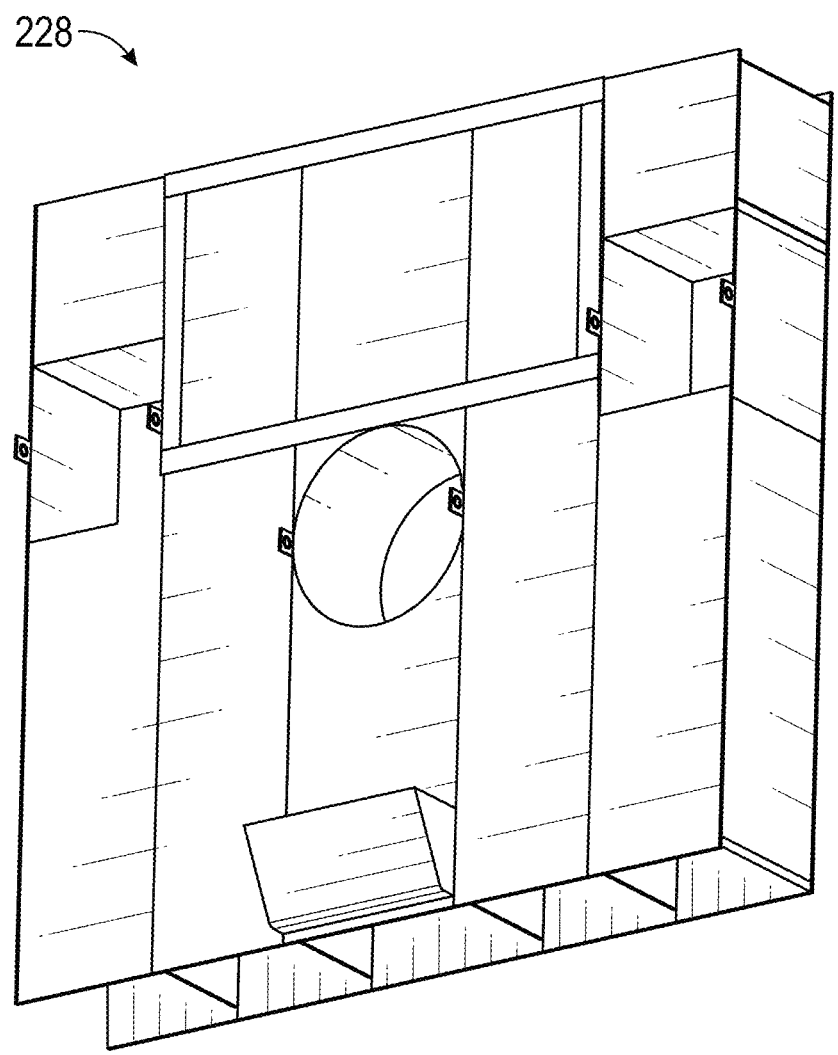
FIGS. 44A and 44B illustrate an example construction of a wall of the wall section of FIG. 43A.
Figure 44B:
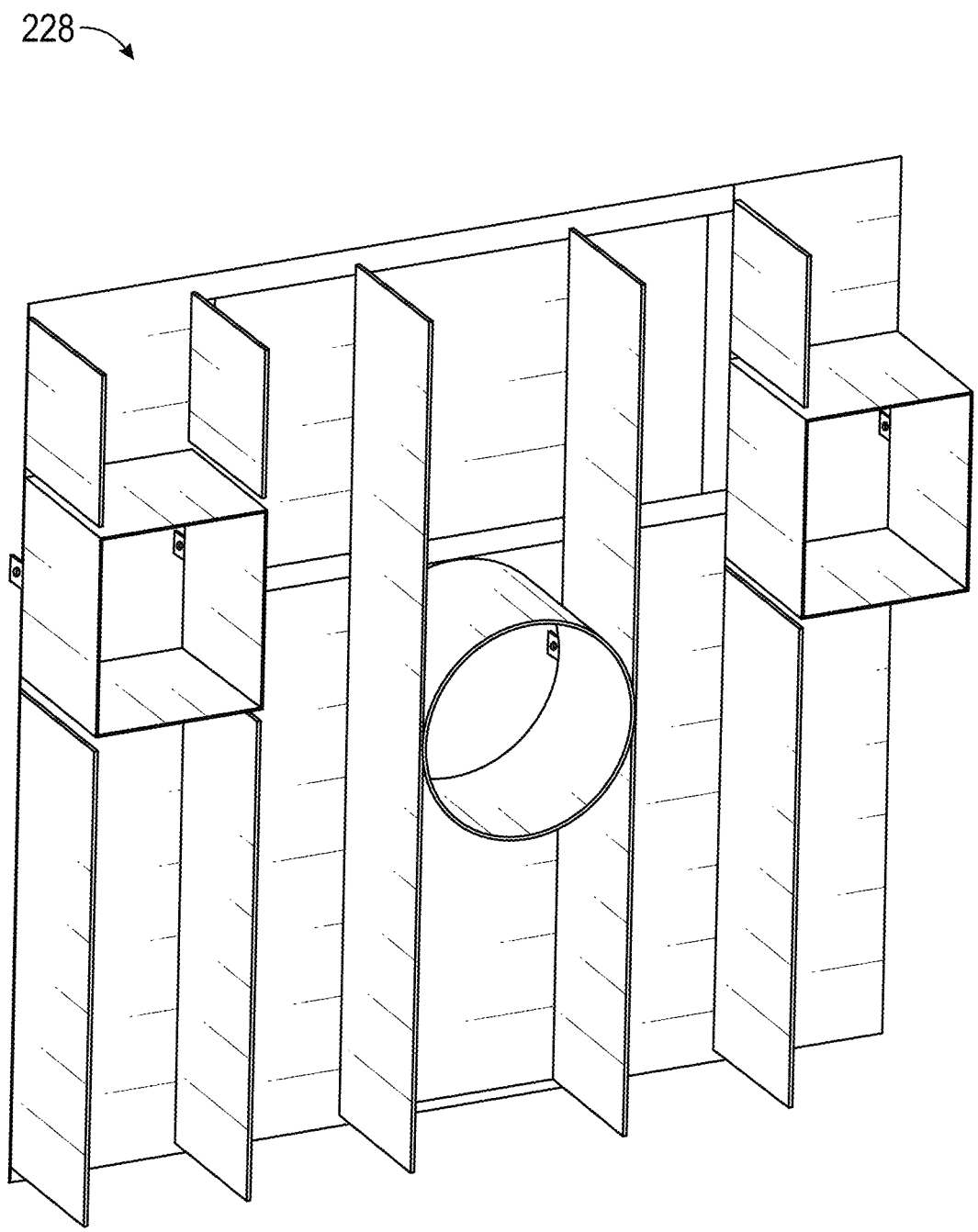
Figure 44C:
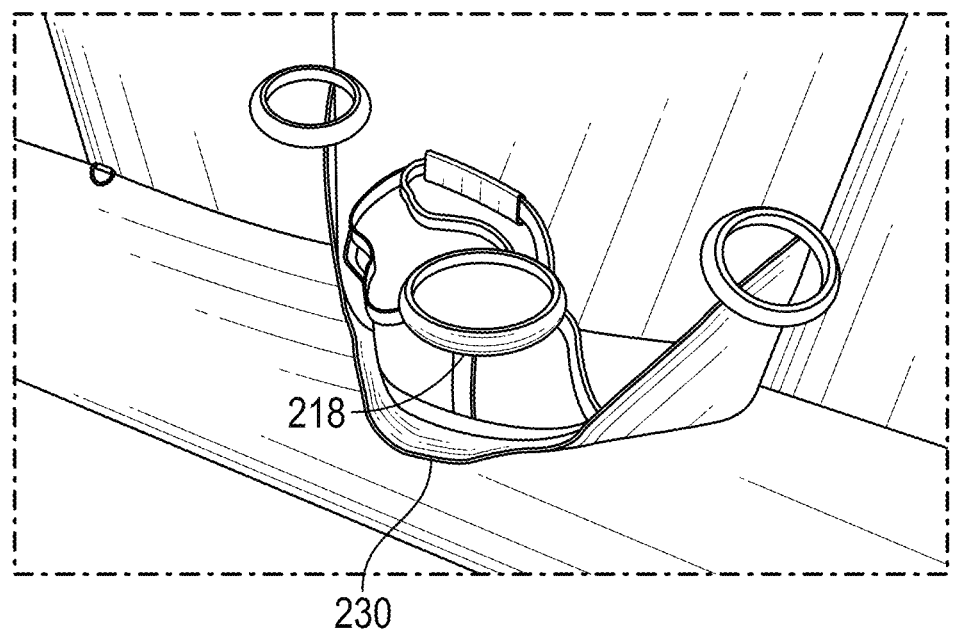
FIG. 44C illustrates an embodiment of a pocket that can be included in the wall section of FIG. 44A for storing the virtual reality headset and controllers.
Figure 44D:
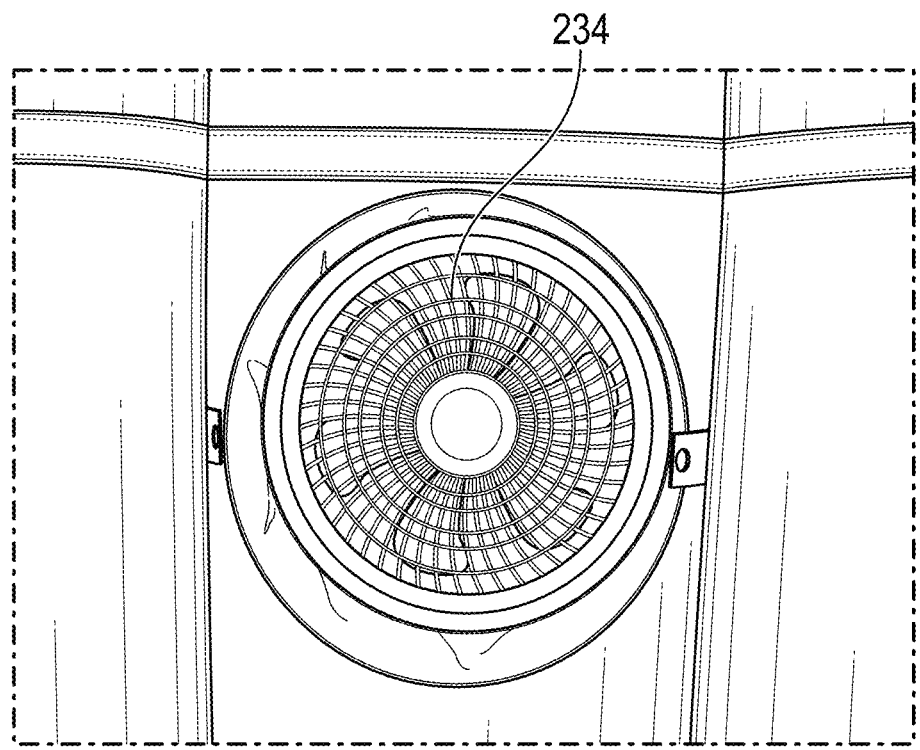
FIG. 44D illustrates an embodiment of a cooling unit that can be included in the wall section of FIG. 44A.
Figure 44F:
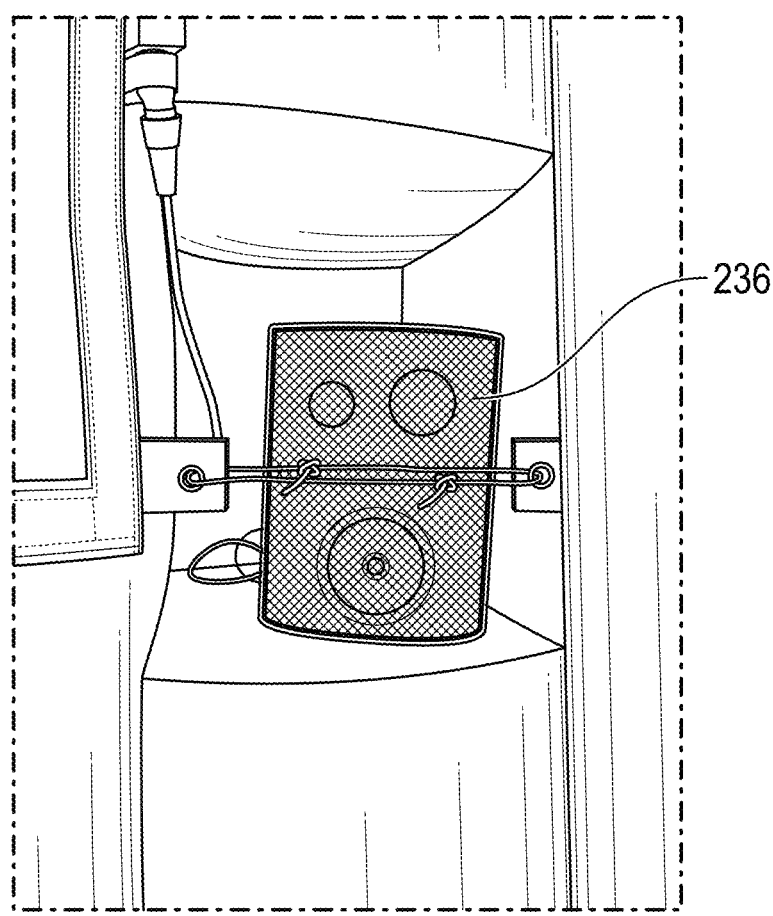
FIG. 44F illustrates an embodiment of a speaker that can be included in the wall section of FIG. 44A.

FIGS. 44A and 44B illustrate an example construction of a wall 228 of the wall section 204 of FIG. 43A. As shown, the wall 228 can include a pocket 230. The pocket 230 can be used to store the headset 218 and VR controllers when not in use as shown in FIG. 44C. The wall 228 can also include spaces 232 for receiving a cooling unit 234 and/or speakers 236 as shown in FIGS. 44D and 44F. The cooling unit 234 can be an air conditioner or a fan and can help maintain a comfortable temperature within the structure. The speakers 236 can provide audio for the VR game.

Figure 44G:
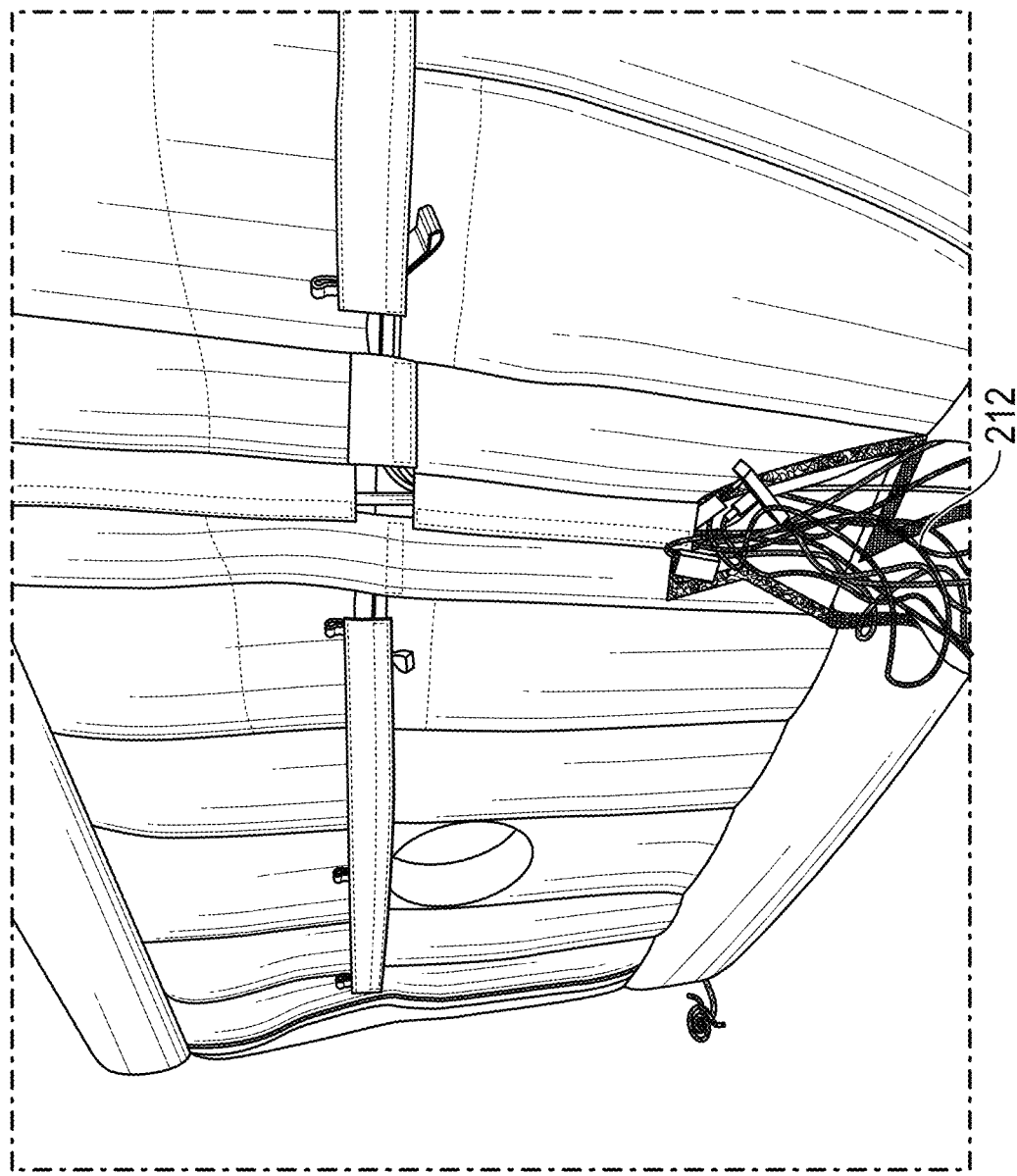
FIG. 44G illustrates an outside view of the rear wall section of FIG. 44A according to one embodiment.

FIG. 44G illustrates an outside view of the rear wall section of FIG. 44A according to one embodiment. As shown, wiring 212 can run over the wall to various components such as the cooling unit 234, speakers 236, headset 218, displays 214, and/or timer 216 (among others). In some embodiments, the inflatable structure 200 may be configured to provide a wireless signal that communicates with some of the components (for example, the displays 214).

Figure 45A:
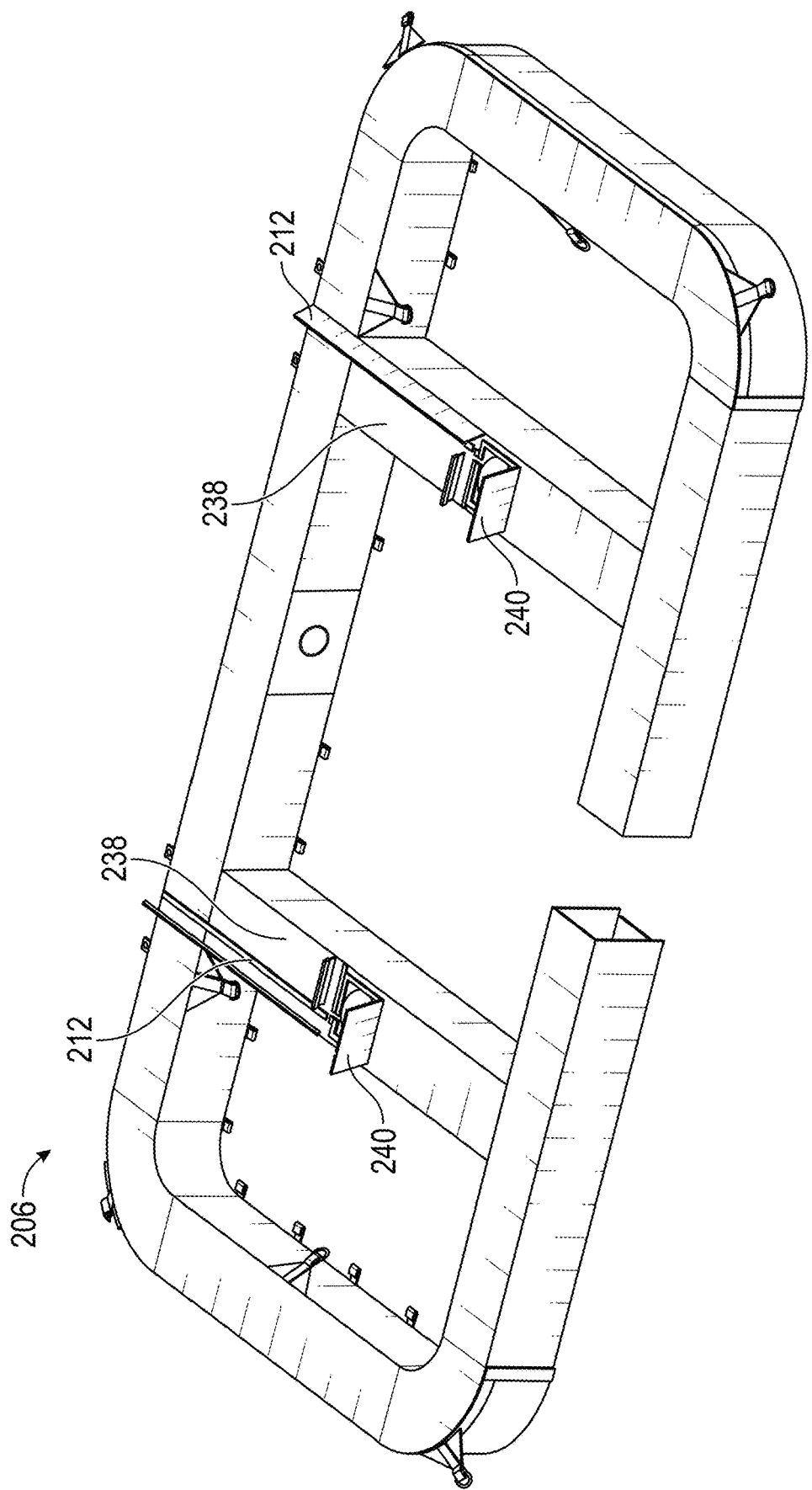
FIG. 45A is a top perspective view of an embodiment of a roof section of the inflatable structure of FIG. 37A.
Figure 45B:
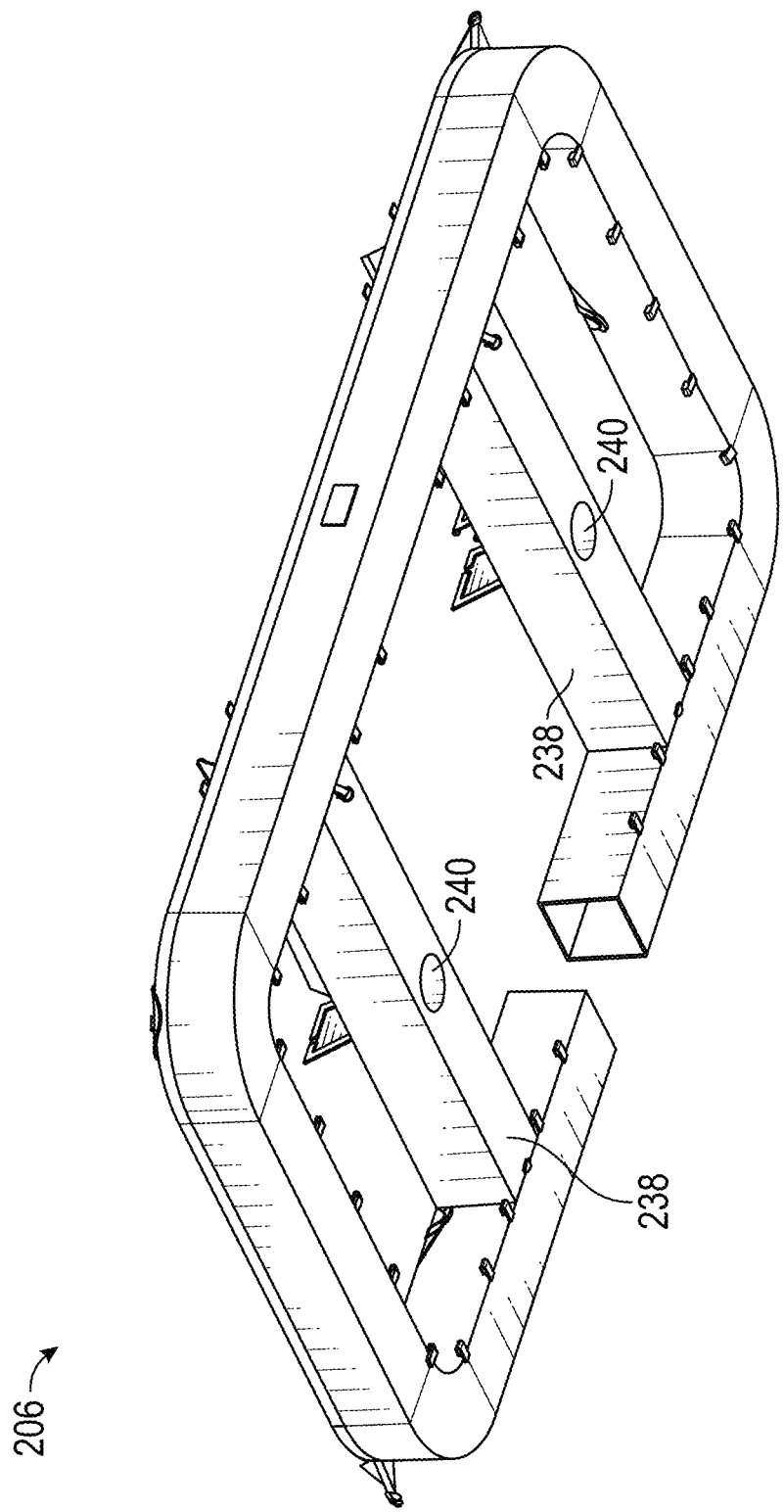
FIG. 45B is a bottom perspective view of the roof section of FIG. 45A.

FIG. 45A is a top perspective view of an embodiment of the roof section 206 of the inflatable structure 200 of FIG. 37A. FIG. 45B is a bottom perspective view of the roof section 206 of FIG. 45A. As shown, the roof section 206 can include inflatable beams 238. Wiring 212 can run over or through the beams 238 to an opening 240. The wiring 212 can extend down through the opening 240 to the headset 218 as shown in FIG. 40A (for example). The beams 238 and wiring 212 can support the headset 212.

Figure 45C:
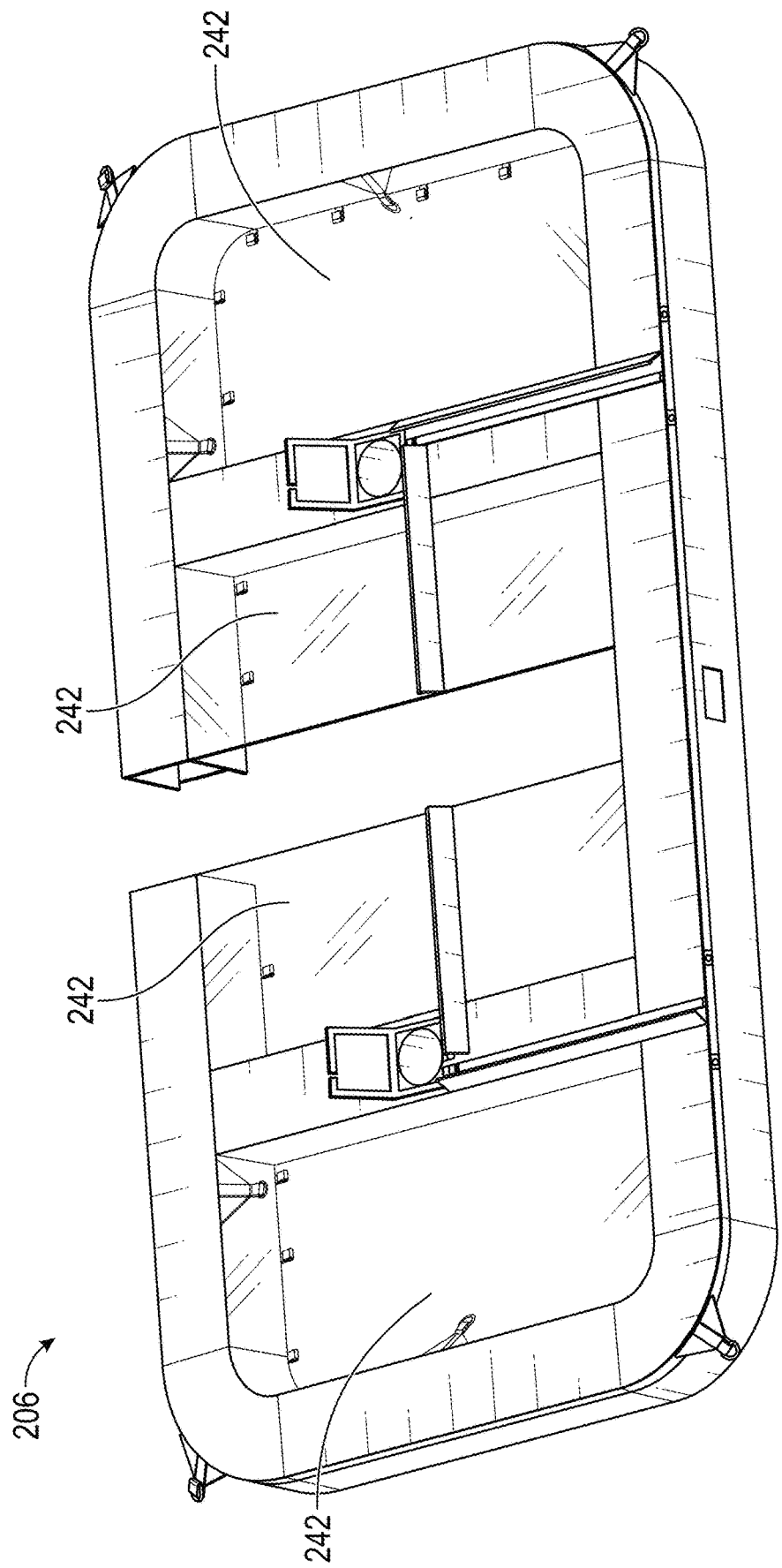
FIGS. 45C and 45D are front and back top perspective views of the roof section of FIG. 45A including a mesh configured to allow airflow while limiting sunlight.
Figure 45D:
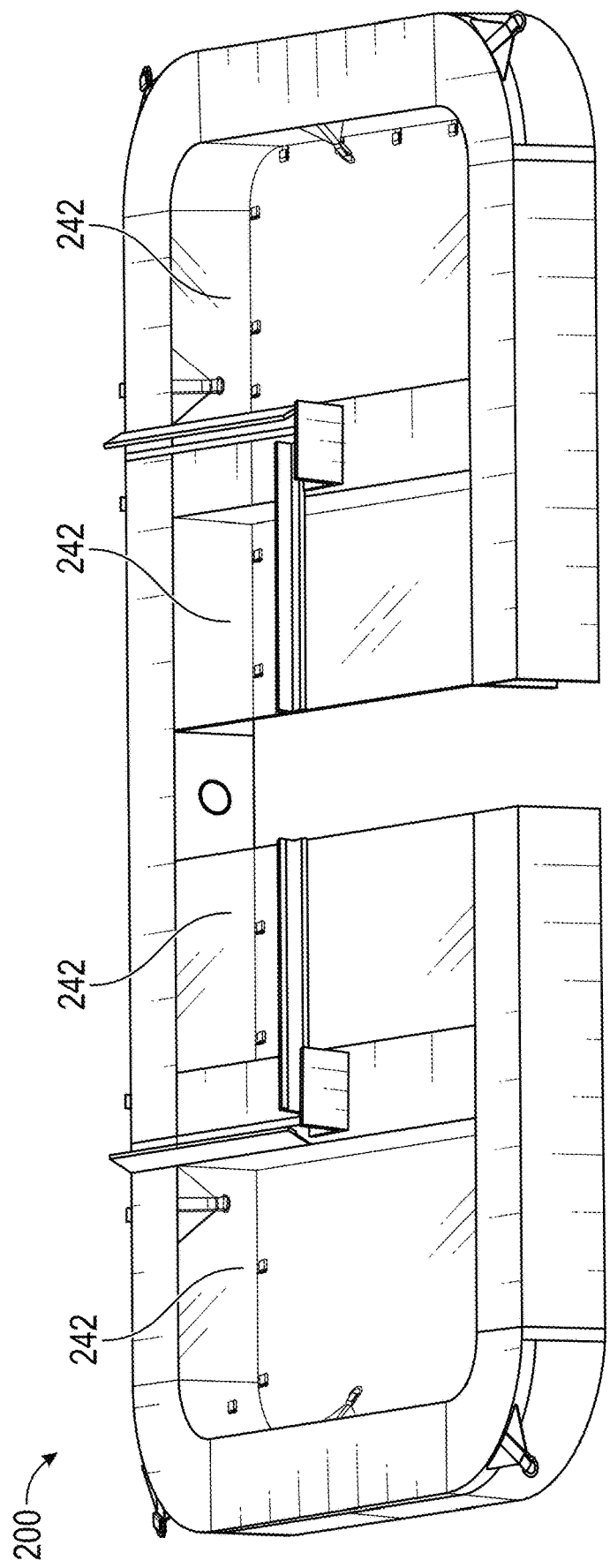

FIGS. 45C and 45D are front and back top perspective views of the roof section 206 of FIG. 45A including a mesh 242 configured to allow airflow while limiting sunlight. In some embodiments, VR headsets 218 may not work well when exposed to sunlight. The mesh 242 can limit or prevent sunlight exposure so as to enable the VR headsets 218 to work well. The mesh 242 can also allow airflow further facilitating cooling of the inflatable structure.

Figure 45E:
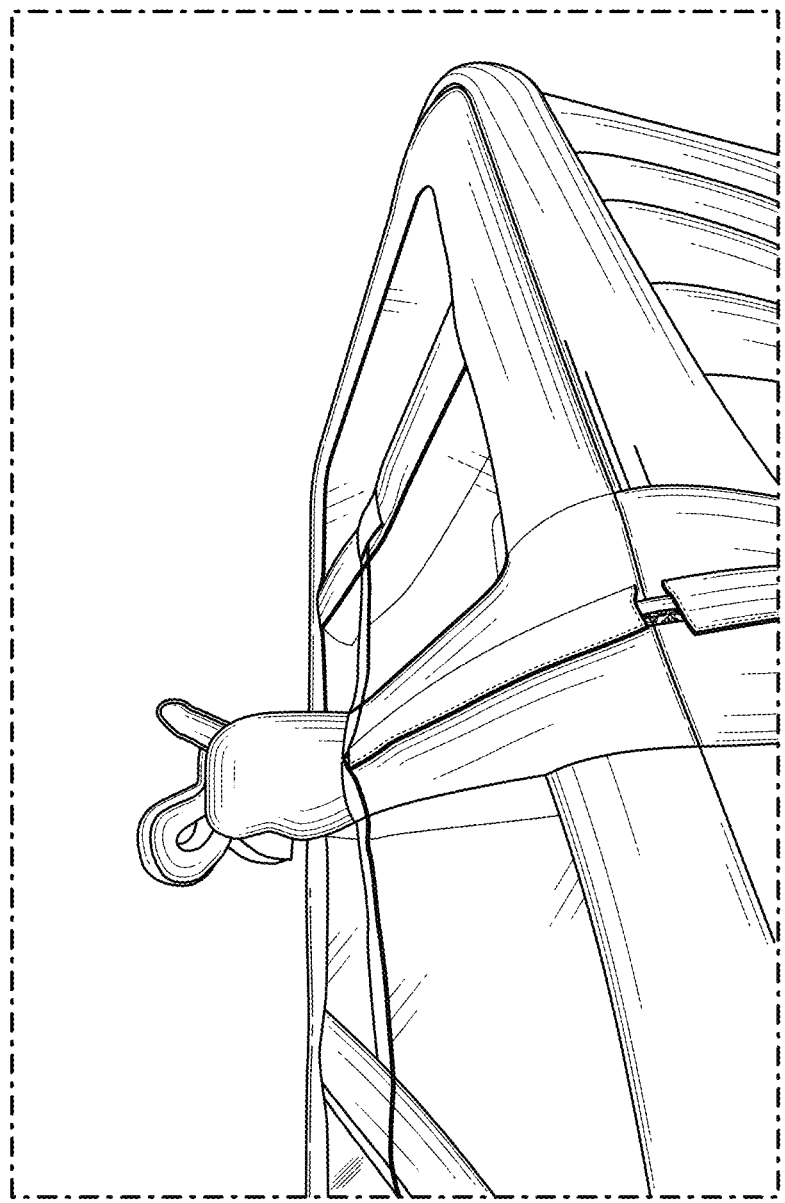
FIG. 45E is another top perspective view of the roof section of FIG. 45A.

FIG. 45E is another top perspective view of the roof section of FIG. 45A.

Figure 46B:
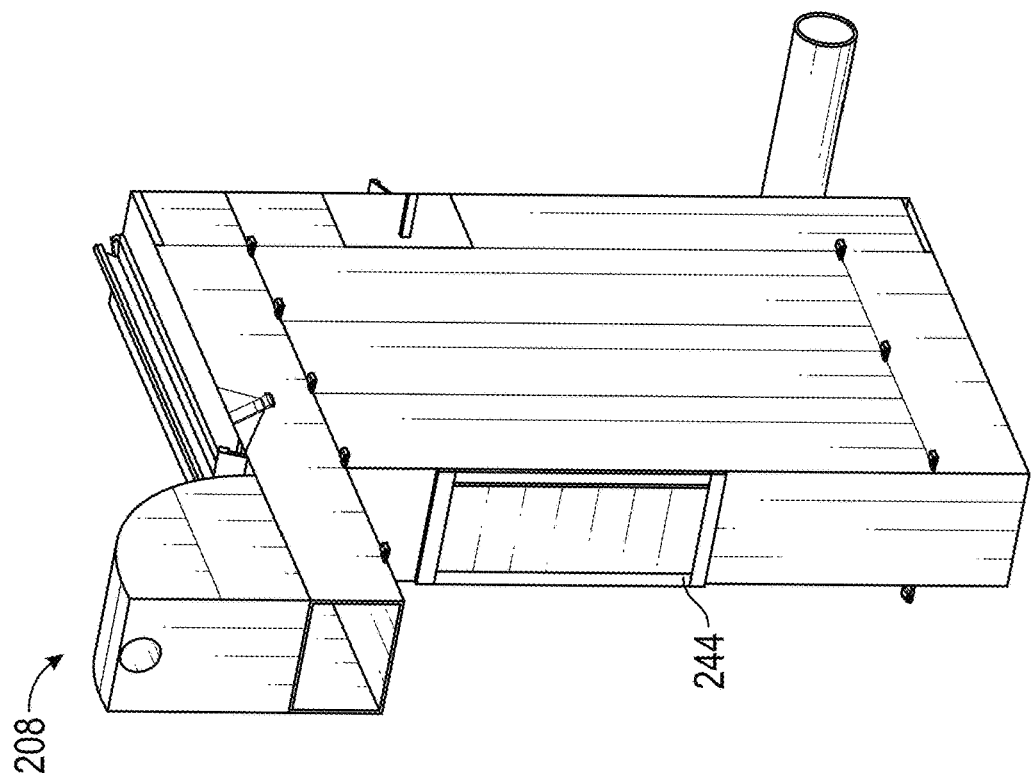
FIG. 46B is a front perspective view of the interior wall section of FIG. 46A.
Figure 46A:
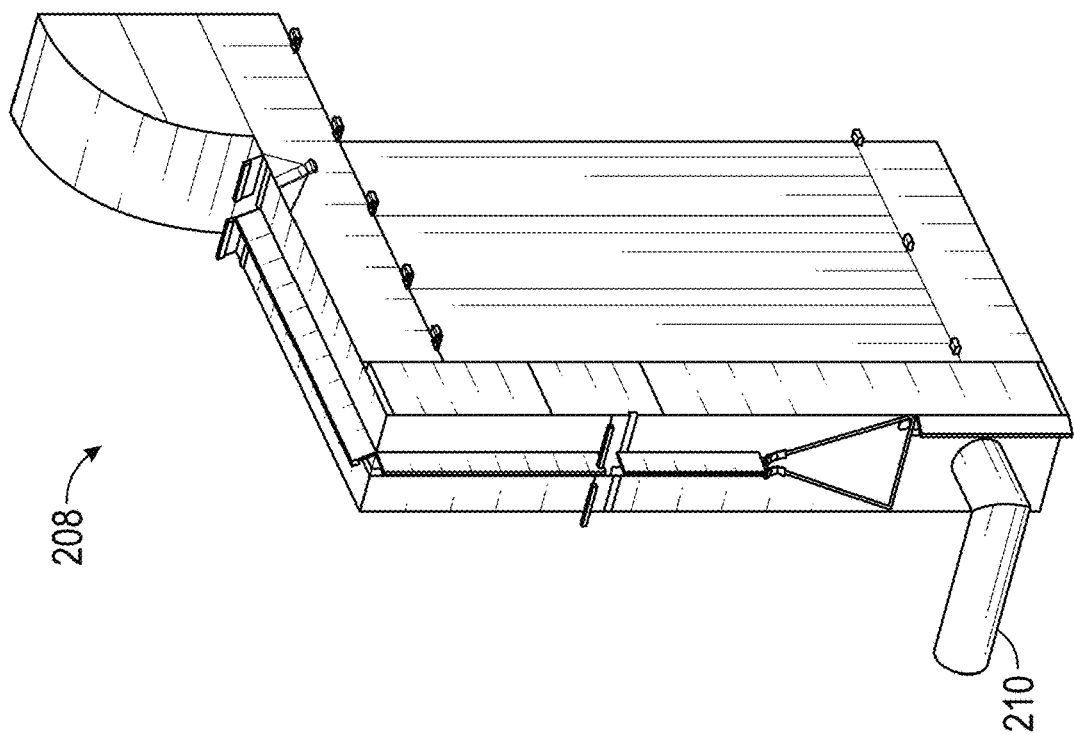
FIG. 46A is a back perspective view of an embodiment of an interior wall section of the inflatable structure of FIG. 37A.

FIG. 46A is a back perspective view of an embodiment of the interior wall section 208 of the inflatable structure 200 of FIG. 37A. FIG. 46B is a front perspective view of the interior wall section 208 of FIG. 46A. As noted above, the interior wall section 208 can divide the interior of the inflatable structure 200 into two rooms to allow two users to play simultaneously. This need not be the case in all embodiments. A space 244 for attaching an information panel (e.g., explaining the rules) is shown.

Figure 46D:
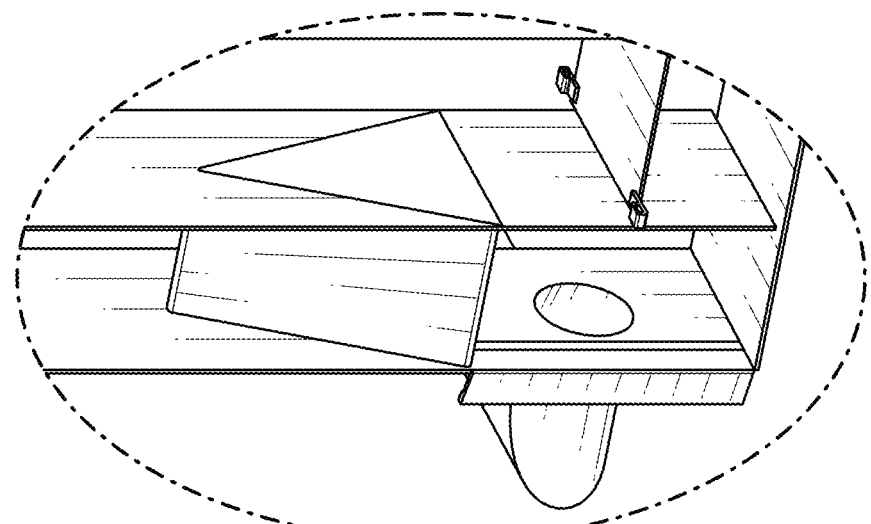
FIGS. 46C and 46D illustrate a storage compartment that can be integrated into the interior wall section of FIG. 46A according to an embodiment.
Figure 46C:
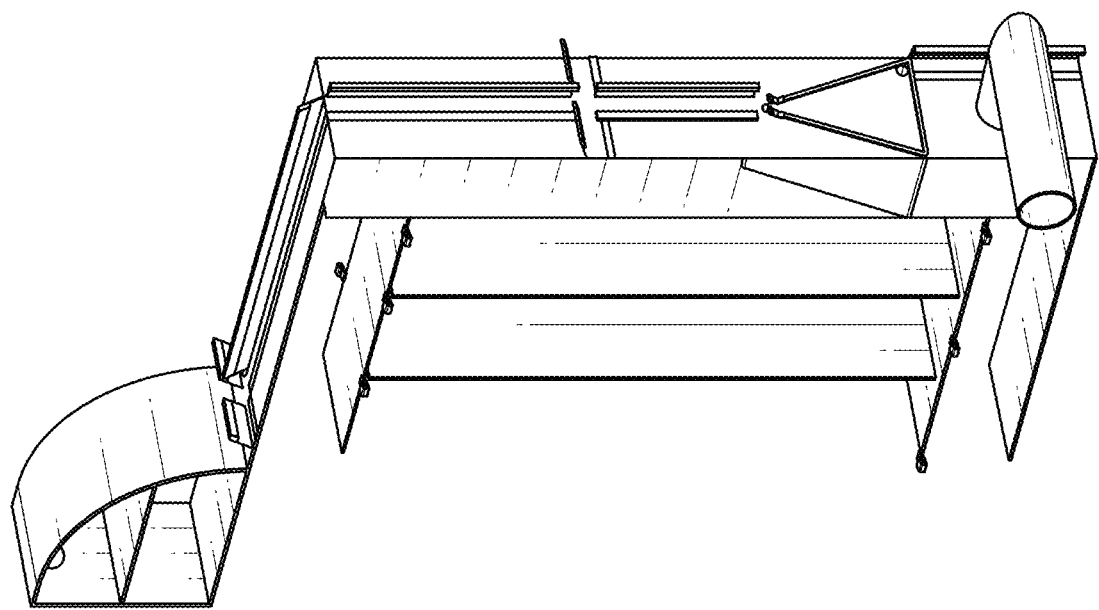

FIGS. 46C and 46D illustrate a storage compartment that can be integrated into the interior wall section of FIG. 46A according to an embodiment. The storage compartment can house some of the electronics for the system, such as the VR gaming system. The VR gaming system can be, for example, an Oculus VR system, for example. In some embodiments, these components can be housed in other locations.

Figure 47:
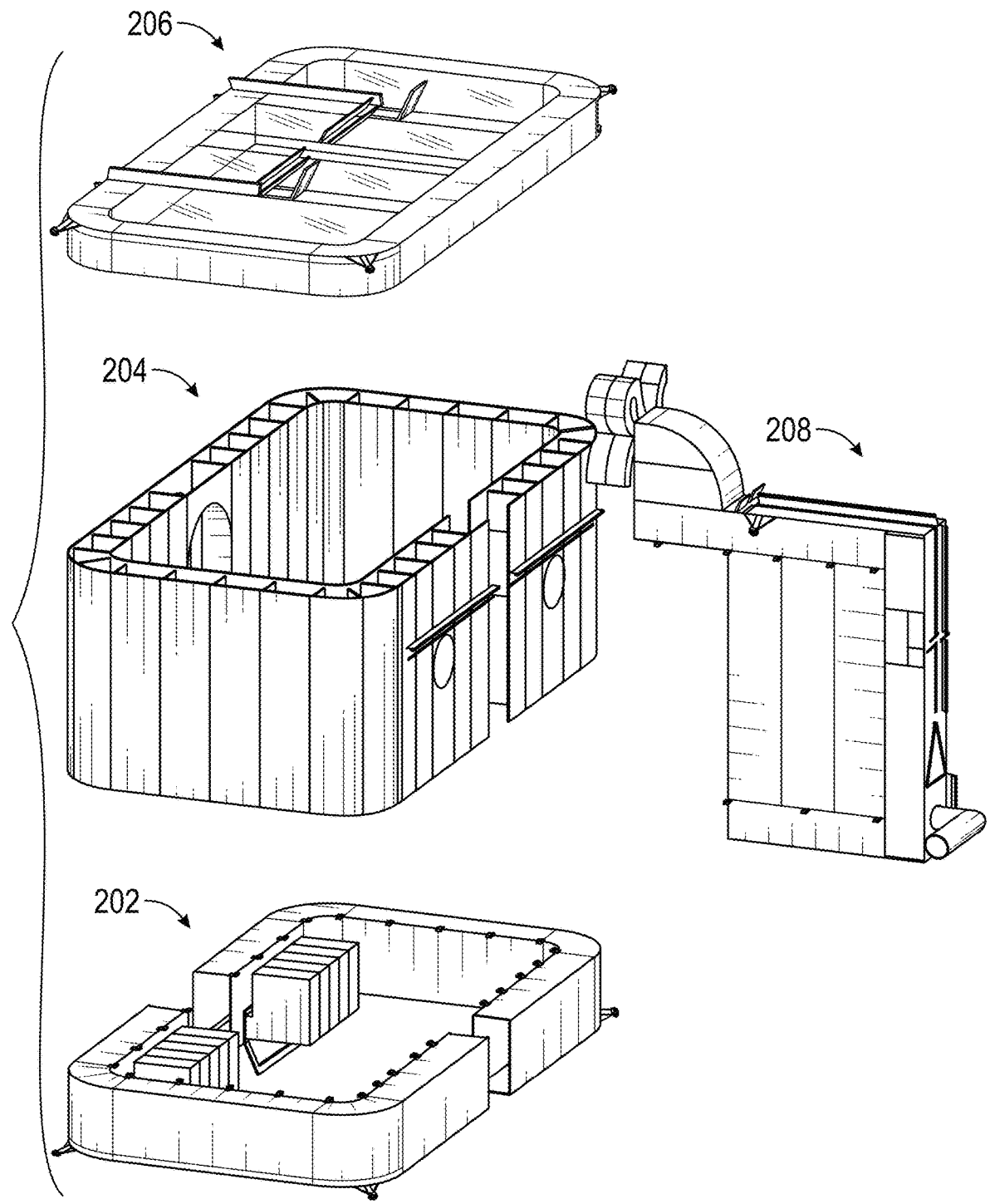
FIG. 47 is a diagram illustrating how the base section of FIG. 41A, wall section of FIG. 43A, roof section of FIG. 45A, and interior wall section of FIG. 46A can be assembled according to an embodiment.

FIG. 47 is a diagram illustrating how the base section 202 of FIG. 41A, wall section 204 of FIG. 43A, roof section 204 of FIG. 45A, and interior wall section 208 of FIG. 46A can be assembled according to an embodiment.

Any dimensions or text shown in any of the figures are provided by way of example, not limitation.

Although the preceding description describes components and features in relation to inflatable structure 100 and inflatable structure 200. Any of the features of inflatable structure 100 can be incorporated into inflatable structure 200 and any of the features of inflatable structure 200 can be incorporated into inflatable structure 100. In some embodiments, this results in an inflatable structure that includes lockable compartments and can be skinned (for example, to provide escape room functionality) while also include VR or other components described herein.

A person having ordinary skill in the art will readily appreciate, the directional terms are sometimes used for ease of describing the figures and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention.

What is claimed is:

1. An inflatable structure comprising:
   a plurality of inflatable walls arranged to form a room having an interior;
   at least a first non-pressurized lockable compartment integrated between a back surface and a front surface and within a thickness of a first inflatable wall of the plurality of inflatable walls, wherein the first lockable compartment comprises:
   a non-pressurized recess formed between the back surface and the front surface and within the thickness of the first inflatable wall, and
   at least one flap configured to close an opening of the recess of the first lockable compartment, the at least one flap configured to be secured in a closed position with a lock.

2. The inflatable structure of claim 1, wherein the lockable compartment further comprises at least on zipper configured to close the flap.

3. The inflatable structure of claim 2, wherein the at least one zipper comprises a tab that is configured to be secured with the lock to maintain the flap in the closed position.

4. The inflatable structure of claim 3, wherein the as least one zipper comprises two zippers.

5. The inflatable structure of claim 4, further comprising the lock.

6. The inflatable structure of claim 5, further comprising an integrally formed inflatable central vault positioned within the interior of the room, the central vault comprising at least one lockable compartment.

7. The inflatable structure of claim 6, wherein the central vault is connected to a remainder of the inflatable structure through a roof section of the inflatable structure.

8. The inflatable structure of claim 7, further comprising one or more themed skins configured to be installed over inner surfaces of the interior of the room to change the appearance of the room.

9. The inflatable structure of claim 8, wherein the one or more themed skins are configured to allow access to the lockable compartments.

10. The inflatable structure of claim 9, wherein each of the plurality of walls comprises at least two lockable compartments, each configured to be secured with a lock.

11. The inflatable structure of claim 10, further comprising a second room.

12. A system comprising:
    the inflatable structure of claim 1; and
    a pump for inflating the inflatable structure.

* * * * *